United States Patent [19]

Stuart et al.

[11] Patent Number: 5,678,175

[45] Date of Patent: Oct. 14, 1997

[54] SATELLITE SYSTEM USING EQUATORIAL AND POLAR ORBIT RELAYS

[75] Inventors: James R. Stuart, Louisville, Colo.; Mark Alan Sturza, Woodland Hills, Calif.; José Manuel Villalvazo, El Prado, Mexico; David A. Bayer, Naples, Fla.; Erik J. Goldman, St. Charles, Mo.; Arthur K. Peters, Gainesville, Fla.; Steven W. Smith, Atlanta, Ga.

[73] Assignee: Leo One IP, L.L.C., St. Louis, Mo.

[21] Appl. No.: 466,176

[22] Filed: Jun. 6, 1995

Related U.S. Application Data

[63] Continuation-in-part of Ser. No. 216,820, Mar. 28, 1994, abandoned.

[51] Int. Cl.$^6$ ................................................. H04B 7/185
[52] U.S. Cl. ...................... 455/13.1; 455/12.1; 455/33.1; 455/54.1
[58] Field of Search .......................... 455/11.1, 12.01, 455/13.1, 13.3, 13.4, 33.1, 33.2, 54.1, 53.1, 56.1; 342/352, 356, 357, 387, 457; 370/75, 79, 84, 94.1, 94.2, 95.1, 95.3, 97, 104.1; 348/12, 13

[56] References Cited

U.S. PATENT DOCUMENTS

| | | | |
|---|---|---|---|
| 3,340,531 | 9/1967 | Refalas et al. | 455/13.1 |
| 3,497,807 | 2/1970 | Newton | 455/13.1 |
| 3,836,969 | 9/1974 | Bond et al. | 455/13.1 |

(List continued on next page.)

FOREIGN PATENT DOCUMENTS

| | | | |
|---|---|---|---|
| 0094253 | 11/1983 | European Pat. Off. | |
| 0575678 | 11/1983 | European Pat. Off. | |
| 0317974 | 5/1989 | European Pat. Off. | |
| 89118458.2 | 5/1989 | European Pat. Off. | |
| 0510789A1 | 1/1992 | European Pat. Off. | 455/12.1 |
| 0562374 | 9/1993 | European Pat. Off. | |
| 0134288 | 3/1985 | Germany | |
| 00260442 | 3/1988 | Germany | |
| 4304916 | 8/1994 | Germany | |
| 2265795 | 6/1993 | United Kingdom | |
| 88/02200 | 3/1988 | WIPO | 455/13.4 |
| 9200632 | 1/1992 | WIPO | |
| 8804866 | 6/1992 | WIPO | |

OTHER PUBLICATIONS

"Some Circular Orbit Patterns Providing Continuos Whole Earth Coverage", J.G. Walker, Journal of British Interplanetary Soc. vol. 24, 1971 pp. 369–884.

(List continued on next page.)

*Primary Examiner*—Reinhard J. Eisenzopf
*Assistant Examiner*—Marsha D. Banks-Harold
*Attorney, Agent, or Firm*—Anglin & Giaccherini

[57] ABSTRACT

A satellite communications system is disclosed. One of the embodiments of the present invention includes six to fourteen satellites (12) which operate in a single Equatorial orbit (14). These satellites (12) are capable of providing communications services to locations on the Earth (E) which are within thirty degrees of the Equator (16). Another embodiment of the invention utilizes both the single Equatorial orbit plane (14) in combination with other satellites (12) moving in polar or inclined orbits (60, 63, 210). The embodiment that combines satellites (12) in Equatorial (14), polar (60) and inclined (63, 210) orbits will provide a wide variety of data services to virtually any point on the globe. In the preferred embodiments, the satellites (12) are designed to operate in a circular low Earth orbit at an altitude of from 800 to 1852 kilometers. Although the preferred embodiments utilize this specific range of altitudes, the satellites (12) are designed to fly in any orbit that is not a geosynchronous orbit. The satellites (12) are also capable of speeding packetized messages (225) around the globe either by working in combination with relay stations (34, 61, 65) on the ground, by transferring message payloads (225) across different orbits via the relay stations (34, 61, 65) or by conveying packetized payloads (225) through the use of inter-satellite links (55).

37 Claims, 54 Drawing Sheets

U.S. PATENT DOCUMENTS

| | | | |
|---|---|---|---|
| 4,135,156 | 1/1979 | Sauders et al. | 343/100 |
| 4,375,697 | 3/1983 | Visher | 455/13 |
| 4,809,935 | 3/1989 | Draim | 244/158 |
| 5,009,235 | 4/1991 | Crookshauks | 455/13.1 |
| 5,119,225 | 6/1992 | Grant et al. | 455/13.1 |
| 5,121,409 | 6/1992 | Goss | 375/1 |
| 5,121,503 | 6/1992 | Davis | 455/12.1 |
| 5,220,333 | 6/1993 | Penrod | 342/389 |
| 5,239,670 | 8/1993 | Schwendeman et al. | 455/13.4 |
| 5,319,374 | 6/1994 | Desai et al. | 342/357 |
| 5,326,054 | 7/1994 | Turner | 342/352 |
| 5,327,572 | 7/1994 | Freeburg | 455/13.2 |
| 5,390,124 | 2/1995 | Kyrtsos | 342/357 |

OTHER PUBLICATIONS

"Satellite Constellations" J.G.Walker, Journal of the British Interplanetary Socie. vol. 37, 1984, pp. 559–572.

"Circular Polar Constellations Providing Single or Multiple Coverage Above a Specified Latitude", W.S. Adams et al., Journal of the Astronautical Science vol. 35 No. 2, Apr.–Jun. 1989 pp. 155–193.

"Design of Satellite Constellations for Optimal Continuous Coverage", D.C. Beste, IEEE Transactions on Aerospace Elec. Sys., AES–14, No. 3 May 1978, pp. 446–473.

"Priciples of Communications Satellites," G.D. Gordon et al., John Wiley & Sons, Inc., ©1993, pp. 55–84.

"Space Mission Analysis," J.R. Wertz, et al., Kluwer Academic Publishers, ©1991, Chapter 7.

"Satellite Communications Systems Engrg", W. Pritchard et al. Prentice Hall ©1993, Chapter 2, pp. 30–96.

"The VoSat–2 Digital Communications Experiment", J.W. Ward et al., Journal of the Inst. of Electronics of Radio Engineers 57, Sep./Oct., No. 5 (Supp.) London.

"Multiple Satellite Networks, Performance Evaluation Via Simulation", L.P.Clara et al.

"A Global Message Network Employing Low Earth–Orbiting Satellites", J. Kaniyil et al., IEEE Journal on Selected Areas in Comm., vol. 10, No. 2, Feb. 1992.

"Globalstar–Mobile Communications–Wherever You Are", Brochure published by Loral Qual Comm Satellite Services, Undated.

"Satellite Personal Comm. System for the 21st Century", G. Barresi et al., 43d Congress of the Int'l Astronaut. Fed., Wash., DC Aug. 28–Sep. 25, 1992.

"Study of Micro Satellite Comm. System", K. Kondo et al., 43d Congress of the Int'l Astronautical Fed., Wash., D.C., Aug. 28–Sep. 25, 1992.

"Globalstar System FCC Application" —3 Jun. 1991, Loral Cellular Systems Corp.

"Elliptical Orbit FCC Satellite System Application" —3 Jun. 1991.

"Odyssey FCC Application" —31 May 1991.

"Iridium System FCC Application" —16 Oct. 1991, Motorola, Inc.

"Aries Satellite FCC Application" —3 Jun. 1991, Constell. Comm., Inc.

"Starsys Satellite FCC Application" —25 May 1990.

"OrbComm Satellite Satellite FCC Application" 28 Feb. 1990.

"Volunteers in Technical Assistance Satellite FCC Application" —20 Sep. 1990.

"Inridium–A Global Personal Comm. Sys.", B. Bertiger, Intermedia, Aug.–Sep. 1991, vol. 19 No. 4–5, pp. 40–44.

"Leosat Satellite FCC Application" —21 Sep. 1990, Leosat Corp.

"A Switch in the Sky", R.R. Montgomery et al., Cellular Business, Apr. 1989, pp. 26–42.

"Commercial Space Ventures A Financial Perspective", publ. by U.S. Dept. of Commerce, Apr. 1990.

"Genenic Framework Criteria for Unviersal Digital Port. Comm Sys. (PCS)", Bellcore, Framework Technical Advisory, Issue 1, Mar. 1990.

"The Acts Mobile Terminal", R. Dessouky et al., Satcom Qtrly., Jul. 1991, No. 2, pp. 1–19–and— The ACTS Mobile Terminal Rain.

"Compensation Algorithm", Barry K. Levitt, Satcom Qtrly, No. 2., p. 10, Jul. 1991.

"Inmarsat Ship Earth Station", Brochure of Japan Radio Co., Undated.

"Proceedings of the 1st Annual USU Conference on Small Satellites", Center for Space Engineering, Utah State Univ. 7–9 Oct. 1987.

"Proceedings of the 2d Annual USU Conference on Small Satellites", Center for Space Engineering, Utah State Univ., 18–21 Sep. 1988.

"Proceedings of the 3d Annual USU Conference on Small Satellites", Center for Space Engineering, Utah State Univ., 26–28 Sep. 1989.

"Proceedings of the 4th Annual AIAA/USU Conference on Small Satellites", Center for Space Engineering, Utah State Univ. 27–30 Aug. 1990, vol. I.

"Proceedings of the 4th Annual AIAA/USU Conference on Small Satellites", Center for Space Engineering, Utah State Univ., 27–30 Aug. 1990 vol. II.

"Proceedings of the 5th Annual AIAA/USU Conference on Small Satellites", Center for Space Engineering, Utah State Univer., 26–29 Aug. 1991.

"Proccedings of the 6th Annual AIAA/USU Conference on Small Satellites", Center for Space Engineering, Utah State Univ., 21–24 Sep. 1992.

"Aries:Global Comm. through a Constellation of Low Earth Orbit Satellites," R.A. Summers et al., AIAA, Inc. w/Permission from Defense Sys. Inc.

"Survivable Low–Cost Communication System", E. Hirshfield, Printed by Ford Aerospace, 14 Feb. 1989.

"Emerging Small Geostationary Comm. Satellites Market Capabilities and Opportunity", 29th International Meeting on Space, 8 Dec. 1989.

"MSAT–X Technical Brief: Vehicle Antenna Pointing Techniques for Mobile Satellite Applications", NASA/JPL, JPL400–276 (InsertC) Nov. 1985.

"MSAT–X Tech. Brief: Mobile Sat. Network Architecture & Efficient Multiple–access Protocol", NASA/JPL, JPL400–276 (Insert H), Nov. 1985.

"Emerging Small Geostationary Comm. Satellite: Market Capabilities & Opportunities", J.R. Stuart et al., Ball Aerospace Sys. Div., 8 Dec. 1989.

"New Small Geosynch. Comm. Sat. Technologies, Capabilities & Markets", J.R. Stuart et al., Sat–Taine, Inc., Wash., DC, 14 Feb. 1991.

"Internetworking: A Guide to Network Comm. LAN to LAN; LAN to WAN," M.A. Miller, M & T Books, San Mateo, CA 1991, Chapters 5–7, pp. 189–290.

"Internetworking & Addressing", G.White, McGraw–Hill, Inc., New York, 1992, Chapter 6, pp. 127–159.

"TCP/IP and Related Protocols," V. Black, McGraw–Hill, Inc., New York, 19992, Chapter 1, pp. 5–8; Chapter 3; pp. 39–75; Chap18, pp. 560–592.

"Electronic Comm. Systems: A Complete Course", W. Schweber, Prentice–Hall, Inc. 1991, Chapter 18 pp. 560–592.

"Calling Comm. Corp Plaus Global KA–Band LEO System", Satellite News, vol. 16, No. 5, 1 Feb. 1993, pp. 1–4.

"Desert Storm' Demand Buffets Satellite–Phone Firm",N. Robichaux et al., Wall Street Journal, 1 Feb. 1991, p. B2.

"Microstrip Patch Array with Multiple Beams," P.S. Hall et al., 19th European Microwave Confernce, Sep. 1989, pp. 343–348.

"Multibeam Array Antenna for Data Relay Satellite," Tasuku Teshirogi, Electronics & Communications in Japan, vol. 71, No. 5, May 1988, pp. 71–85.

"Phased Array Antennas with Phasers and true Time Delay Phase Shifters", N.V. Jespersen et al., International Symposium Digest: Antennas and Propagation, vol. II, IEEE Catalog 90CH2775–3, May 1990, pp. 778–781.

"A Scenario for the Deployment of Interactive Multimedia Cable Television System in the United States in the 1990's", by Matthew D. Miller, Proceedings of the IEEE, vol. 82, No. 4, 1994, pp. 585–589.

SATELLITE SYSTEM USING EQUATORIAL AND POLAR ORBIT RELAYS

CROSS-REFERENCE TO RELATED PATENT APPLICATIONS

The present Application is a Continuation-in-Part Application of U.S. Ser. No. 08/216,820 filed on 28 Mar. 1994, now abandoned, and is related to the following commonly-owned and commonly-assigned Patent Applications:

Polar Relay Method for Satellite System by James R. Stuart, filed on 18 Apr. 1995, and assigned U.S. Ser. No. 08/423,673, and claiming the benefit of priority of a parent Application entitled Polar Relay Method for Satellite System by James R. Smart, filed on 9 Nov. 1993, and assigned U.S. Ser. No. 08/149,574; and Optimal Coverage Satellite System by Mark A. Sturza, filed on 12 Oct. 1994, and assigned U.S. Ser. No. 08/319,819.

CLAIMS FOR PRIORITY

The Applicants hereby claim the benefit of priority under Section 120 of Title 35 of the United States Code of Laws for any and all subject matter which is commonly disclosed in the present Application and in its pending parent patent application U.S. Ser. No. 08/216,820 entitled Satellite System Using Equatorial & Polar Orbit Relays by Mark A. Sturza et al., filed on 28 Mar. 1994; in pending Patent Application U.S. Ser. No. 08/423,673 entitled Polar Relay Method for Satellite System by James R. Smart, filed on 18 Apr. 1995 and claiming the benefit of priority of its parent application U.S. Ser. No. 08/149,574 entitled Polar Relay Method for Satellite System by James R. Smart, filed on 09 Nov. 1993; and in pending patent application U.S. Ser. No. 08/319,819 entitled Optimal Coverage Satellite System by Mark A. Sturza, filed on 12 Oct. 1994. The Applicants claim the benefit of priority for any and all subject matter that is commonly disclosed in the present Patent Application and in the Applications identified above.

FIELD OF THE INVENTION

The present invention relates to satellites and, more specifically, to a store-and-forward non-geostationary, non-voice satellite communication system.

BACKGROUND OF THE INVENTION

I. The Increasing Demand for Telecommunications Services

Over the past few decades, the demand for access to information has increased dramatically. Although conventional wire and fiber landlines, cellular networks and geostationary satellite systems have continued to expand in an attempt to meet this relentless growth in demand, the existing capacity is still not sufficient to meet the burgeoning global appetite for telecommunications services.

The history of mobile communications can be seen as an effort to make service widely available on both a geographic and economic basis. Early mobile communications systems served the needs of individual companies on a private basis. Through technology advances and regulatory changes, mobile communication services were offered on a commercial basis and grew to meet city, regional, national and even international coverage needs through interconnection to public networks. As part of this evolution, wireless network standards have developed, on both a national and international basis, although there are still no truly international seamless wireless networks.

As mobile communications networks have expanded geographically, prices for equipment and services have fallen dramatically. The decline in price of mobile services is one of the most important forces helping mobile communications reach broad-based markets and demonstrate rapid subscriber growth. The forces driving development of terrestrial wireless communications include:

Advances in Technology

Advances in radio propagation management, computer micro-processing, the ability to interconnect networks, and miniaturization have all combined to make more efficient use of spectrum and to lower equipment and service prices.

Declining Prices

As production increases for infrastructure and terminal equipment, manufacturers experience economies of scale which lead to lower prices for equipment.

Digital Technology

Digital technology is replacing analog technology in almost all wireless communication services. The switch to digital technology allows higher subscriber capacities to be served, enhances services and lowers the cost per subscriber for operators.

The resulting reductions in service and equipment cost attributable to the factors described above have allowed mobile communications to penetrate both business and consumer markets. The ultimate goal of wireless services is to provide two-way, ubiquitous, affordable communications services. It was only very recently, with the introduction of mobile satellite services, that this has been made possible. Indeed, mobile satellite services are the final step in the evolution of wireless communications service and are the only services which can provide this ultimate goal of ubiquitous wireless communication.

II. Terrestrial-Based Mobile Communications Services

Currently, there are five major types of public mobile communications services used throughout the world:

Cellular

Cellular provides primarily two-way, interconnected voice service with mobile, transportable and portable telephones. Reusing frequencies within a relatively small geographic area with multiple, low power transmission sites is cellular's distinguishing technical characteristic. Cellular also provides a platform for data transmission, although the vast majority of traffic over cellular is voice at this time.

Paging

Paging provides primarily one-way data transmission of numeric and alphanumeric messages. Relative to cellular, paging is less expensive but does not offer voice or two-way communications capabilities.

Private Radio/SMR

Private radio has largely grown out of the need for dispatch and fleet companies to utilize internal radio systems. Private radio provides primarily two-way voice service to closed user groups, but may also provide interconnected and mobile data services. SMR is a subset of private radio with the distinguishing characteristic that service is provided on a commercial basis to businesses by carriers instead of the businesses owning their own systems.

Mobile Data

Several networks have been established, such as RAM's Mobitex™ and Motorola's ARDIS™, for the exclusive transmission of mobile data. Cellular, paging, and SMR operators are all considering ways in which to modify their networks to better handle two-way data transmission.

Personal Communications Services (PCS)

Using microcell technology, PCS includes a wide range of voice and data services. One-way outgoing PCS services, called CT-2, are licensed in several countries such as the U.K., Taiwan and the Netherlands.

The growth and evolution of mobile services show that subscribers migrate from basic limited services to more advanced services over time. The growth of terrestrial-based mobile services will increase the awareness and demand for enhanced mobile satellite services. Moreover, mobile satellite services will be able to provide service in areas that cannot be economically served using terrestrial networks.

III. Wireless Communications

As a result of the advances in technology, privatization, and decreasing prices on a world-wide basis, wireless communications have undergone a rapid increase in subscriber growth in the past several years. The result is that new enhanced wireless services tend to gain market acceptance more rapidly than did earlier wireless technologies. This phenomenon is attributable to the increasing functionality, value relative to price, and awareness among the population of each successive technology. Paging was introduced with only one-way, non-voice communications at a relatively high price. SMR provided two-way communications, but only within a closed user-group. Finally, cellular offered two-way interconnected voice with increasingly wide area coverage. The result of the rapid growth in wireless services worldwide builds an awareness and future demand for the benefits of advanced wireless communications.

IV. Mobile Satellite Services

Mobile satellite services are uniquely positioned to complete the evolution of wireless services. These services offer:

Ubiquitous Coverage

Satellites, by their very nature, provide the capability of global coverage. The economics of terrestrial-based networks is such that universal coverage is not a realistic goal.

Interconnection with Other Networks

Mobile satellite services will be able to interconnect with a number of voice and data networks, both wired and wireless, and therefore provide a wide array of services and network access.

Variety of Services

Mobile satellites will be able to support both voice and data terminals, depending upon the particular need of the user. In general, however, voice service will be expensive relative to data, due to the greater infrastructure required for voice communications and the generally greater efficiency of data communications.

Previous Systems

Several previous efforts to enhance world-wide communications capabilities are briefly described below. In European Patent Application No. 89 118 458.2, Bertiger et al. propose a low Earth orbit system for facilitating global cellular/trunked mobile communications.

Robert R. Newton disclosed a Multipurpose Satellite System in his U.S. Pat. No. 3,497,807. Newton describes a system in which "any point on earth is always within the line of sight of some satellite and any satellite is always within the line of sight of an adjacent satellite in the same orbital plane." See Newton, Column 2, Lines 4–7.

U.S. Pat. No. 4,135,156 by Sanders et al., entitled Satellite Communications System Incorporating Ground Relay Station Through Which Messages Between Terminal Stations Are Routed, contains a description of a "satellite relay communications system" that "includes a ground relay station arranged so that each message from one subscriber to another is relayed by the satellite relay to the ground relay, processed by the ground relay and then transmitted to the second subscriber by way of the satellite relay." See Sanders et al., Abstract, Lines 1–6.

Paul S. Visher disclosed a Satellite Arrangement Providing Effective Use of the Geostationary Orbit in his U.S. Pat. No. 4,375,697. His patent recites a "satellite squadron or cluster formation" which "is disposed in a predetermined location in . . . geostationary orbit . . . ." See Visher, Abstract, Lines 1–2.

In their U.S. Pat. No. 5,119,225, Michael Grant et al. explain their Multiple Access Communication System. The inventors disclose a system that incorporates "a node spacecraft" in geostationary orbit that works in combination with "several user spacecraft" in low Earth orbit. See Grant et al., Abstract, Lines 1–3.

Davis, in U.S. Pat. No. 5,121,503, discloses an invention that relates to a satellite signalling system, having signal coverage over a very wide area. The satellite signalling system comprises a satellite which is coupled to an antenna to provide a signal beam. The signal beam comprises a data signal having a data rate which can be varied.

In U.S. Pat. No. 5,099,235, Crookshanks discloses a method for transferring data through a network of intelligent control stations.

In U.S. Pat. No. 3,836,969, Bond et at. disclose a method for the selection of launch conditions for a satellite at substantially synchronous altitude above the Earth in a slightly inclined orbit relative to the Equatorial plane of the Earth to limit the inclination.

In U.S. Pat. No. 5,390,124, Kyrtsos describes how the accuracy of a vehicle position estimate generated using a satellite-based navigation systems is improved by accounting for non-linear errors in the vehicle position computations.

In U.S. Pat. No. 5,327,572, Freeburg provides a mechanism for networking satellite and terrestrial networks.

In PCT International Publication No. WO 88/022000, McGann discloses a mechanism for automatically maintaining a constant up-link effective irradiated RF power at a remote Earth station independent of the master station.

In U.S. Pat. No. 5,326,054, Turner discloses a man-made satellite travelling in an elliptical orbit.

In U.S. Pat. No. 5,319,374, Desai et al. disclose a method and apparatus for providing precise universal time coordination or synchronization for a plurality of vehicles that move within a selected geographic region and that communicate by radiowaves with one or more base stations located within or adjacent to the selected region.

In U.S. Pat. No. 3,340,531, Kefalas et al. disclose satellites operating in Equatorial, inclined and polar orbits. Communication between two transportable stations on Earth is shown as passing through a satellite repeater or relay. Kefalas et al. do not address the matter of time to forward messages because of the direct station-to-station nature of their system.

In U.S. Pat. No. 5,239,670, Schwendeman et al. disclose a plurality of ground-based relay stations, the relay stations connected to a telephone system and a control station which determines how paging information will be delivered to a user terminal which is a paging receiver. The paging receiver is capable only of receiving a satellite signal and not transmitting a message to the satellite. Schwendeman et al.

do not show the relay stations to be located particularly at polar, mid-latitude and Equatorial regions. Neither described or suggested are satellites operating in an Equatorial or an inclined low Earth orbit.

Schwendeman et al. do not recognize the combination of Equatorial, and inclined orbits and Equatorial, mid-latitude and polar relay stations which is key to a satellite system that minimizes the time to store and forward a message from an originating station to a destination station when the stations are over the radio horizon from one another. The separation of stations could be as far as one-half the circumference of the Earth. It is not inherent in such a system that relays be located near the poles in order to transfer a message between stations at high latitudes an diverse longitudes to satellites in steeply inclined orbits, which orbits intersect at or pass near the polar regions but diverge rapidly in longitude as they approach the Equator. Further, it is not inherent in such a system that relays be located in the Equatorial region in order to transfer a message between stations at lower latitudes and diverse longitudes to satellites in Equatorial orbit which rapidly traverse longitude as they proceed from the originator.

None of the systems described above are capable of supplying a very low cost yet worldwide store-and-forward non-voice communications network that does not require expensive and complex terrestrial or geosynchronous satellite equipment. The development of such a system would constitute a major technological advance and would satisfy a long felt need in the electronics and telecommunications industries.

SUMMARY OF THE INVENTION

One of the embodiments of the present invention is a satellite system that includes six to fourteen satellites which operate in a single Equatorial orbit. These satellites flying over the Equator are capable of providing communications services to locations on the Earth which are within thirty degrees of the Equator. This embodiment is designed to furnish service to Mexico and to a large number of developing countries.

Another embodiment of the invention utilizes both this single orbit plane occupied by satellites operating over the Equator in combination with other satellites moving in polar or inclined orbits. The embodiment that combines satellites in Equatorial, polar and inclined orbits will provide a wide variety of data services to virtually any point on the globe.

The satellites are designed to operate in a circular low Earth orbit at an altitude of from 800 to 1,852 kilometers. They are also capable of speeding messages around the globe either by working in combination with relay stations on the ground, transferring message payloads across different orbits via the relay stations or through the use of inter-satellite links.

The systems disclosed below are unique in their ability to provide affordable worldwide service, resulting in a competitive advantage over other terrestrial and previous satellite-based service providers.

The present invention is designed to supply affordable Non-Voice, Non-Geostationary Mobile Satellite Service (NVNG MSS) in several markets:

TracSat™: Tracking and monitoring for the transportation industry.

SecurSat™: Fixed site monitoring of industrial/utility locations, monitoring and tracking for misplaced or stolen assets.

MailSat™: Transmission of e-mail.

PageSat™: Two-way alphanumeric paging.

EmerSat™: Emergency services.

The services, demand and markets for each are described below and summarized are in Tables A1 and A2.

TABLE A1

Services and Demand Segments

| Segment | Service | Message Type | Description |
|---|---|---|---|
| Transportation | TracSat™, SecurSat™ | Short, frequent status and location messages | Messaging and location for trucking, maritime and railroads |
| Remote monitoring | Secursat™ | Short telemetry messages and status monitoring | Pipeline, environmental and agricultural monitoring |
| Industrial/utility | SecurSat™ | Short telemetry messages and status monitoring | Monitor plant facilities, utilities and meters in remote locations |
| Personal/business communications | MailSat™, PageSat™ | Alpha-numeric messages, short-medium length E-mail messages | Alpha-numeric paging, E-mail and mobile computing for frequent business travelers |
| Commercial/residential security | SecurSat™, EmerSat™ | Short alarm notification messages | Stolen assets and security breaches; accident notification, etc. |

TABLE A2

U.S. Domestic Market for NVNG MSS Services:
(All entries in U.S. Dollars)

| TracSat™ | |
|---|---|
| Trucking | 2.5 MM |
| Maritime | |
| Commercial | 50 K |
| Yachts | 50 K |
| Recreational | 370 K |
| Boxcars and containers | 5 MM |
| SecurSat™ | |
| Oil and gas wells | 900 K |
| Pipeline monitoring sites | 220 K |
| Government data gathering stations | 100 K |
| Utility meters | 150 MM |
| MailSat™ | |
| Frequent business travelers | 1 MM |
| PageSat™ | |
| Nationwide paging subscribers | 240 K |
| EmerSat™ | |
| Emergency road service subscribers | 50 MM |

An appreciation of other aims and objectives of the present invention and a more complete and comprehensive understanding of this invention may be achieved by studying the following description of a preferred embodiment and by referring to the accompanying drawings.

A BRIEF DESCRIPTION OF THE DRAWINGS

Figure 4:
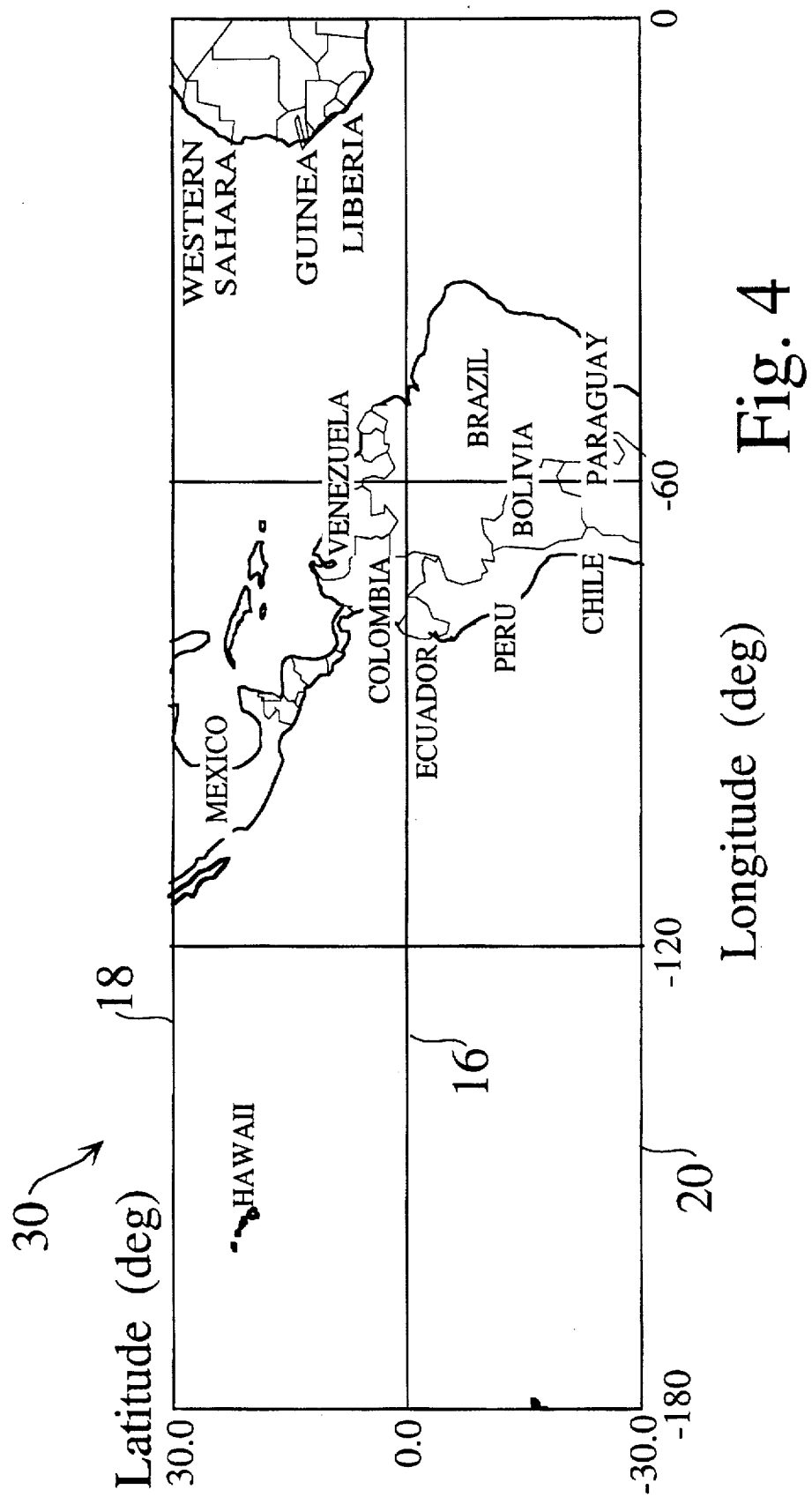
Figure 5:
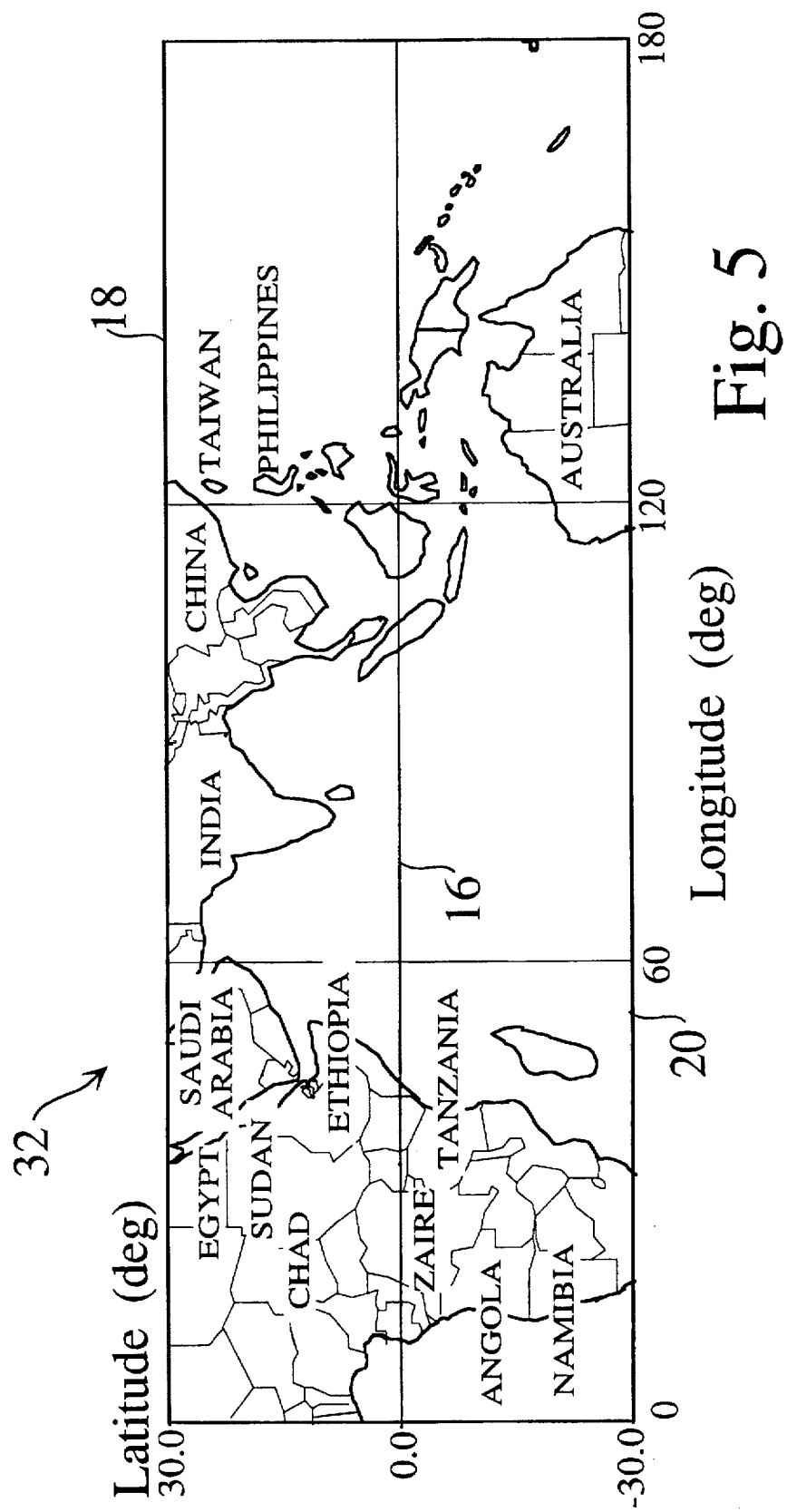

FIGS. 4 and 5 are sections of Mercator projections of the Earth's surface showing the areas of coverage between 30 degrees North and 30 degrees South latitude for satellites operating in Equatorial orbit.

Figure 6:
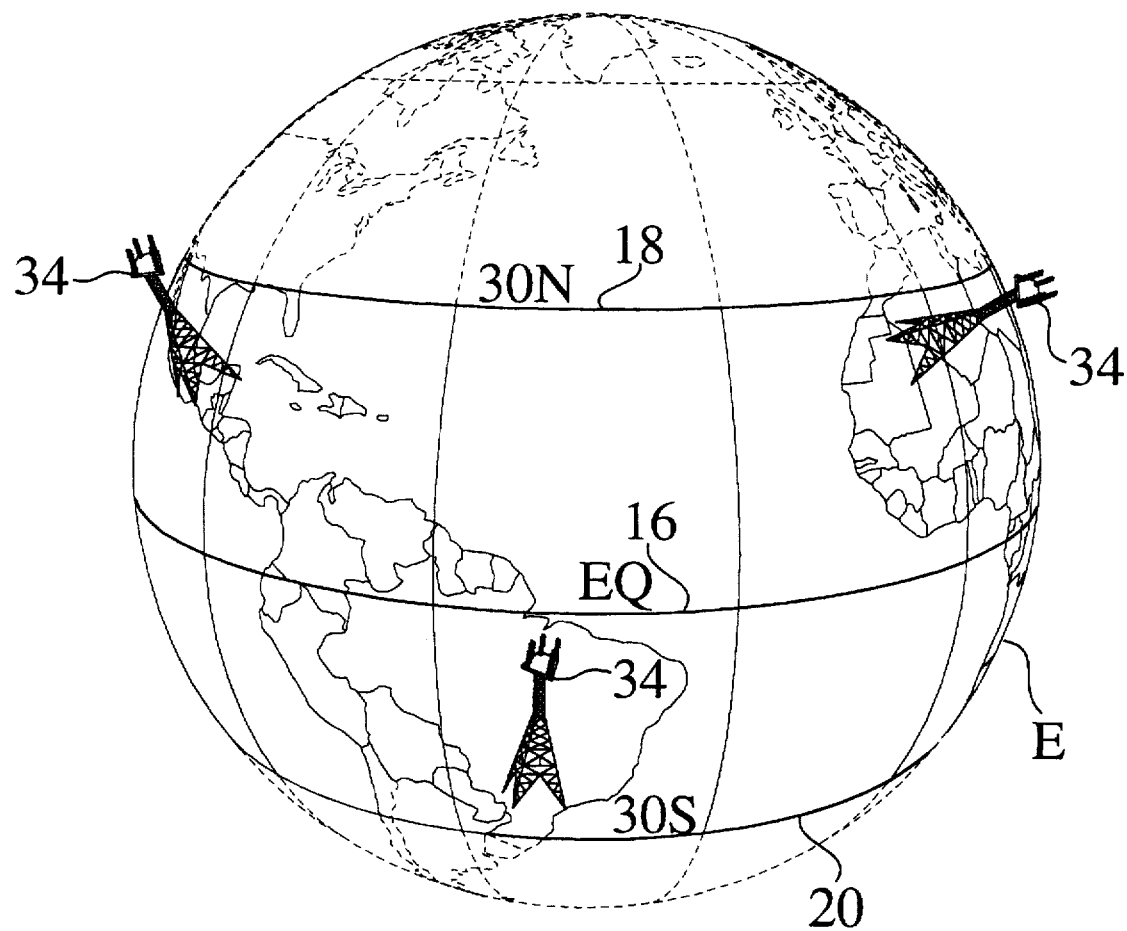

FIG. 6 depicts Equatorial relay stations located on the ground between 30 degrees North and South latitude.

Figure 7:
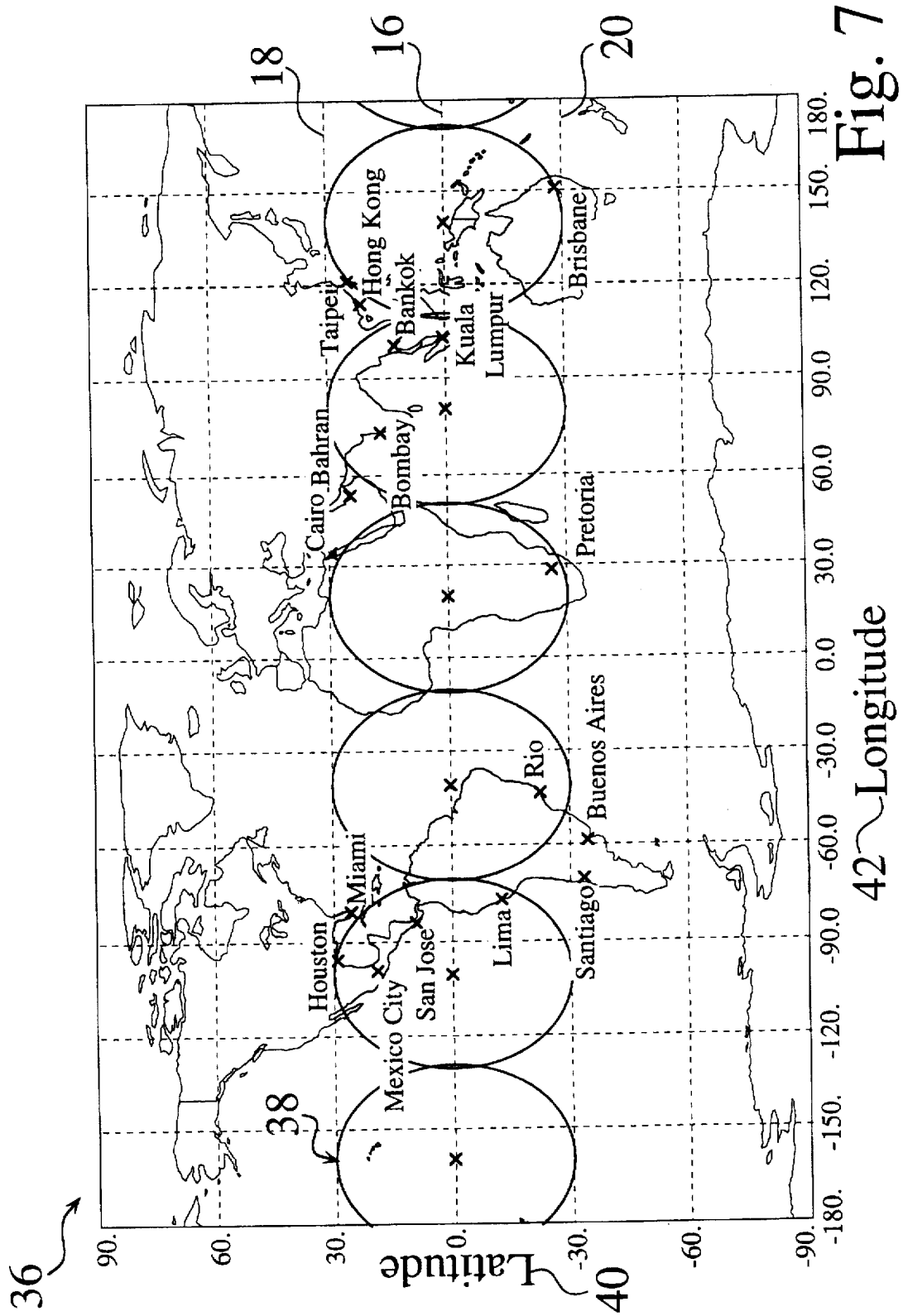
Figure 8:
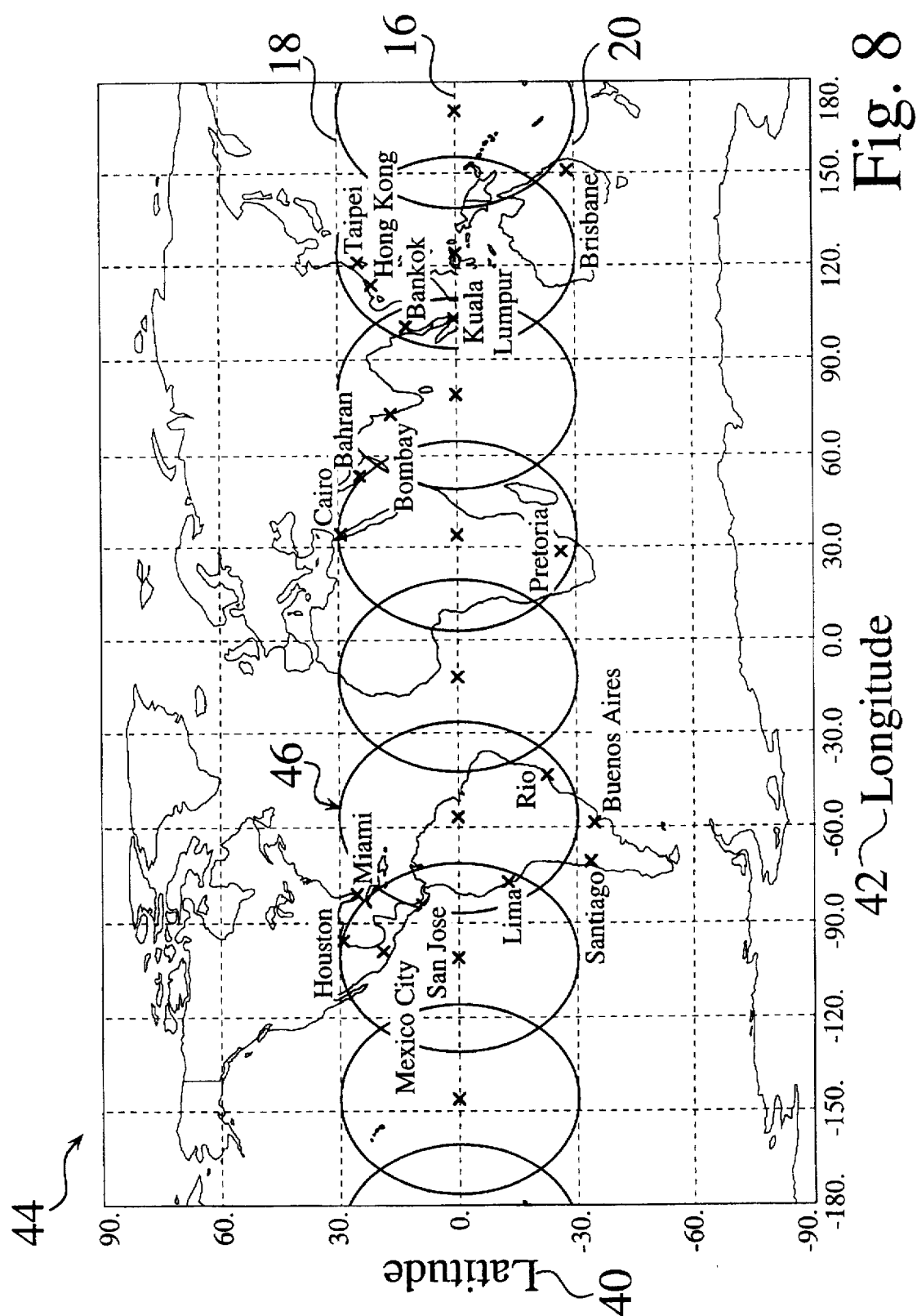
Figure 9:
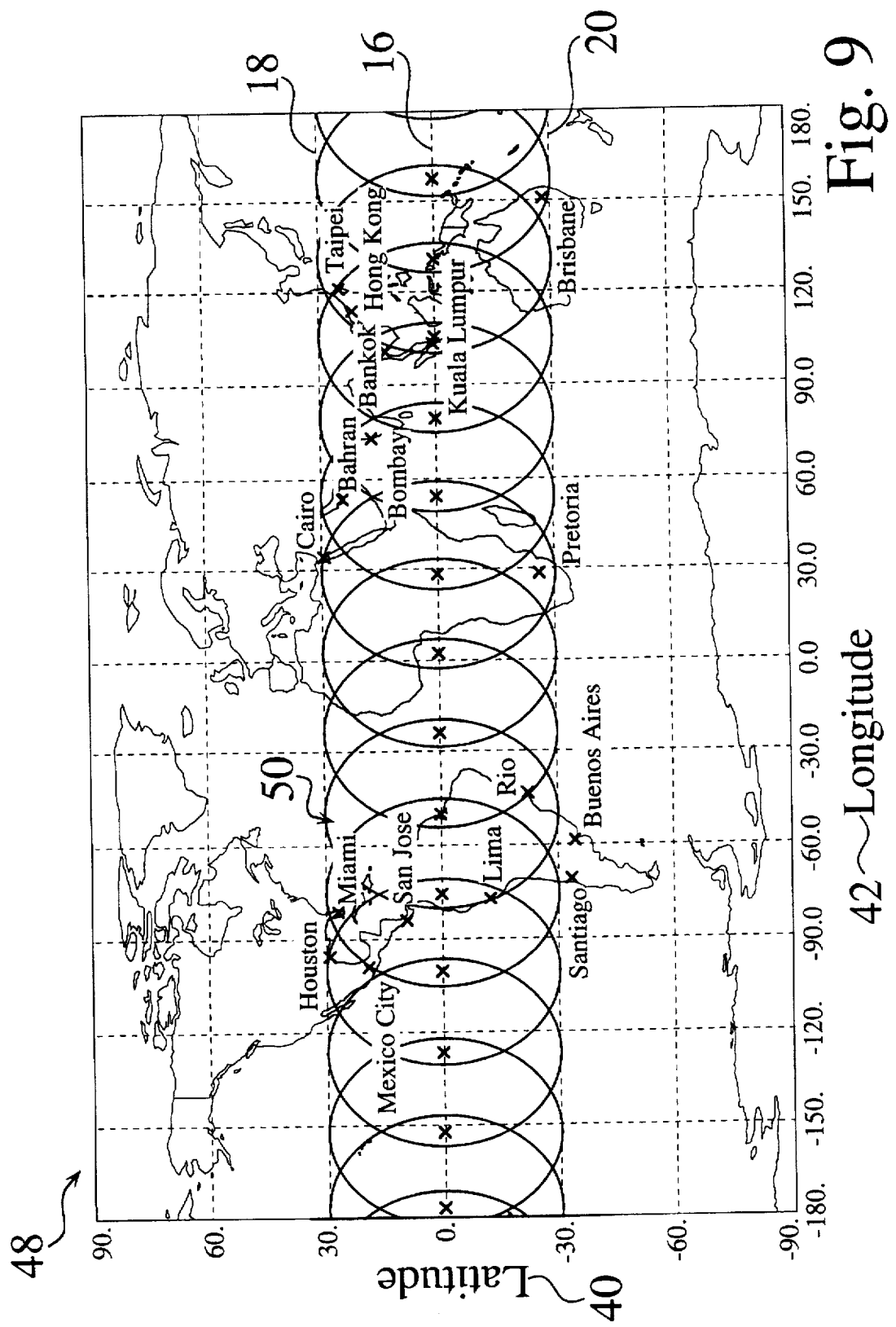

FIGS. 7, 8 and 9 show satellite footprints for constellations that include six, eight and fourteen satellites in Equatorial orbit.

Figure 10:
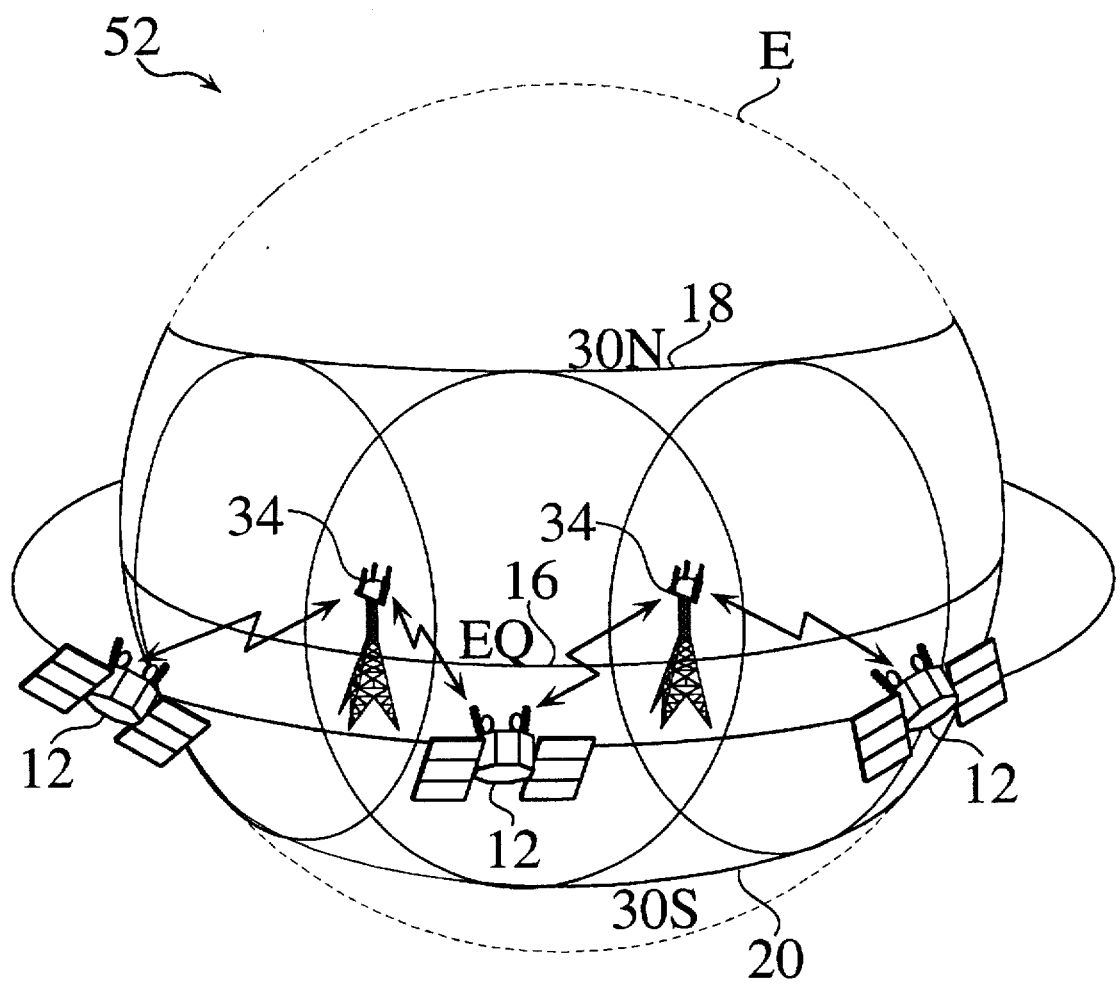

FIG. 10 reveals the use of ground stations to relay data between satellites in Equatorial orbit.

Figure 11:
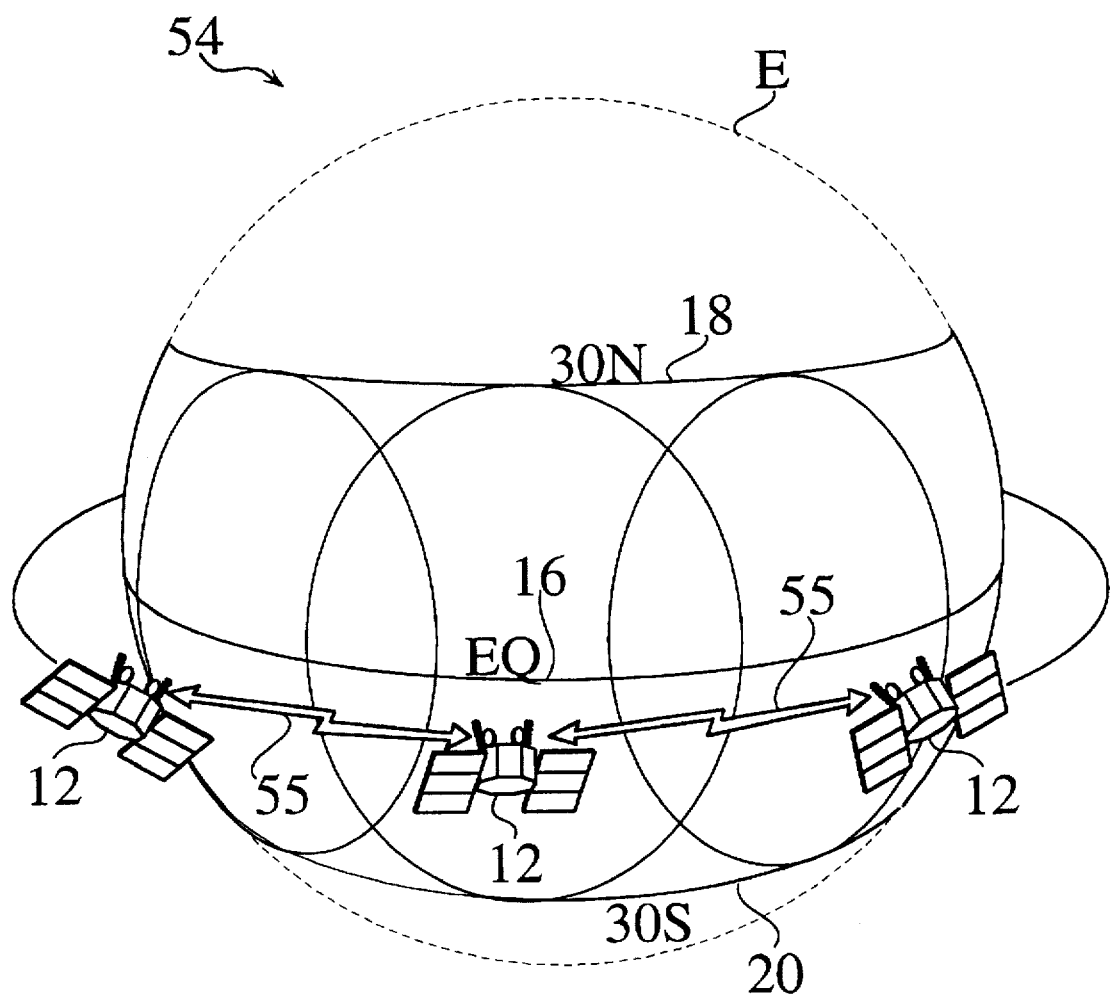

FIG. 11 illustrates the use of inter-satellite links to relay data between satellites in Equatorial orbit.

Figure 12:
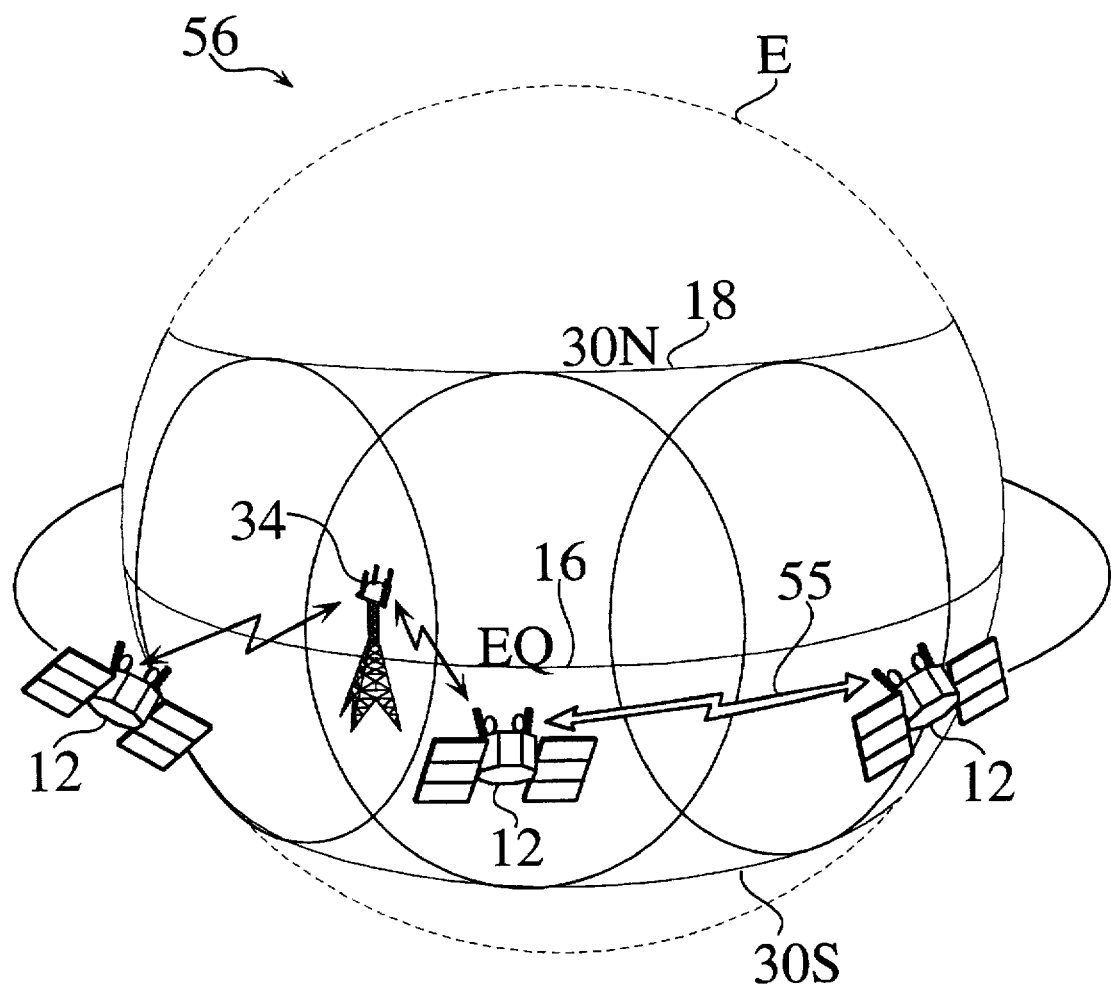

FIG. 12 reveals the use of both ground stations and inter-satellite links to relay data between satellites in Equatorial orbit.

Figure 13:
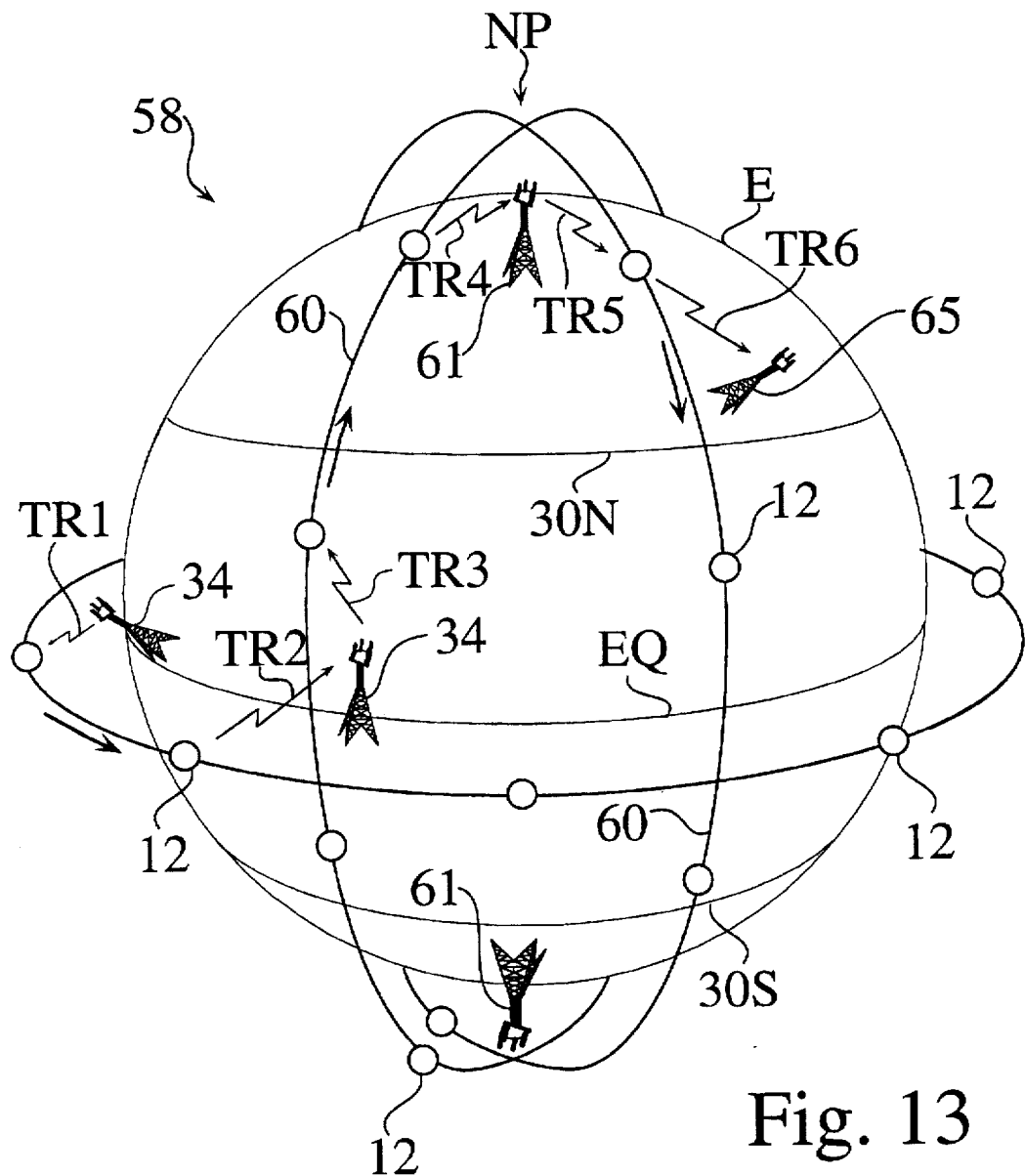

FIG. 13 exhibits a mixed constellation of satellites in both Equatorial and polar orbits that work in combination with relay stations located near the poles and near the Equator.

Figure 14:
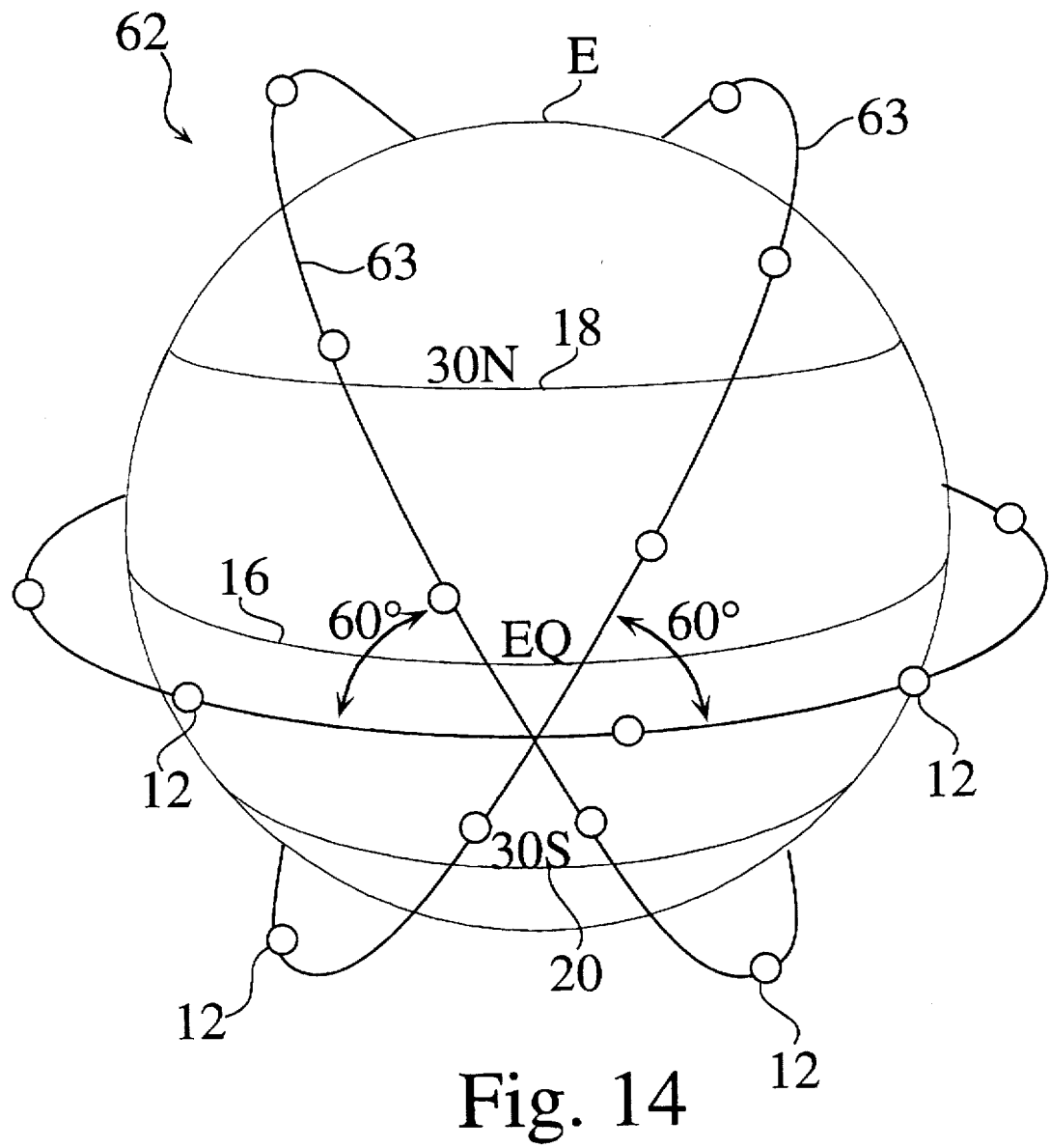

FIG. 14 depicts another mixed constellation of satellites which includes Equatorial orbits and orbits that are inclined sixty degrees to the Equator.

Figure 15A:
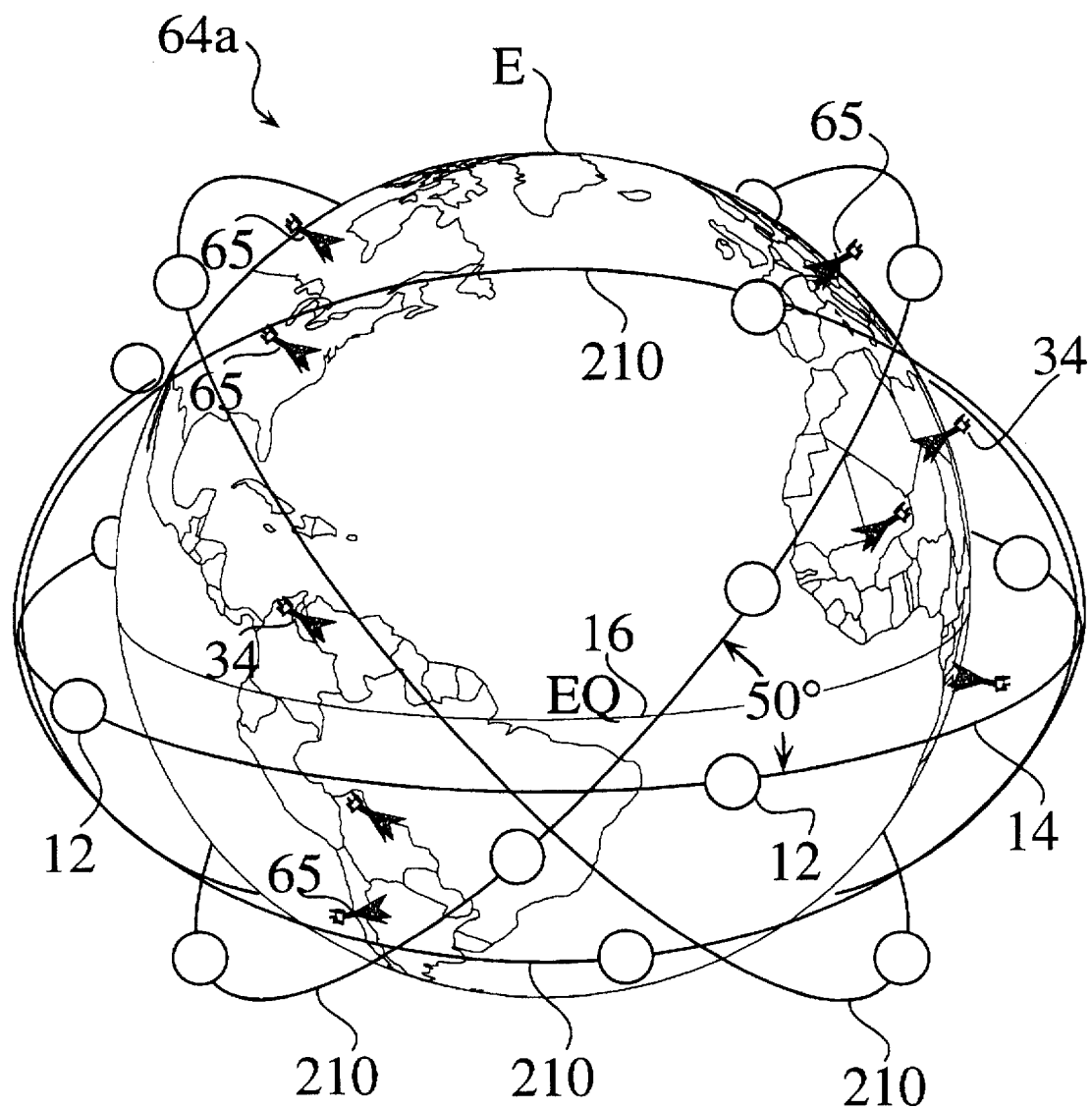

FIG. 15A depicts another mixed constellation of satellites which includes Equatorial orbits and orbits that are inclined fifty degrees to the Equator.

Figure 15B:
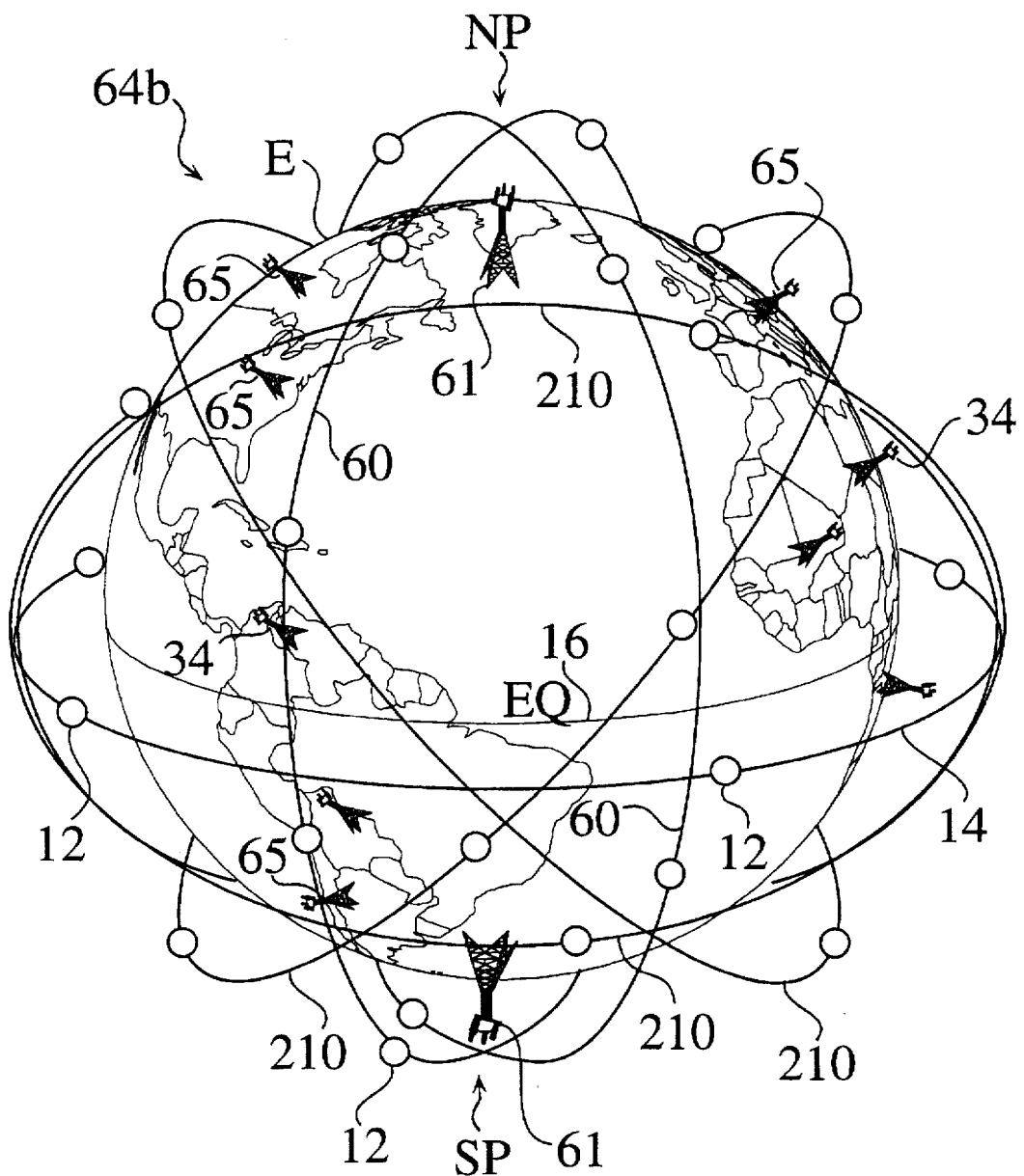

FIG. 15B depicts yet another mixed constellation of satellites including Equatorial, polar and inclined orbits.

Figure 16:
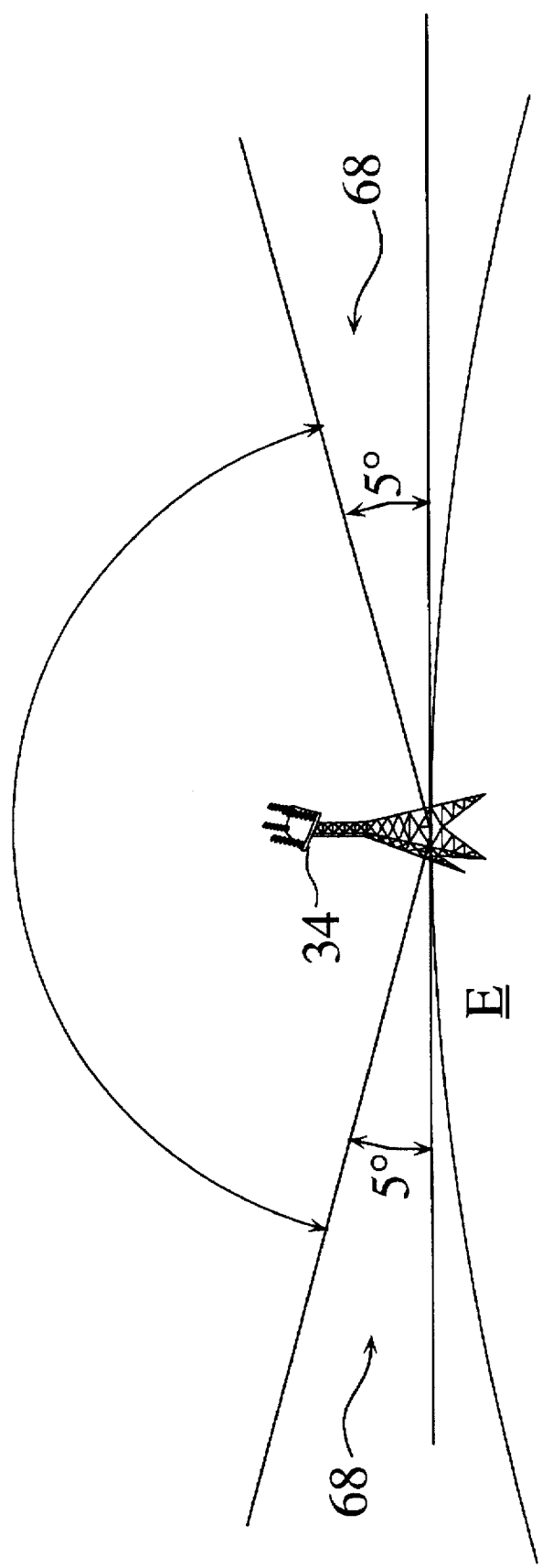

FIG. 16 shows a ground relay station and the five degree elevation angle required by one of the embodiments of the invention.

Figure 17:
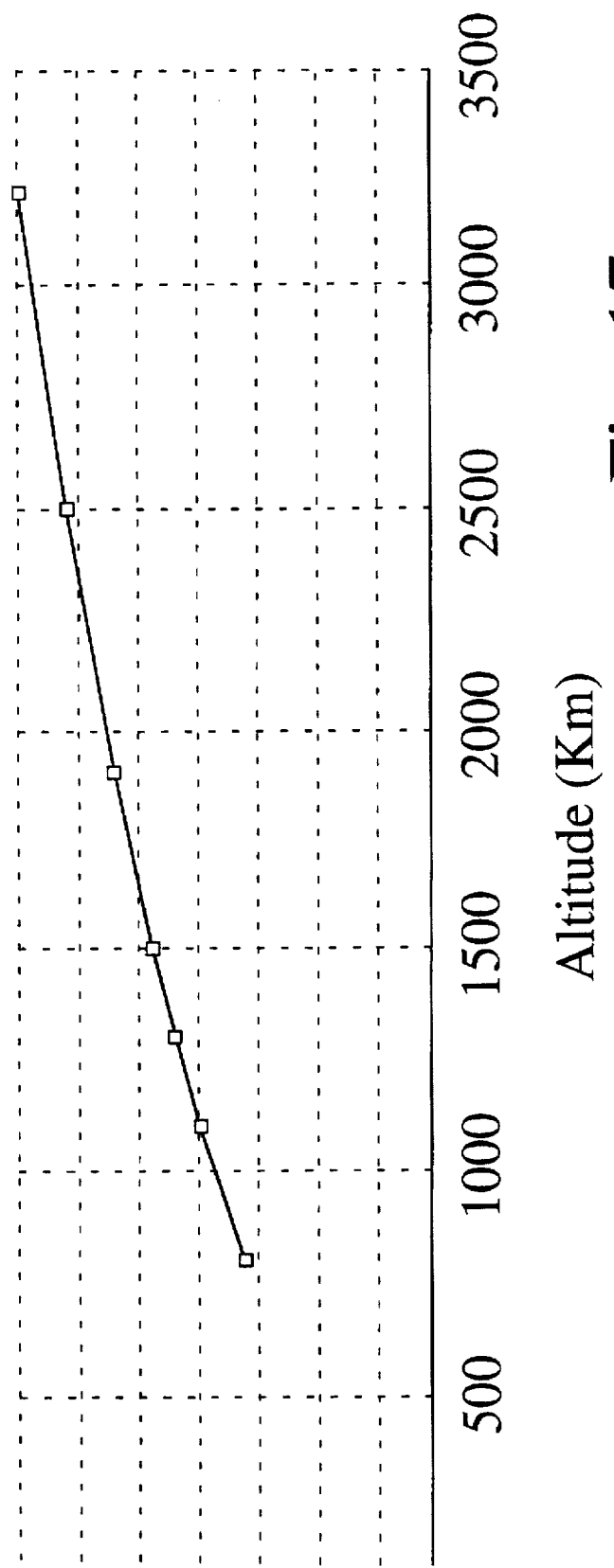

FIG. 17 is a graph of latitudinal reach versus altitude from an Equatorial orbit to a fifteen degree elevation angle.

Figure 18:
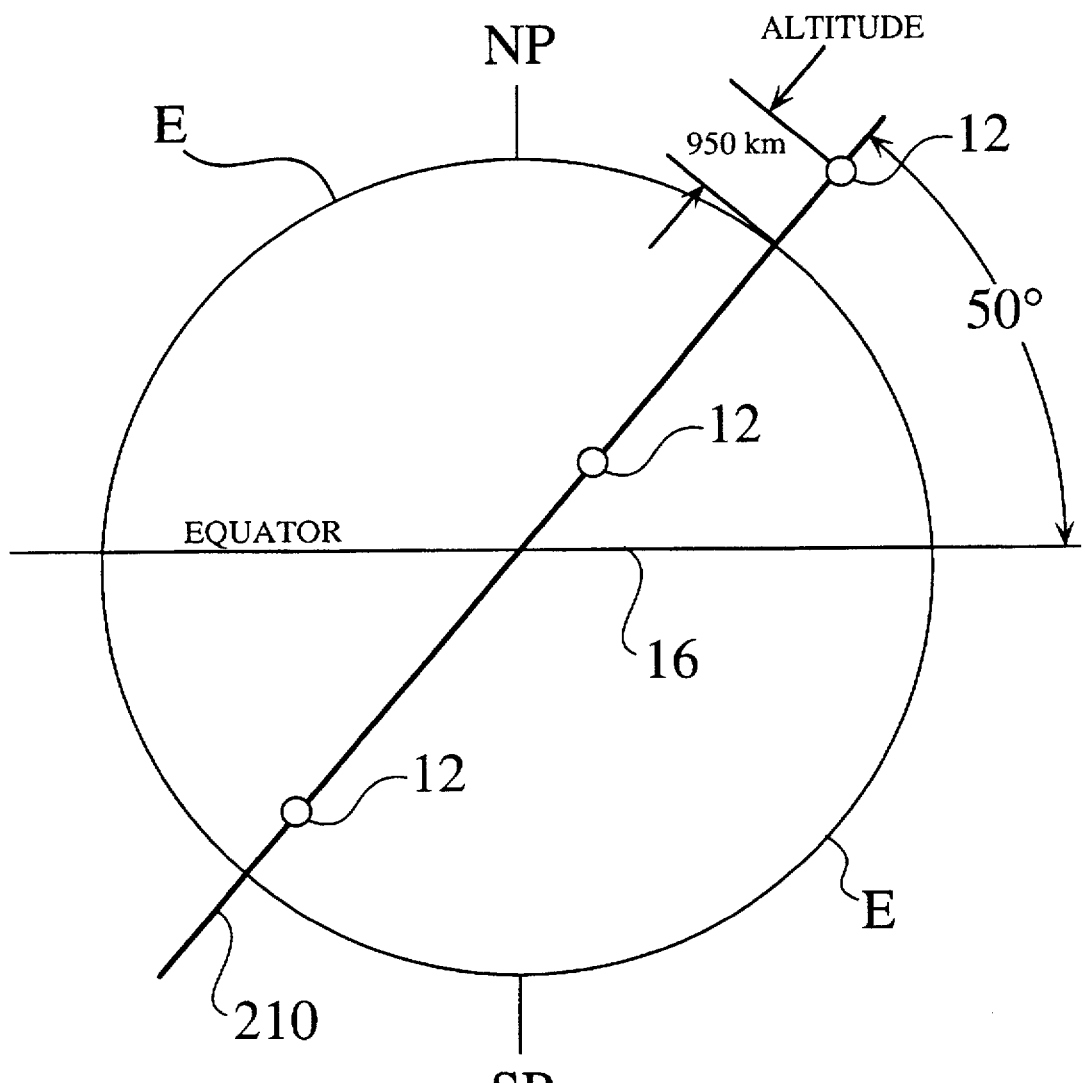

FIG. 18 is a diagram of one orbital plane inclined at fifty degrees to the Equator, illustrating a typical orbital altitude of 950 kilometers.

Figure 19:
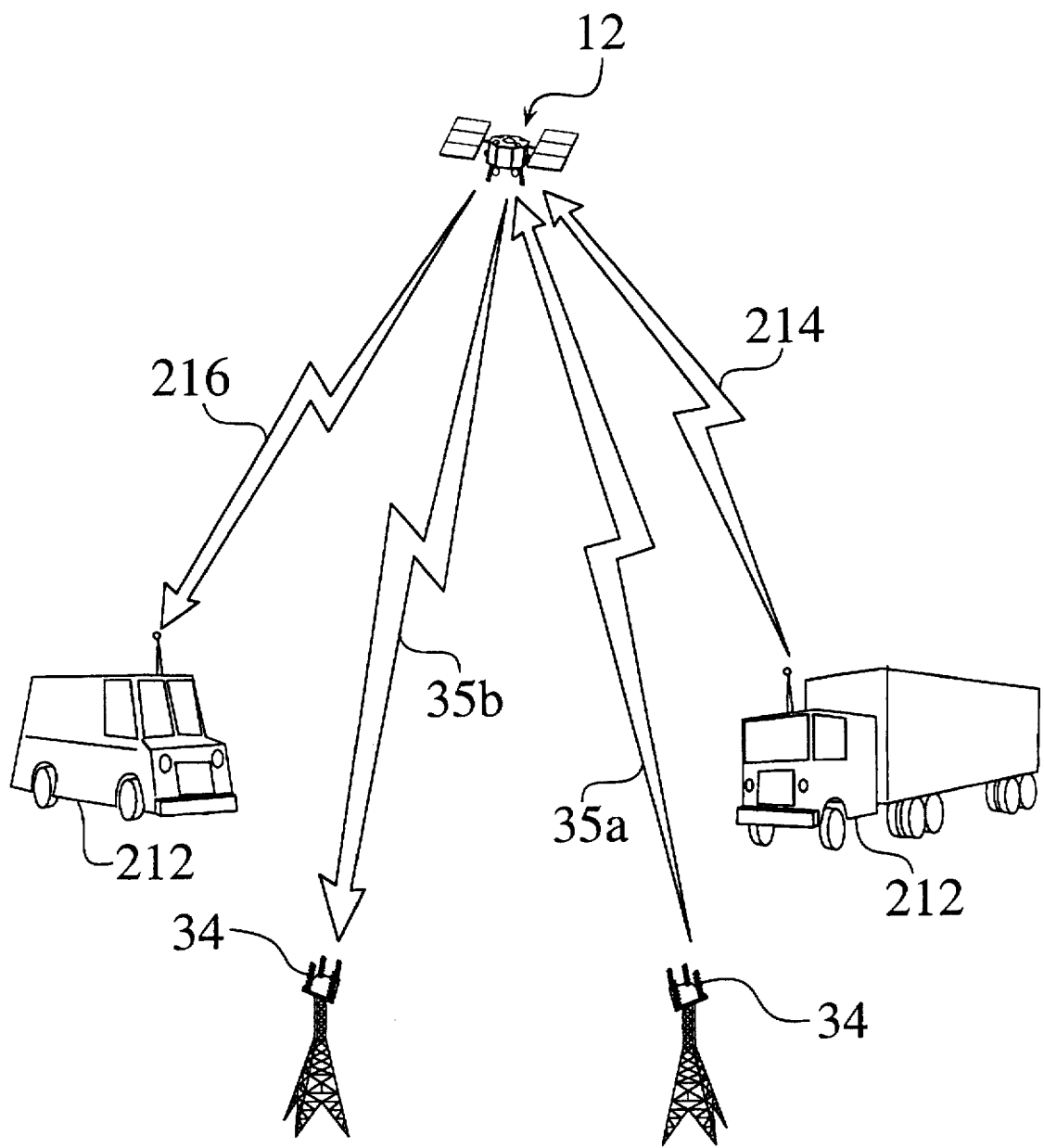

FIG. 19 is a diagram of a satellite communicating with relay stations and user terminals by means of uplink and downlink transmissions.

Figure 20:
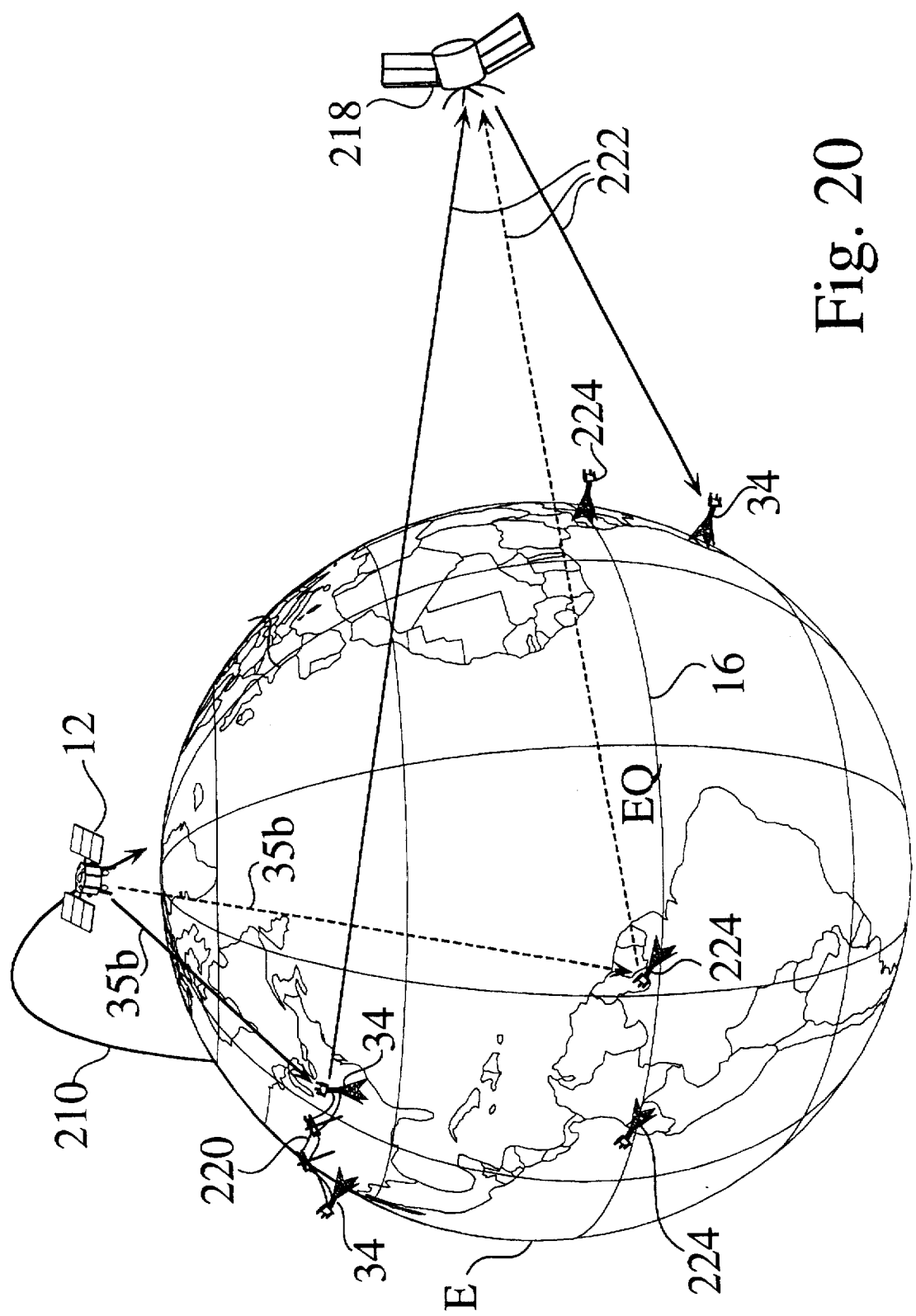

FIG. 20 is a diagram showing various methods of relaying messages and data between relay stations.

Figure 21:
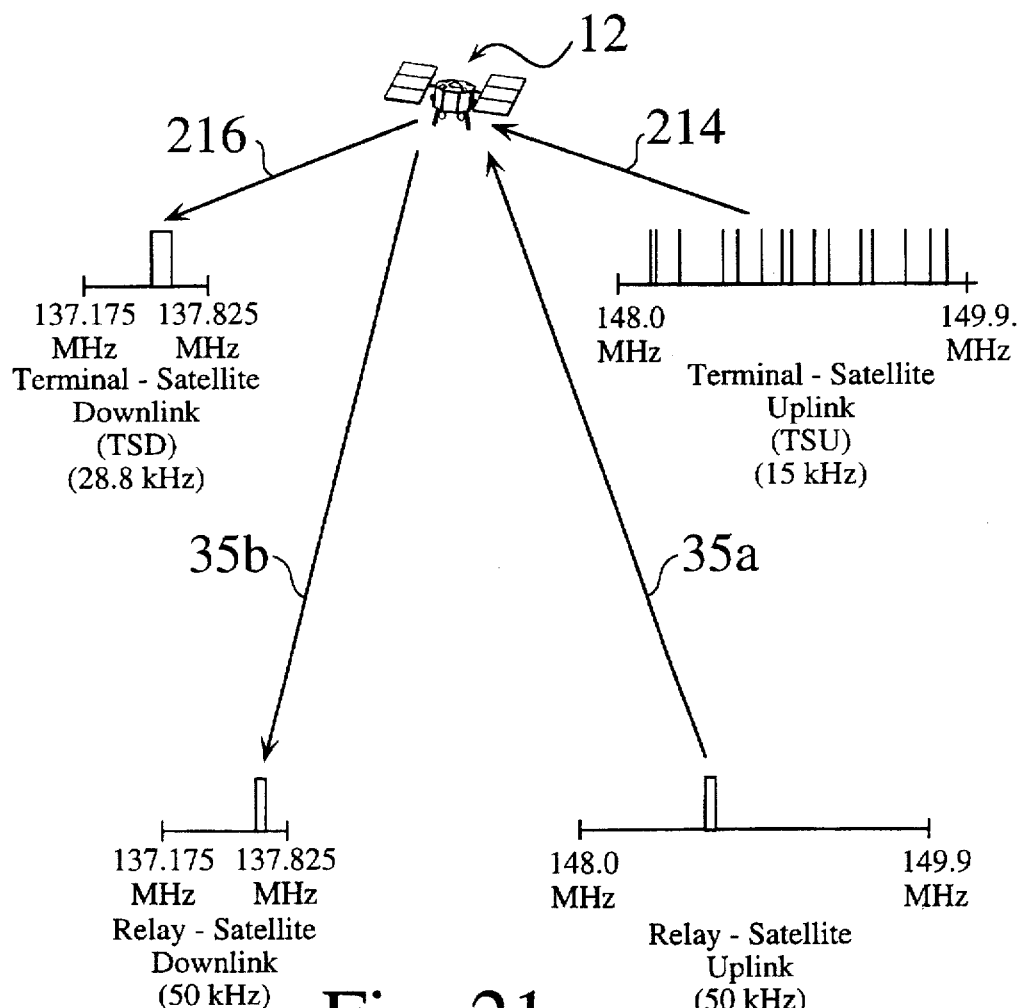

FIG. 21 depicts the frequencies and bandwidths used in uplink and downlink transmissions between a satellite, a relay station and a user terminal.

Figure 22:
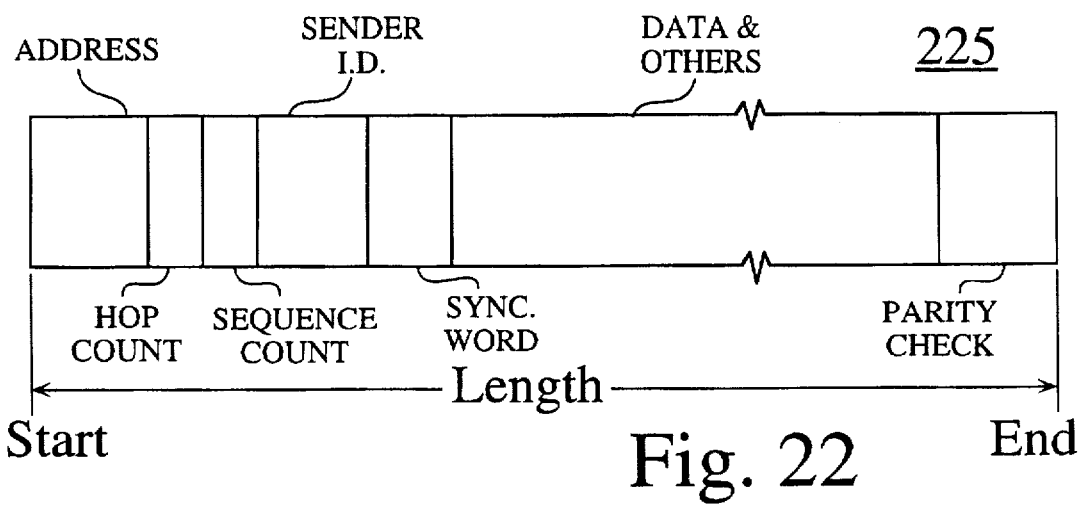

FIG. 22 is a diagram of the structure of a data packet.

Figure 23:
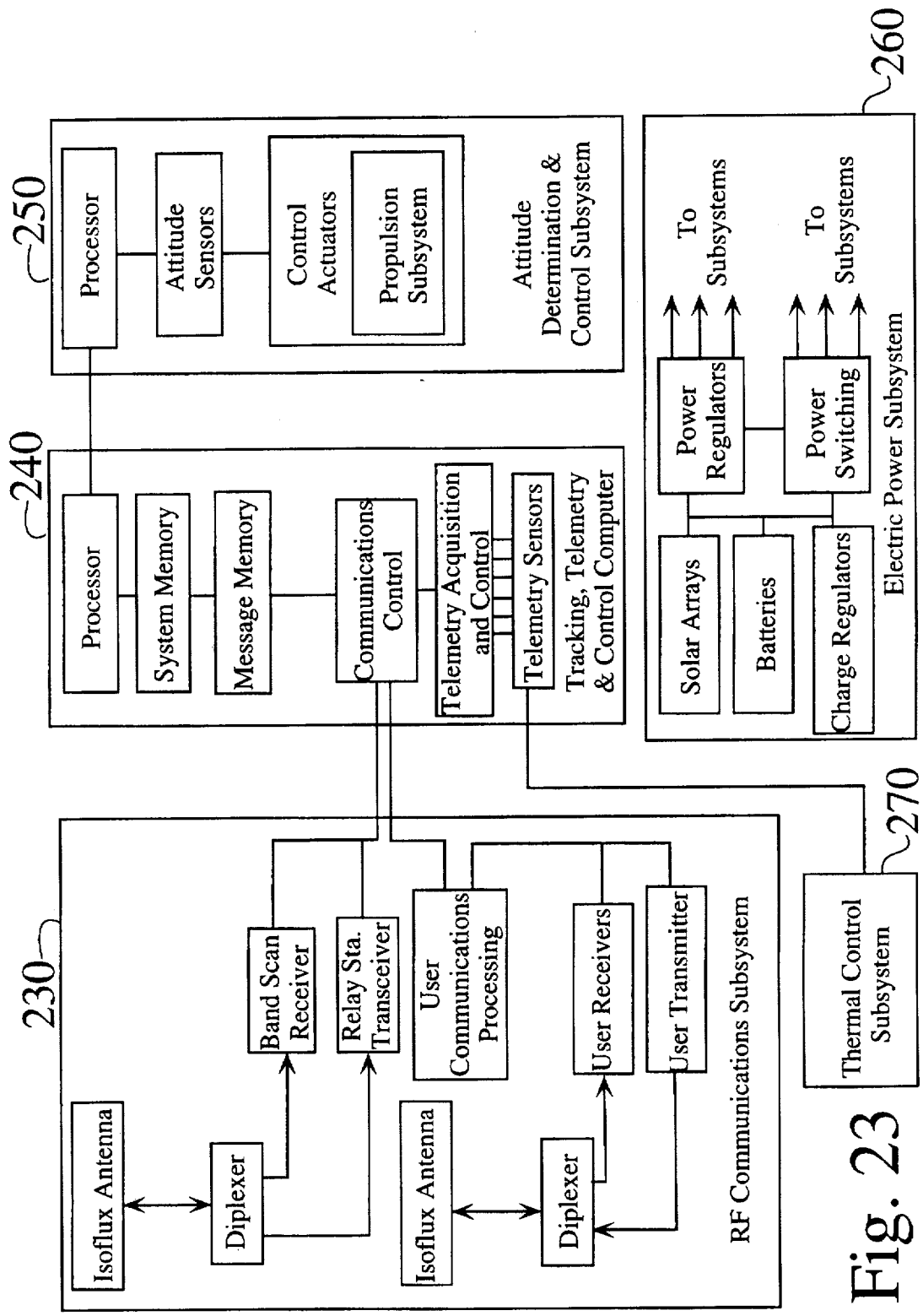

FIG. 23 is a functional block diagram of the satellite subsystems and their interconnections.

Figure 24:
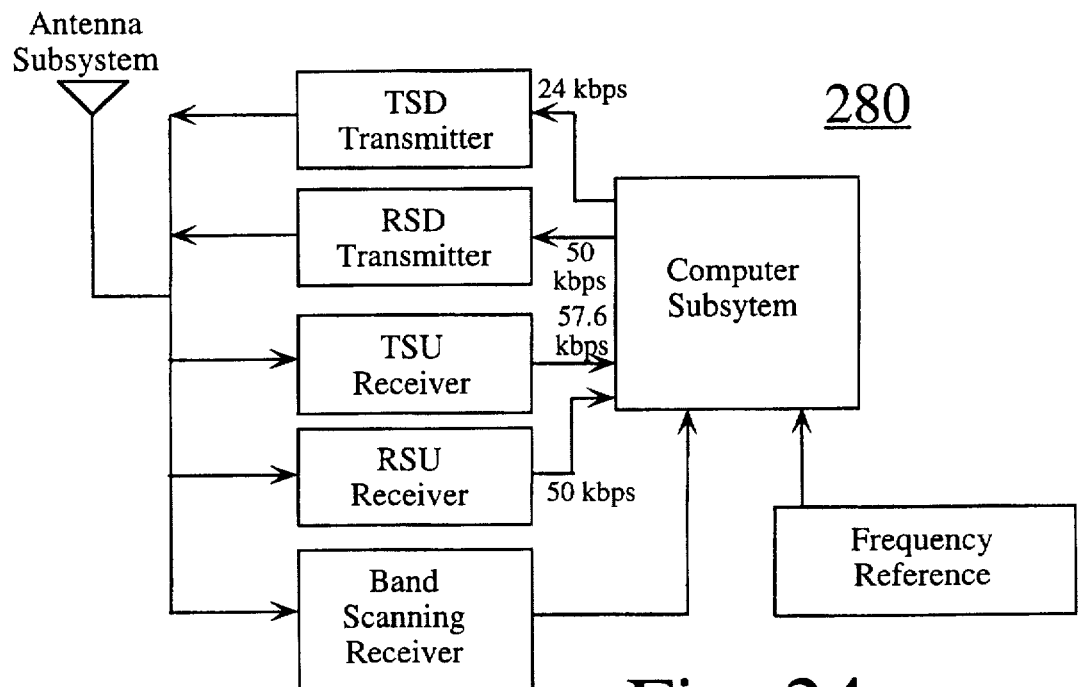

FIG. 24 is a functional block diagram of the message or "communications payload".

Figure 25:
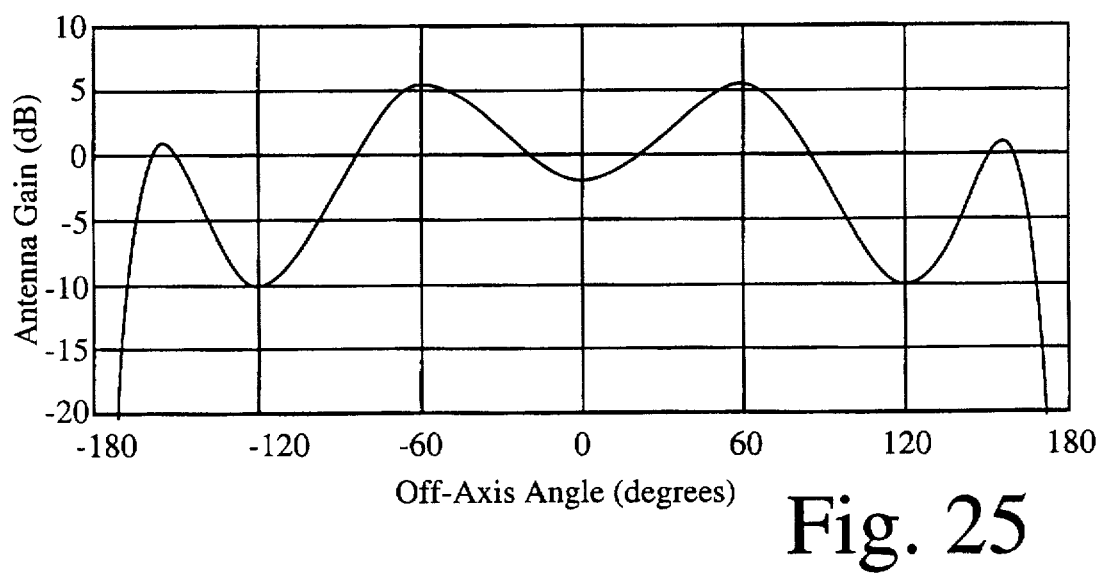

FIG. 25 is shows the satellite antenna gain pattern.

Figure 26:
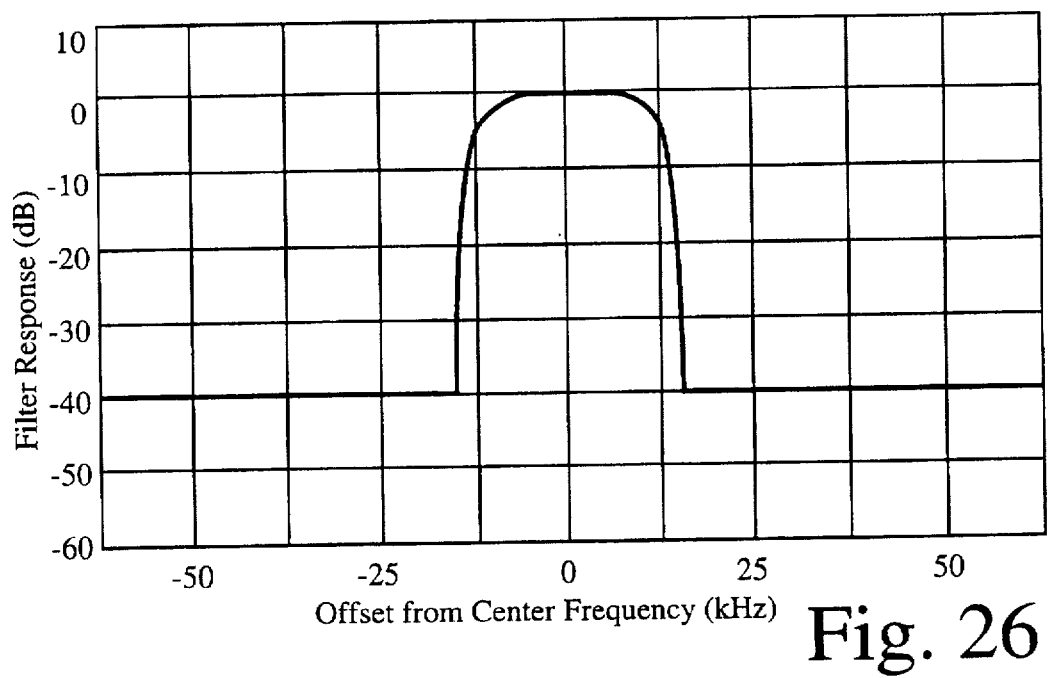

FIG. 26 depicts the response characteristics of the terminal-to-satellite downlink transmit filter.

Figure 27:
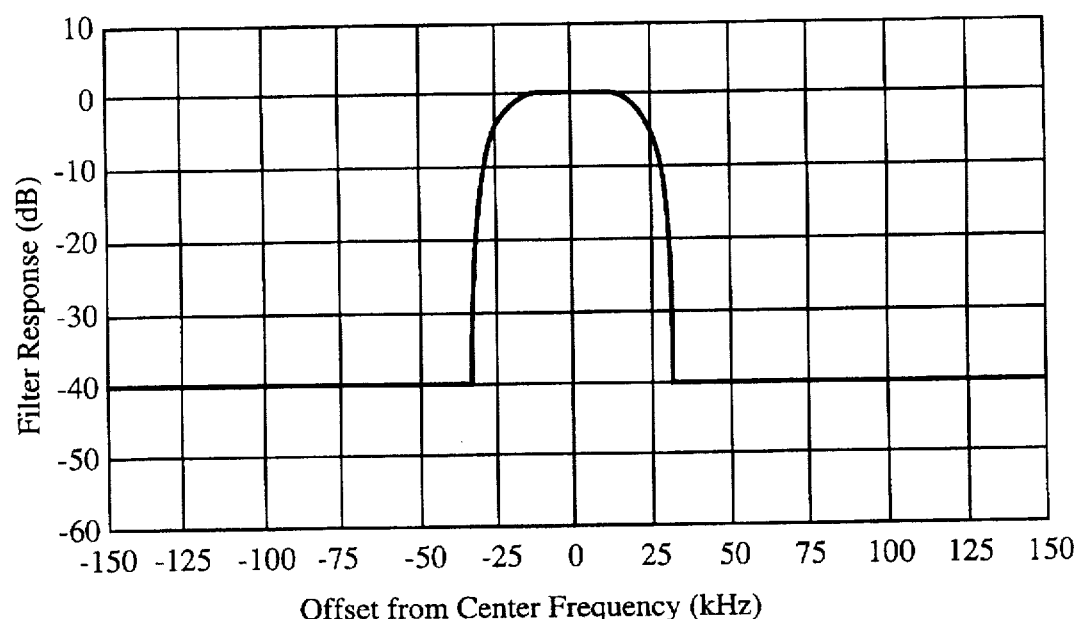

FIG. 27 depicts the response characteristics of the relay station-to-satellite downlink transmit filter.

Figure 28:
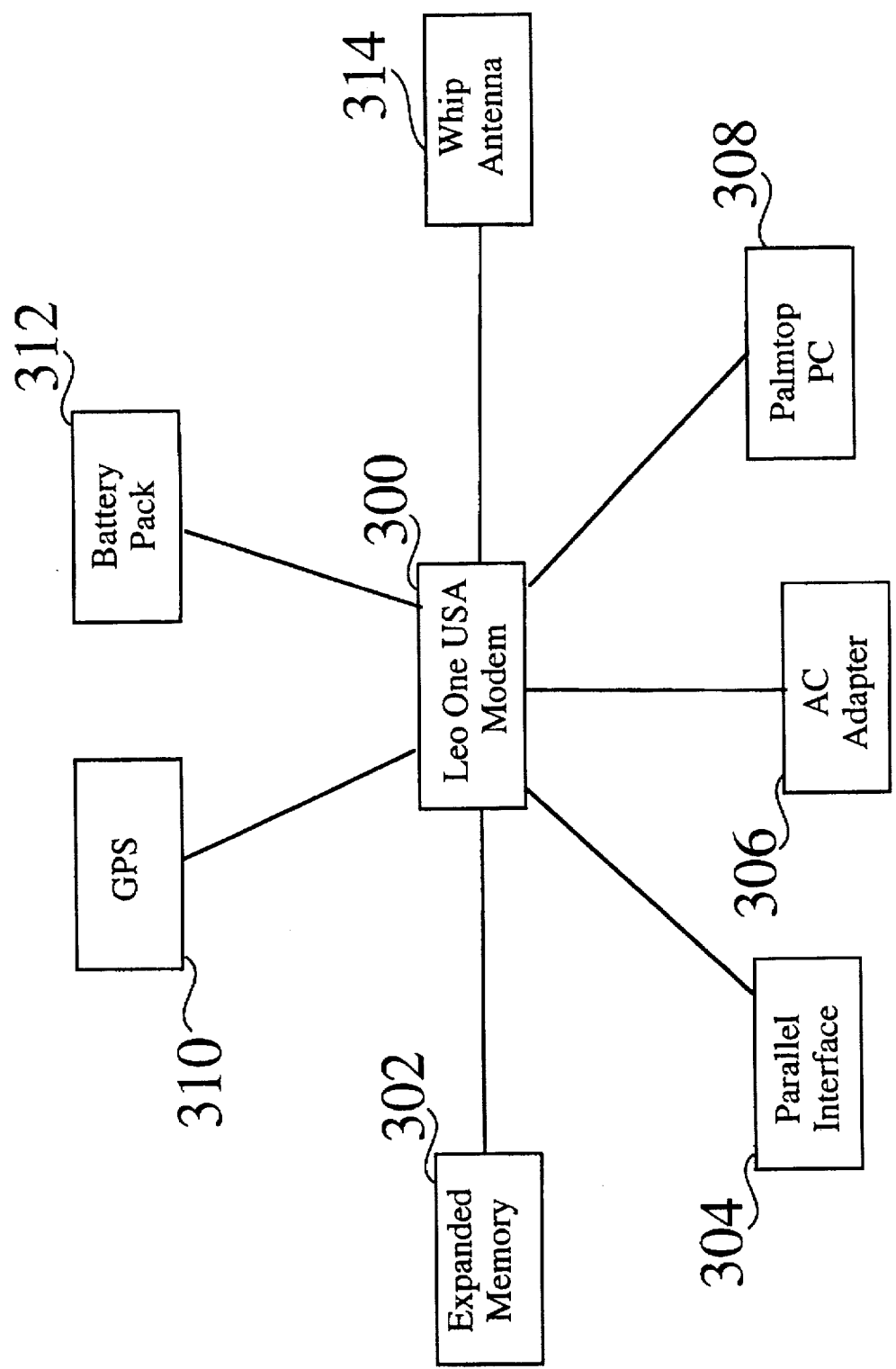

FIG. 28 is a diagram showing possible combinations of the modem module with other modules in a user terminal.

Figure 29:
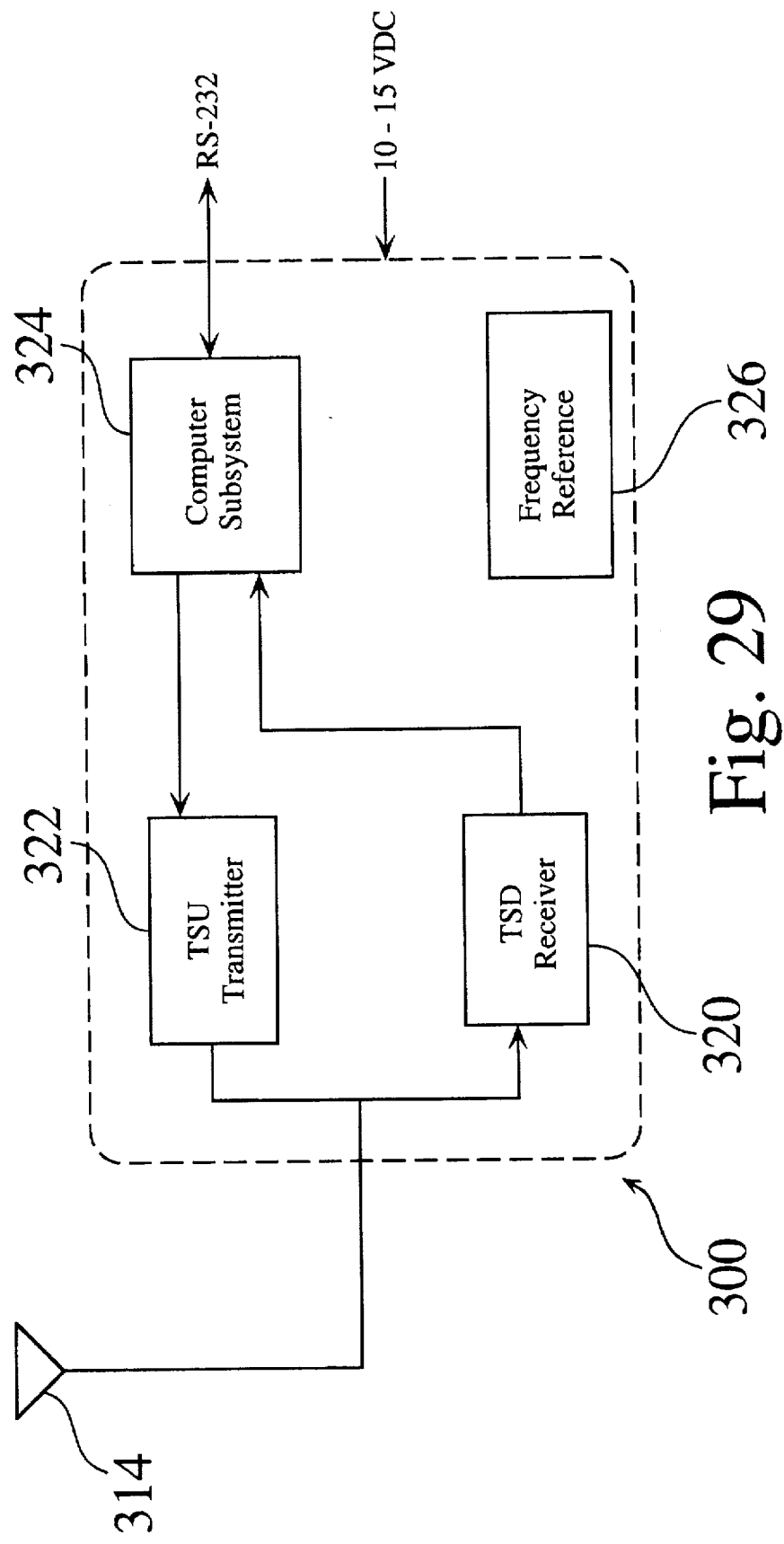

FIG. 29 is a block diagram of the modem module.

Figure 30:
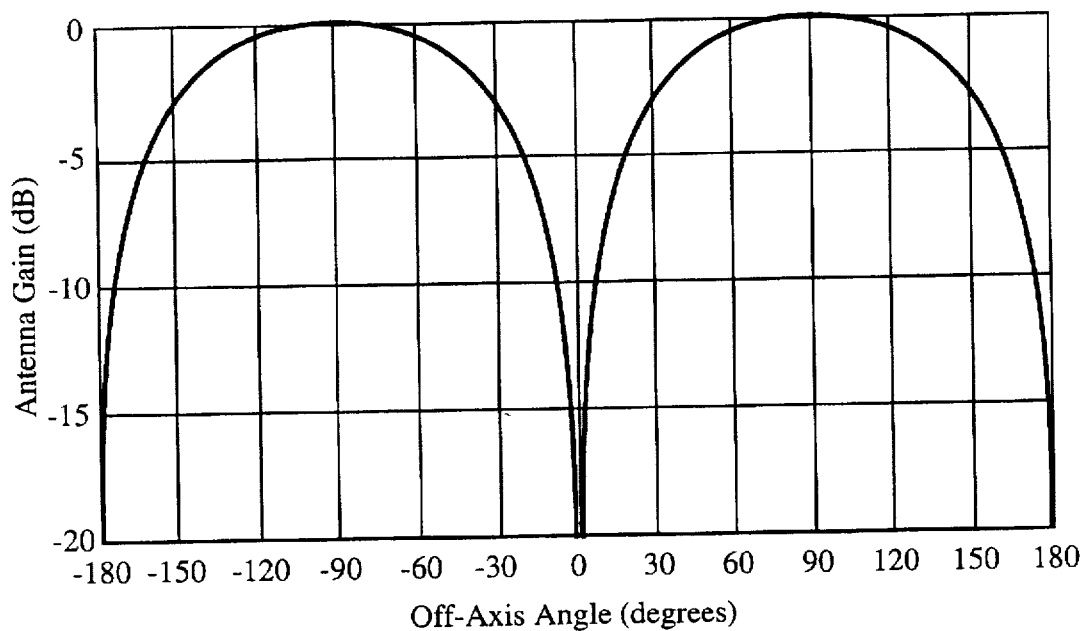

FIG. 30 is a diagram of the gain pattern of a typical user terminal antenna.

Figure 31:
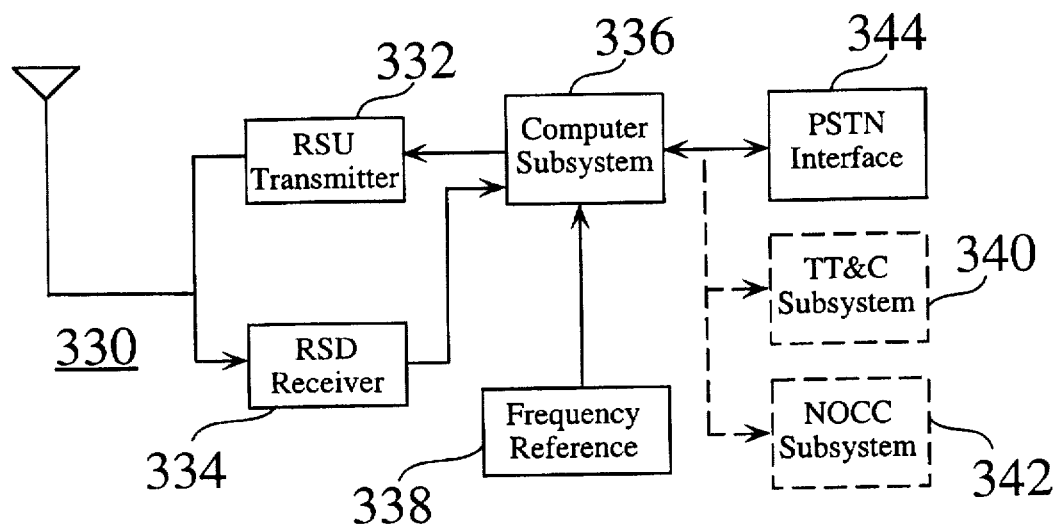

FIG. 31 is a functional block diagram of a relay station.

Figure 32:
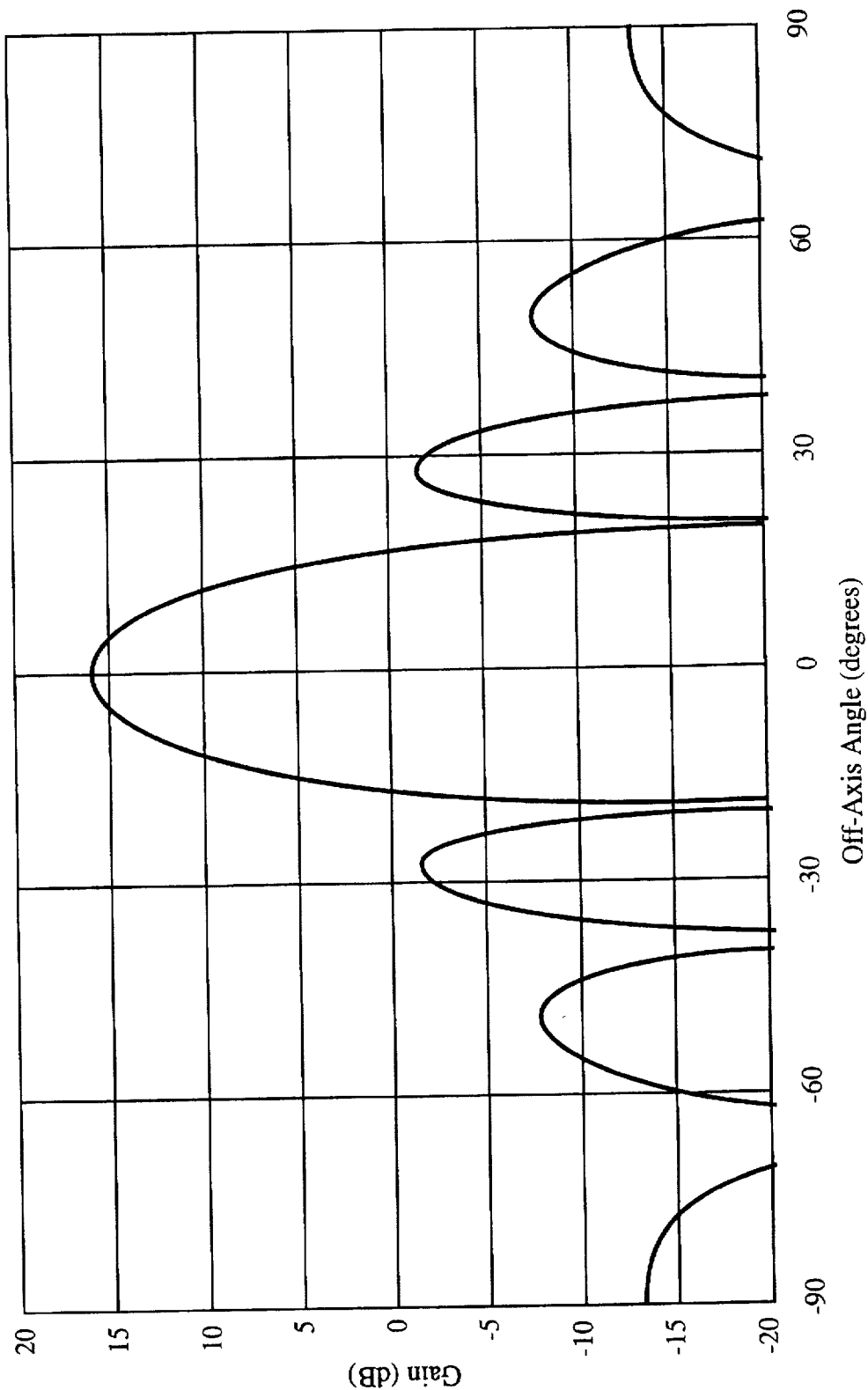

FIG. 32 depicts a typical gain pattern of a relay station antenna.

Figure 33:
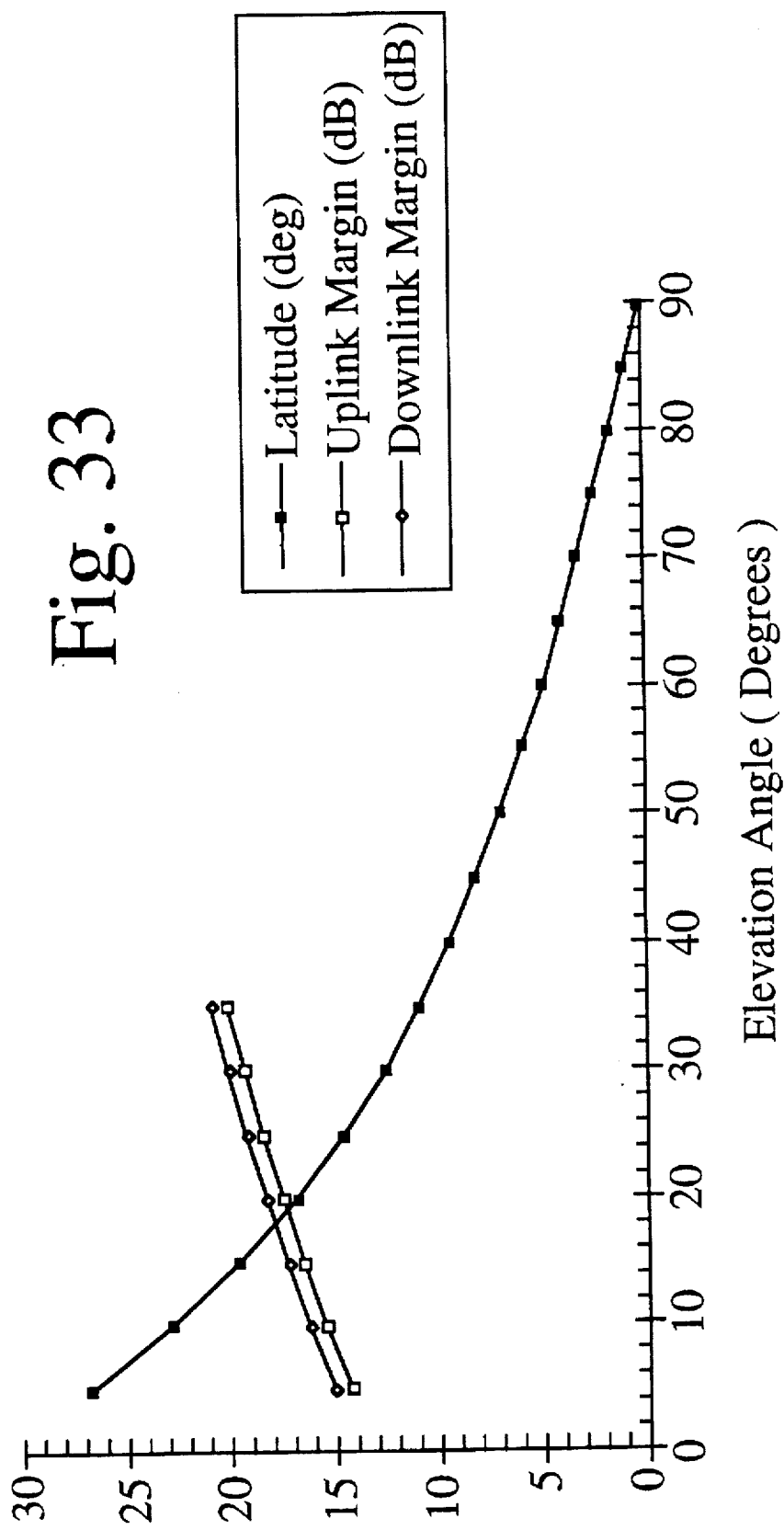
Figure 34:
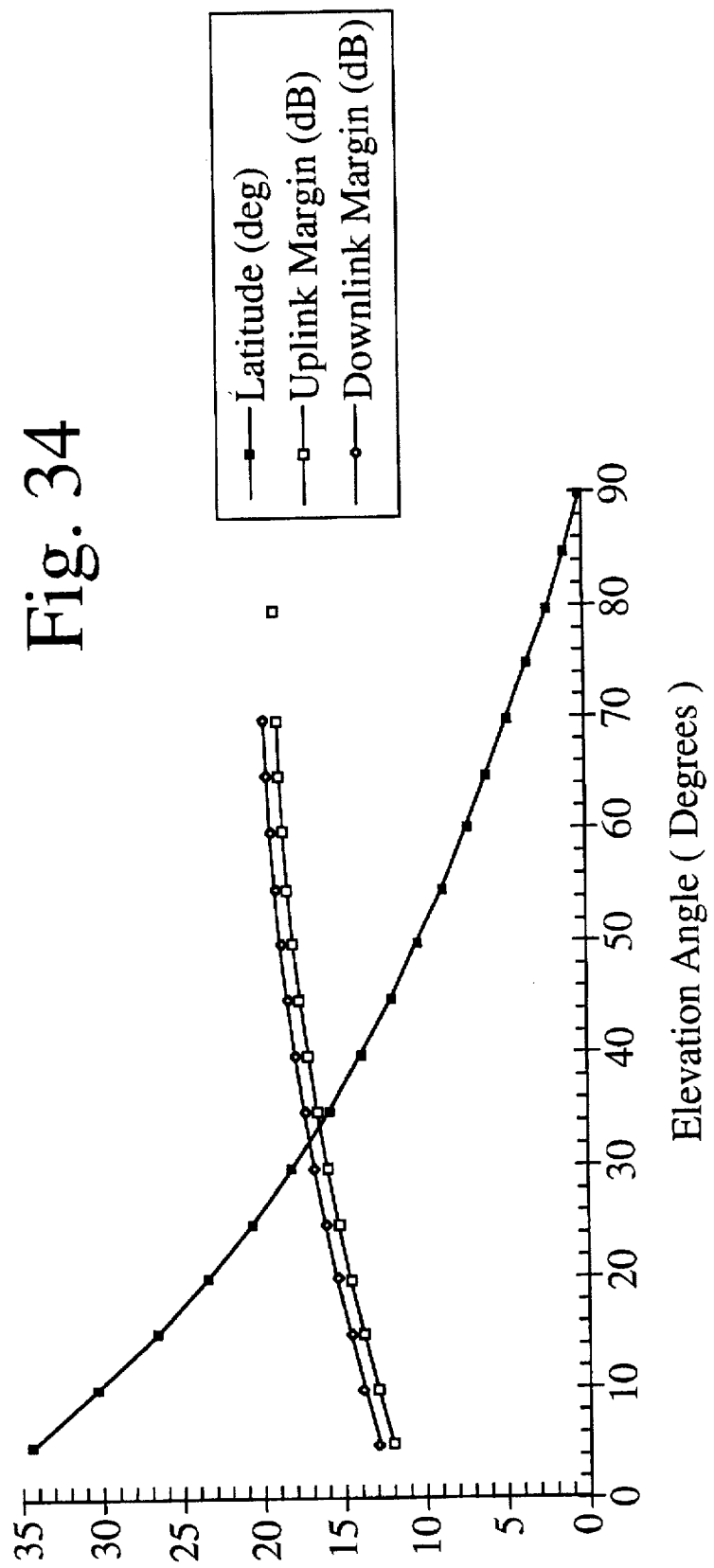

FIGS. 33 and 34 are graphs which reveal VHF antenna design trades for a 100 W transmitter for altitudes of 1,100 km and 1,856 km, respectively.

Figure 35:
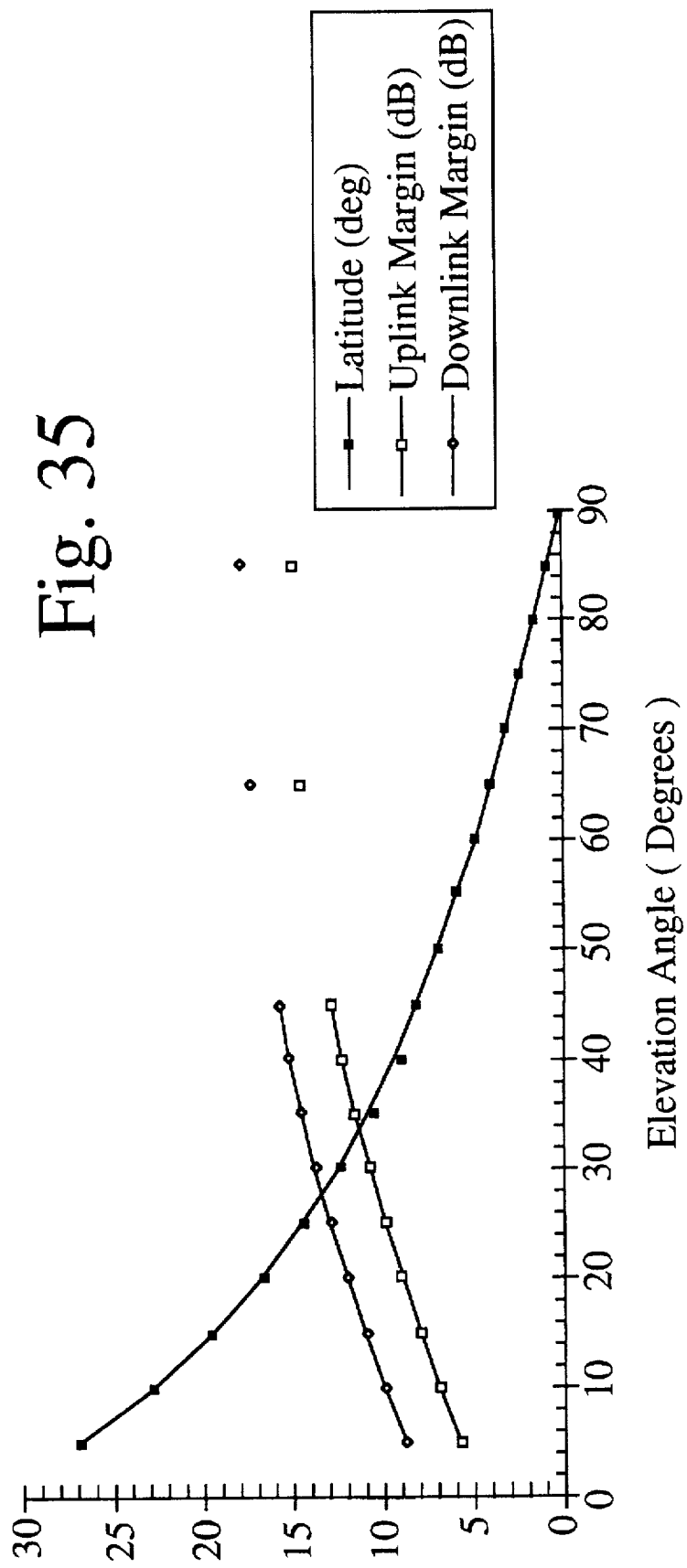
Figure 36:
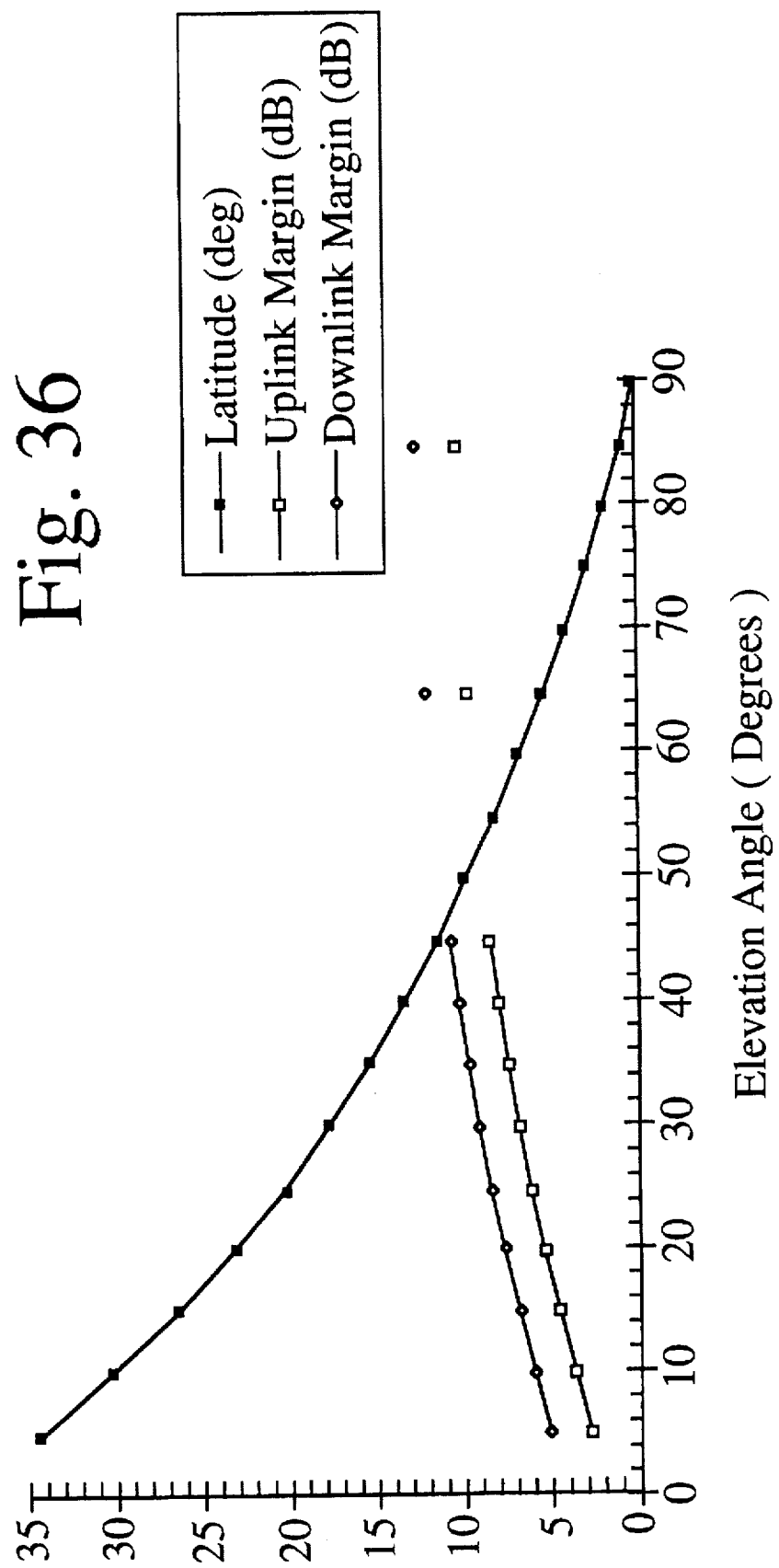

FIGS. 35 and 36 present graphs which reveal UHF antenna design trades for a 100 W transmitter for altitudes of 1,100 km and 1,856 km, respectively.

Figure 37:
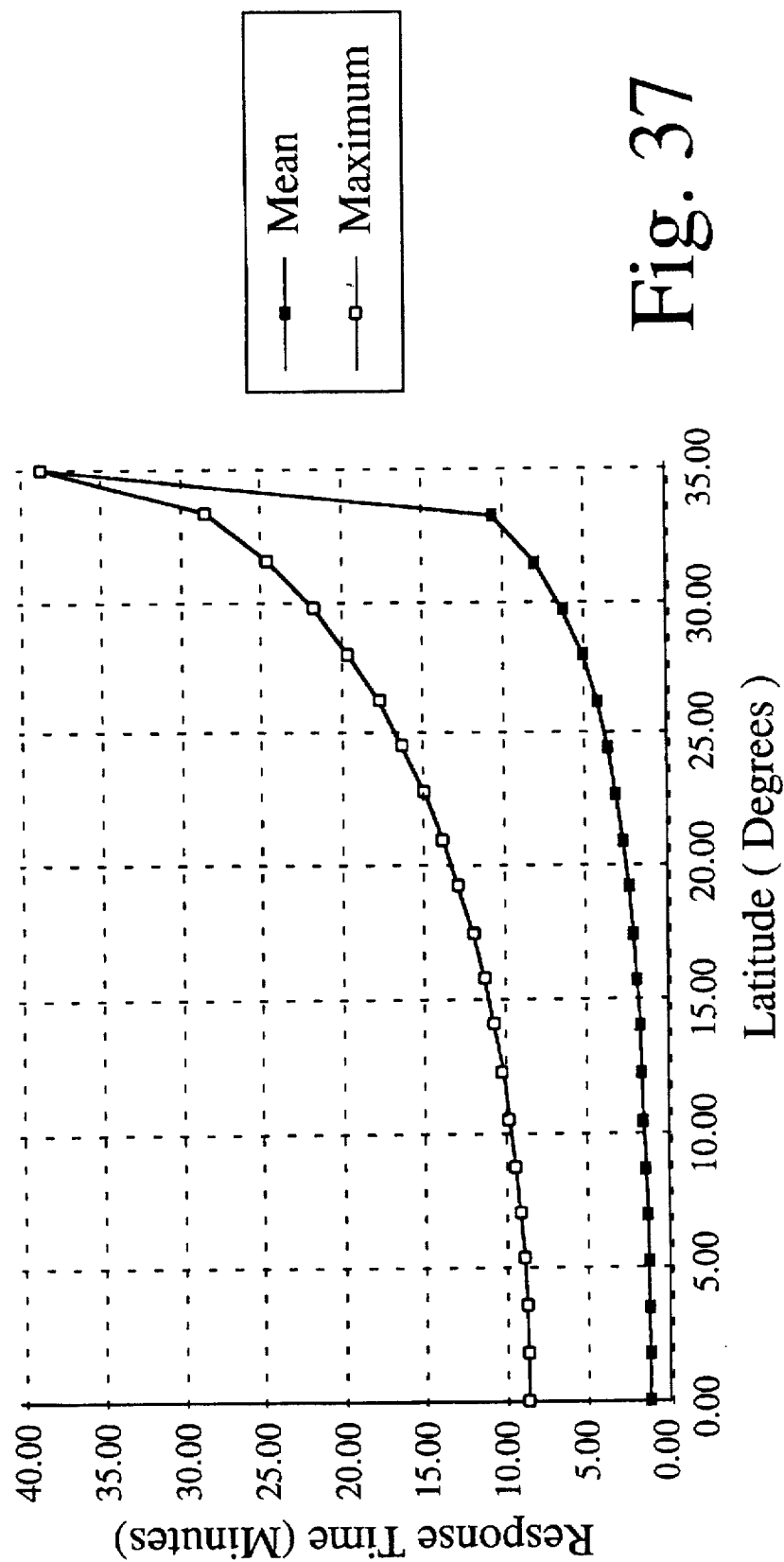

FIG. 37 shows mean and maximum response times for four satellites at different altitudes and latitudes.

Figure 38:
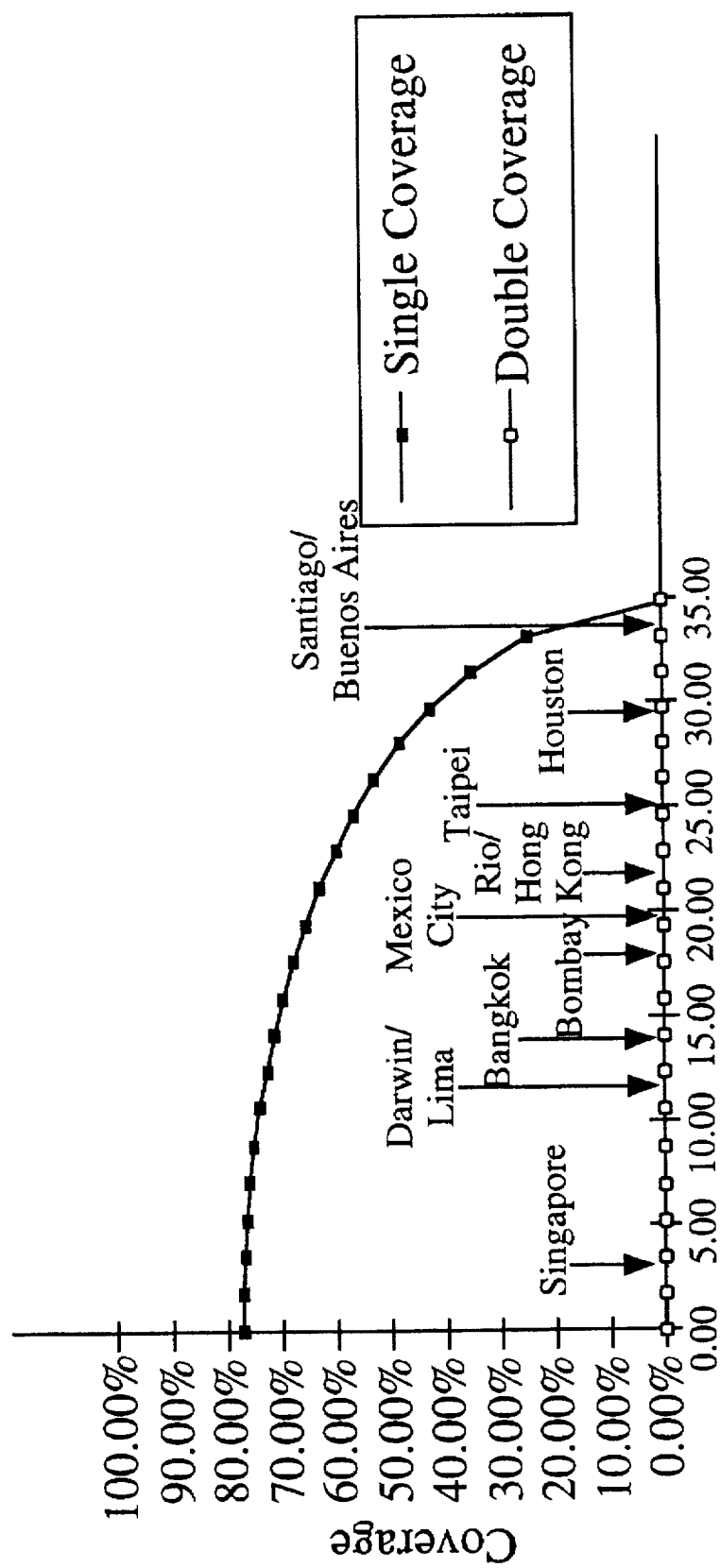

FIG. 38 exhibits the percent of time that a range of latitude is covered by four satellites moving in Equatorial orbits.

Figure 39:
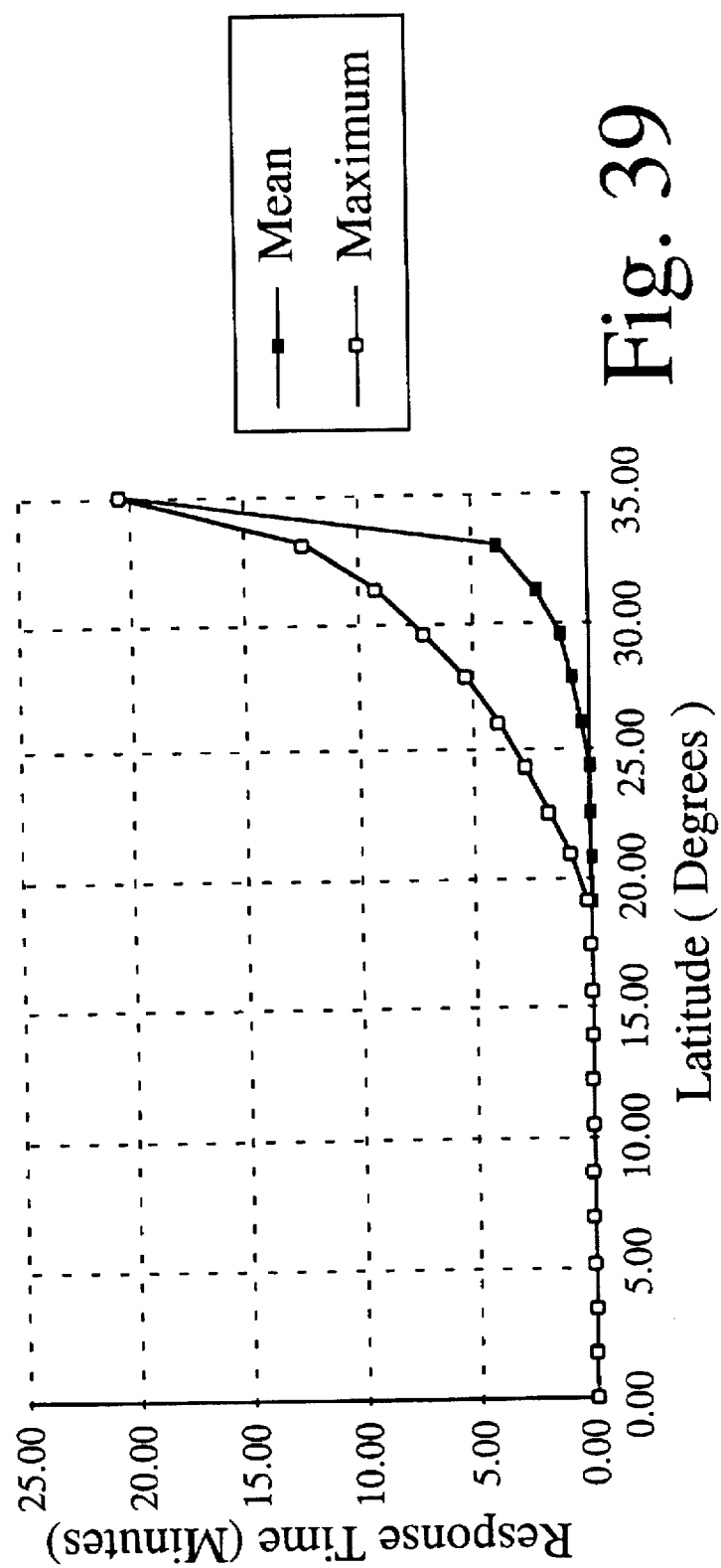

FIG. 39 depicts mean and maximum response times for six satellites at various latitudes.

Figure 40:
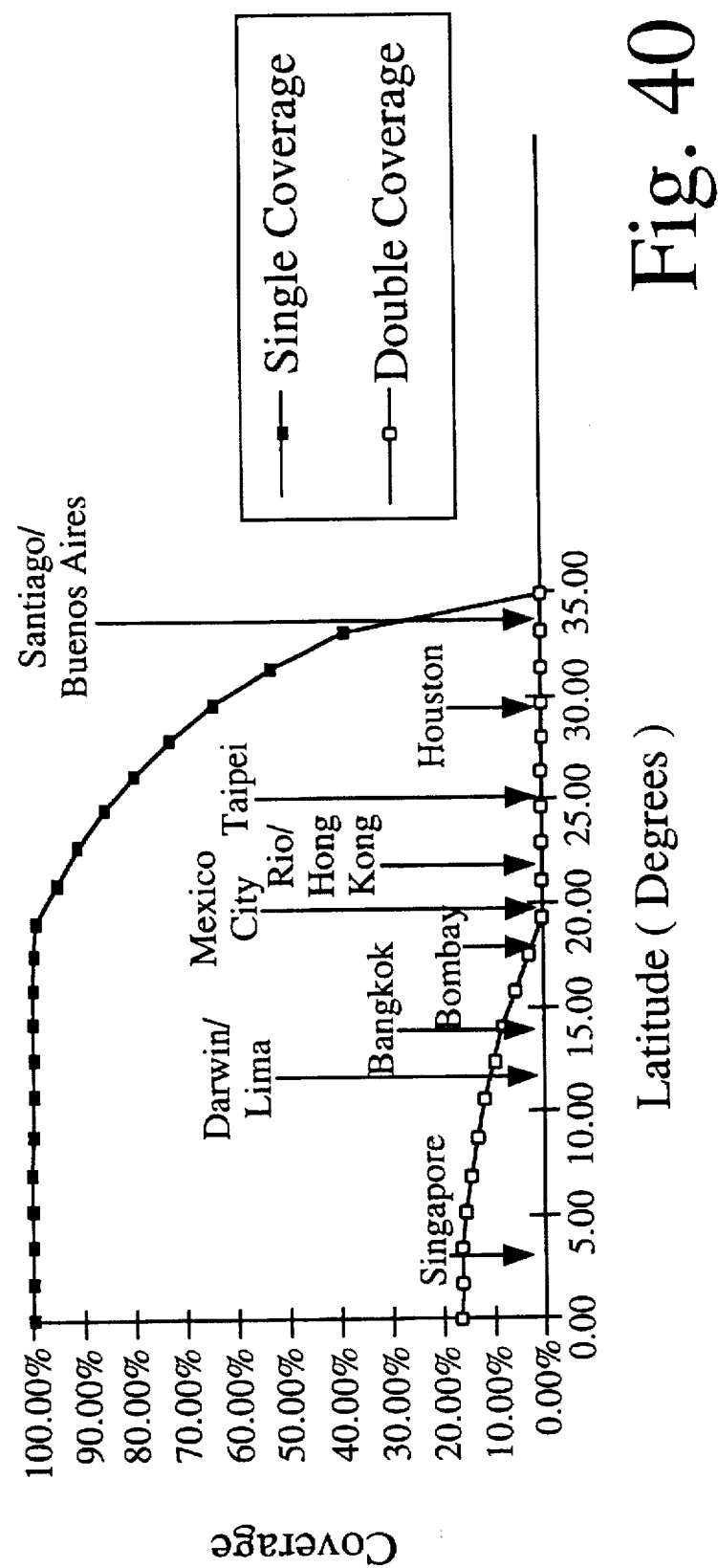

FIG. 40 shows the percent of time that a range of latitude is covered by six satellites moving in Equatorial orbits.

Figure 41:
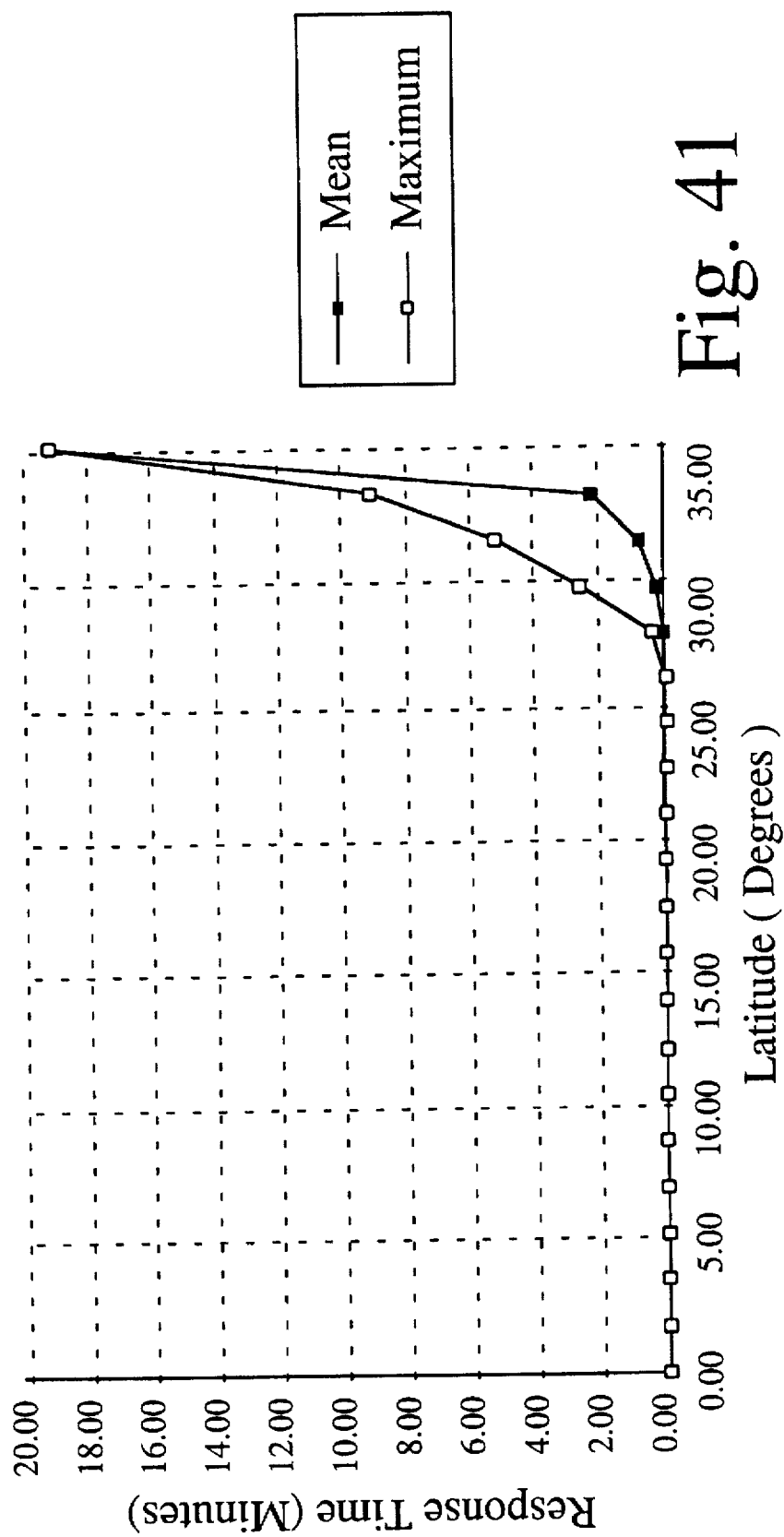

FIG. 41 displays mean and maximum response times for eight satellites at various latitudes.

Figure 42:
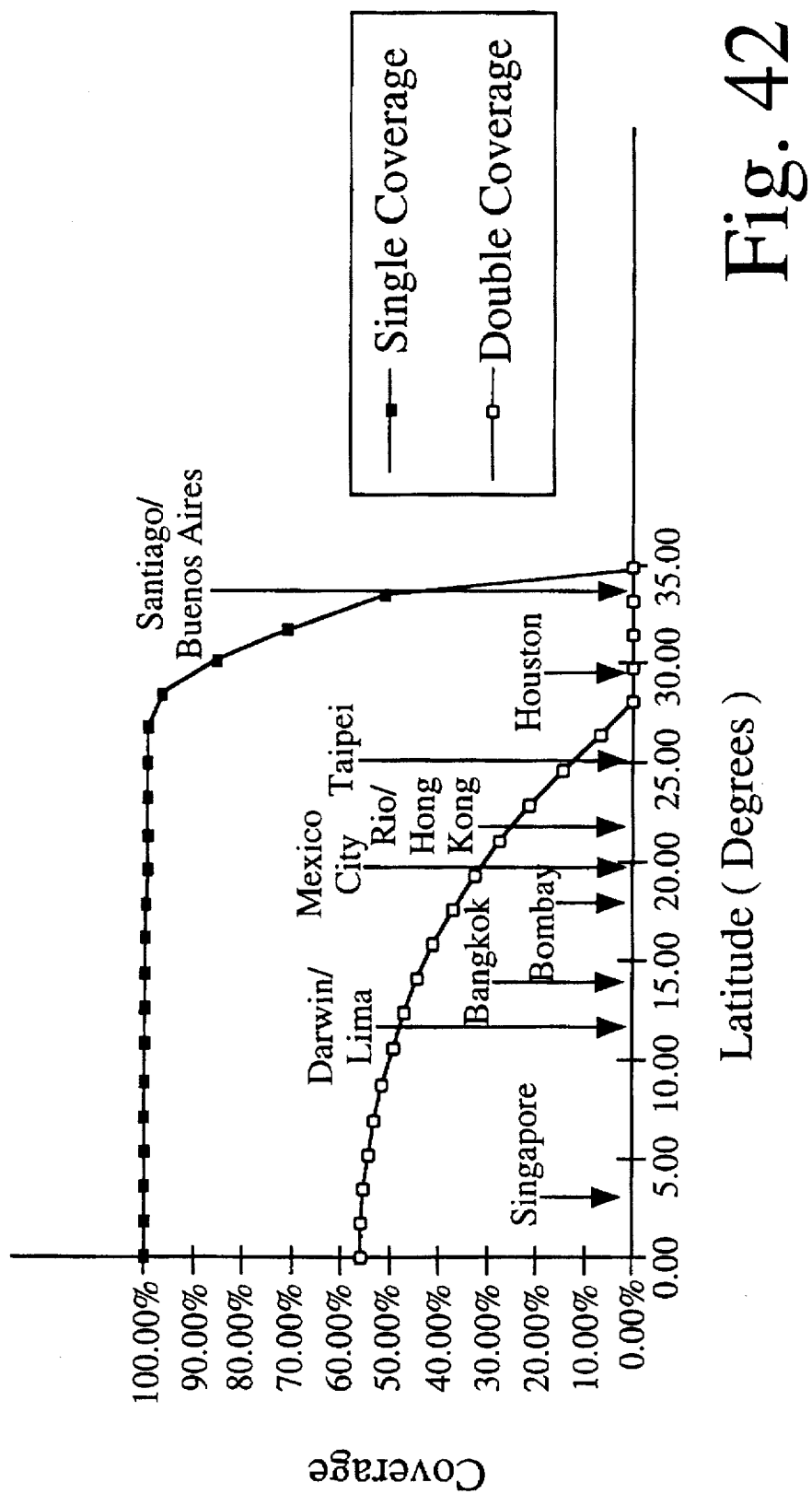

FIG. 42 portrays the percent of time that a range of latitude is covered by eight satellites moving in Equatorial orbits.

Figure 43:
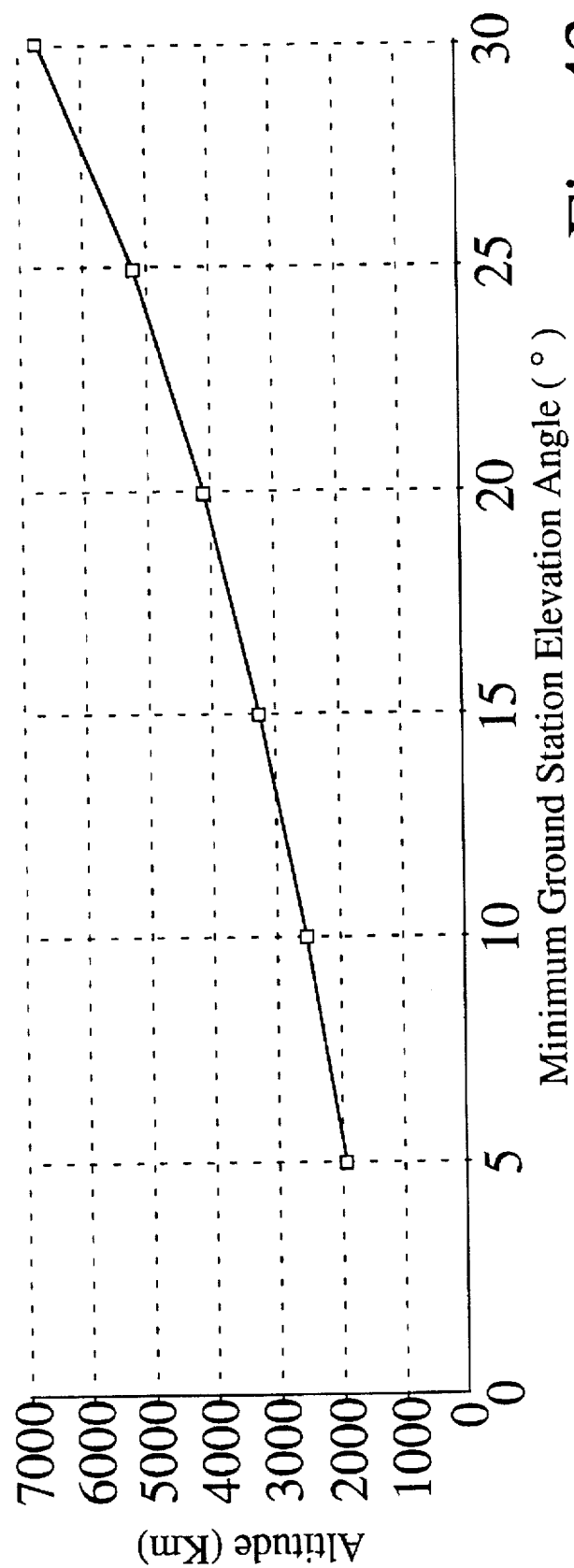

FIG. 43 supplies a graph which illustrates the altitude required for thirty-five degree latitude coverage at a specified elevation angle.

Figure 44:
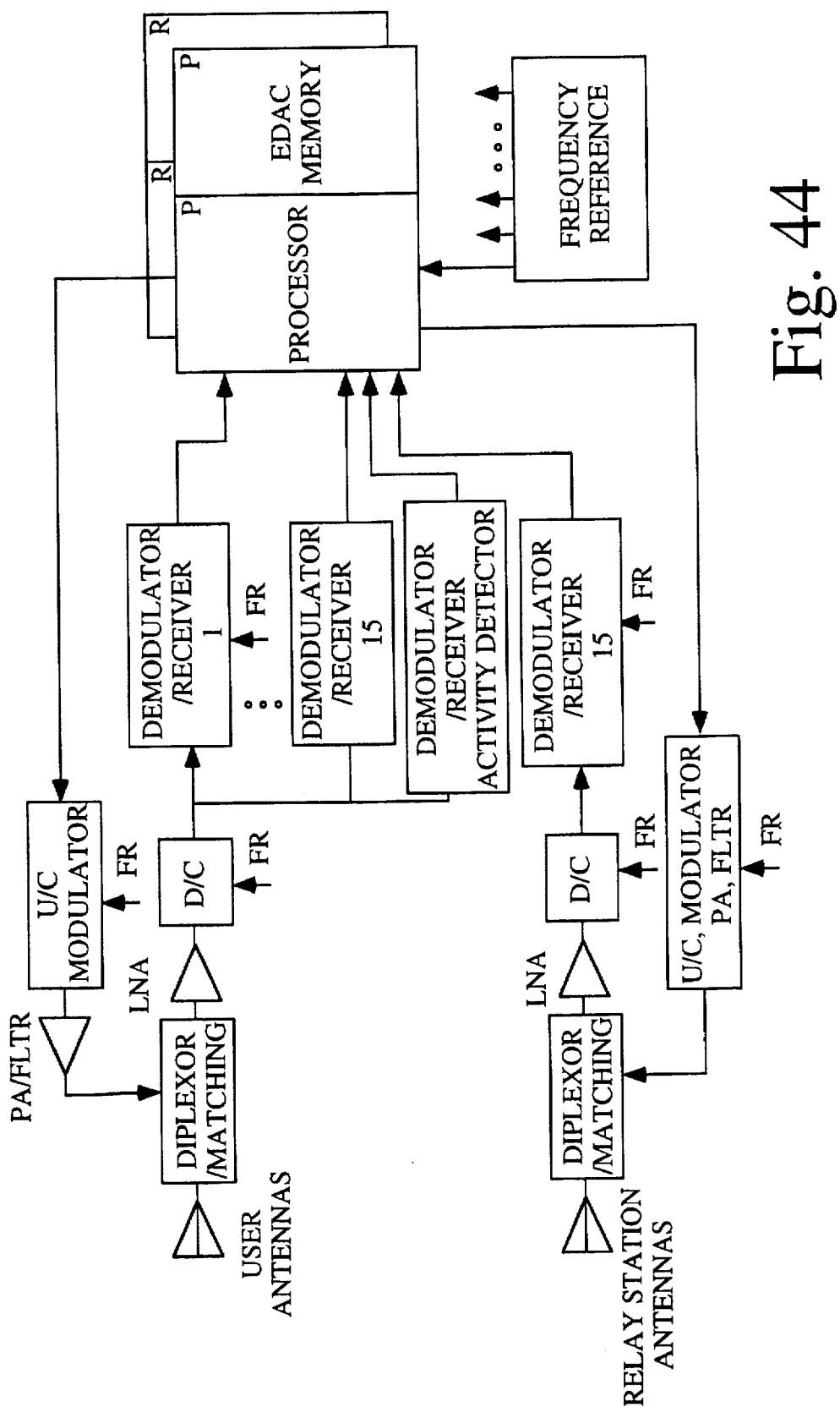
Figure 45:
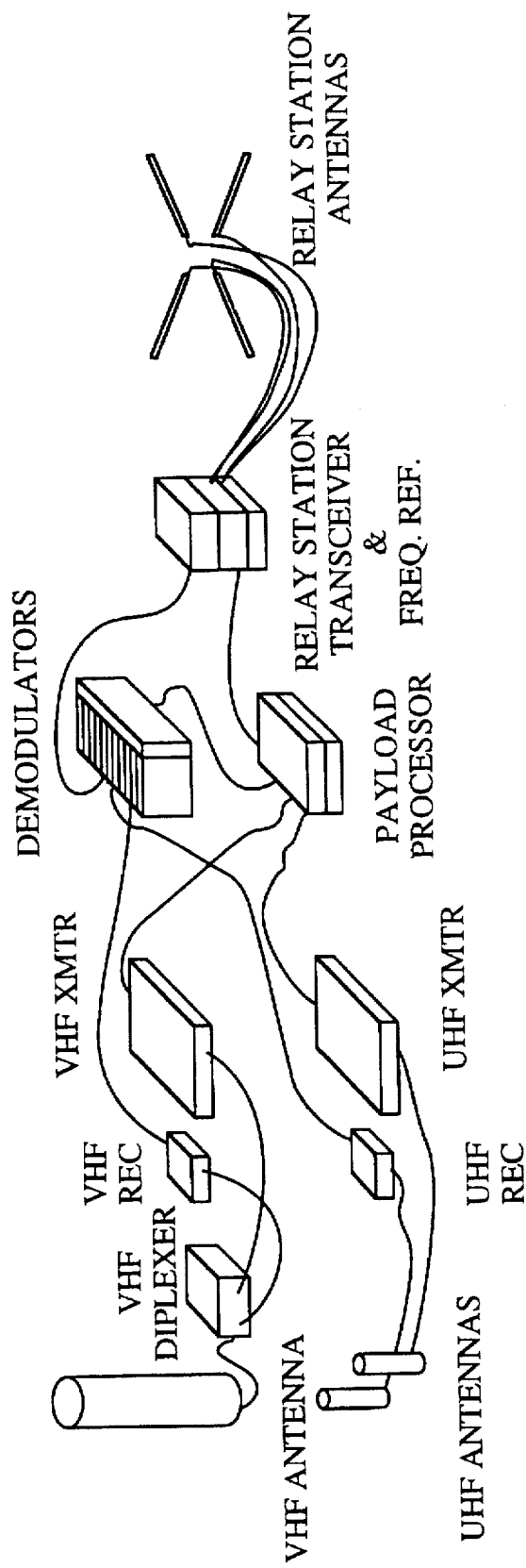
Figure 46:
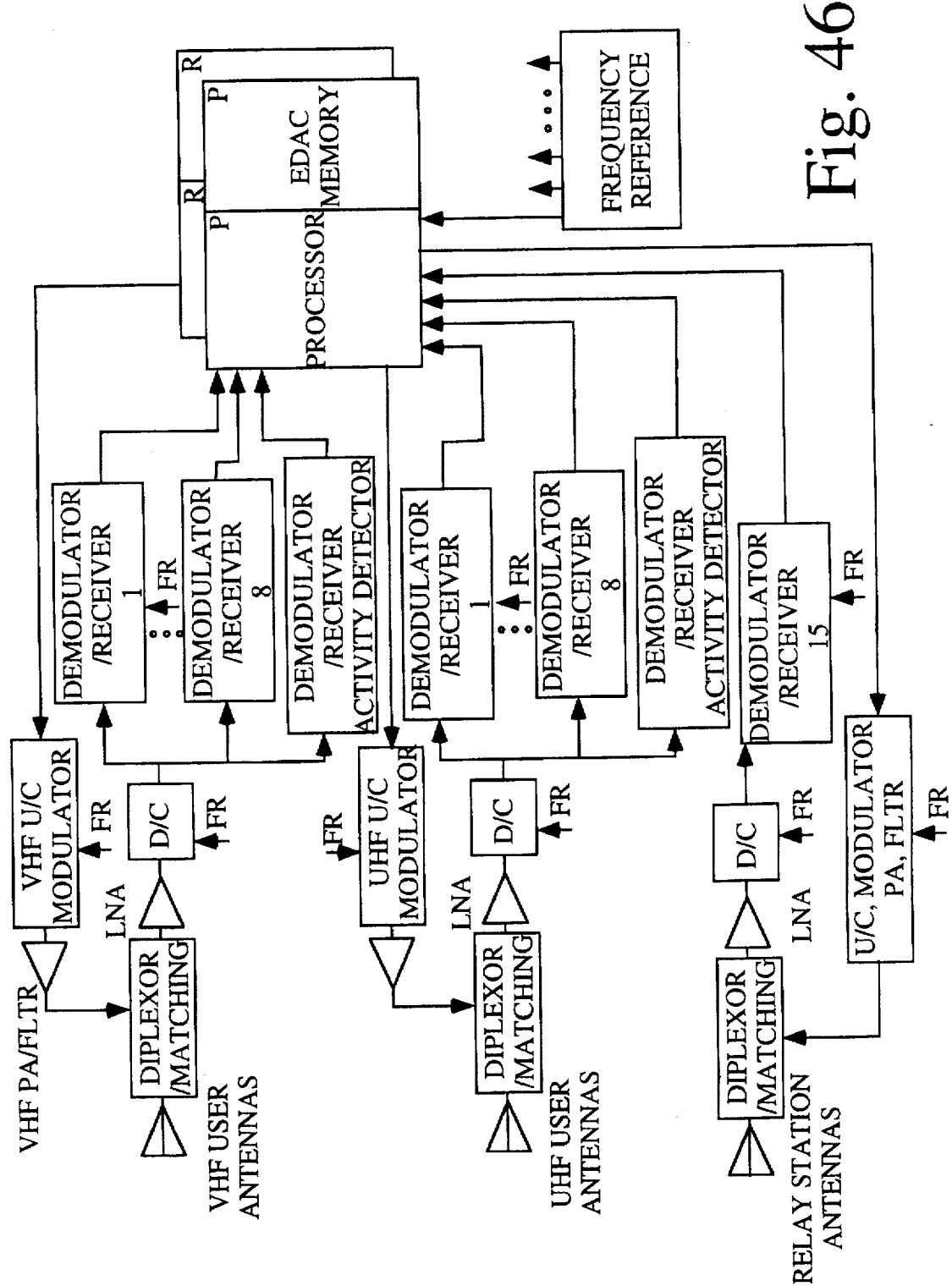

FIGS. 44, 45 and 46 provide schematic diagrams of electronics that are utilized to implement one of the embodiments of the invention. FIG. 44 shows the VHF only payload, FIG. 45 shows dual VHF and UHF downlink modules and FIG. 46 shows a combined VHF and UHF payload diagram.

Figure 47:
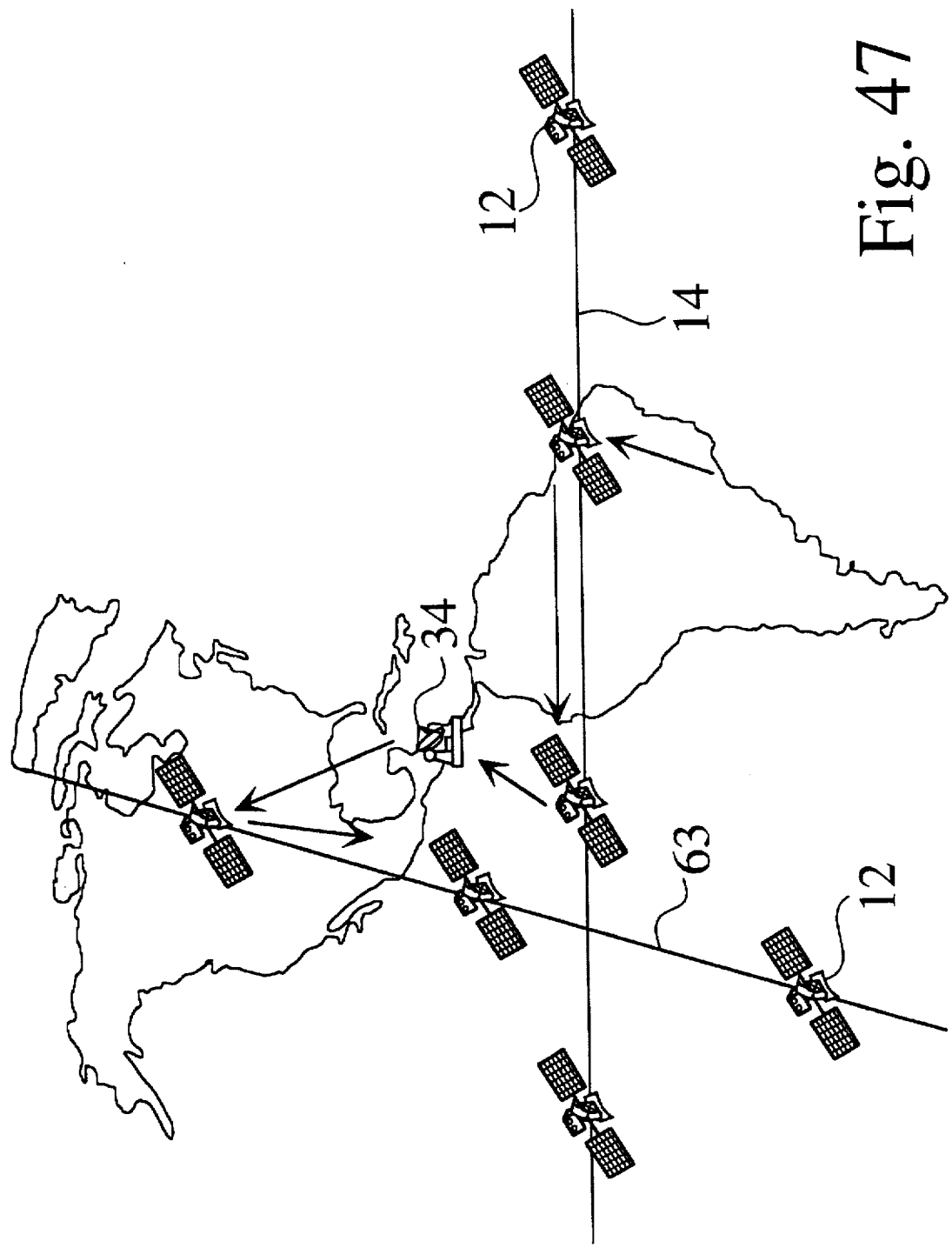

FIG. 47 shows how satellites transfer data from an Equatorial to an inclined orbit via a crosslink through a relay station.

Figure 48:
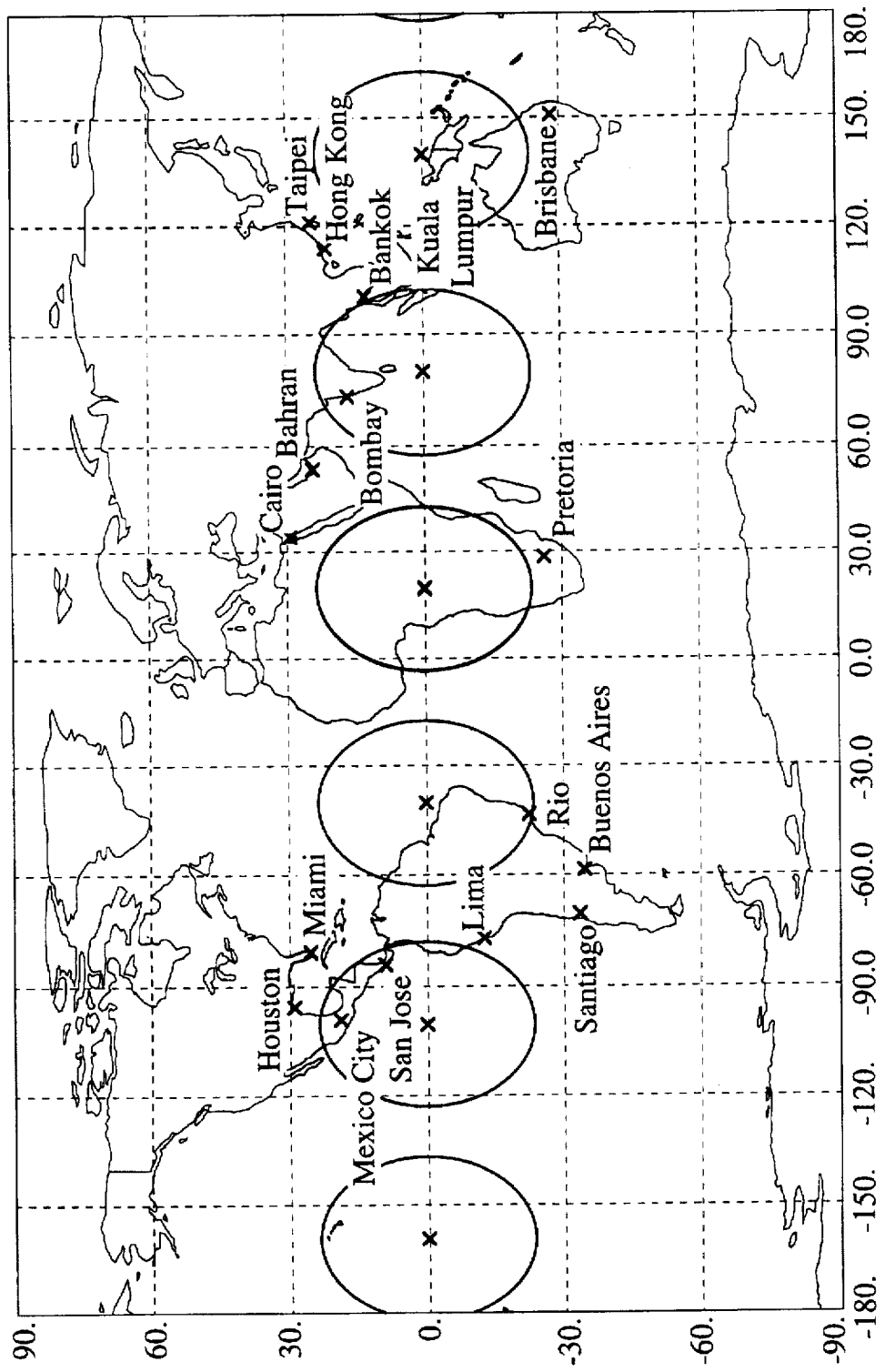
Figure 49:
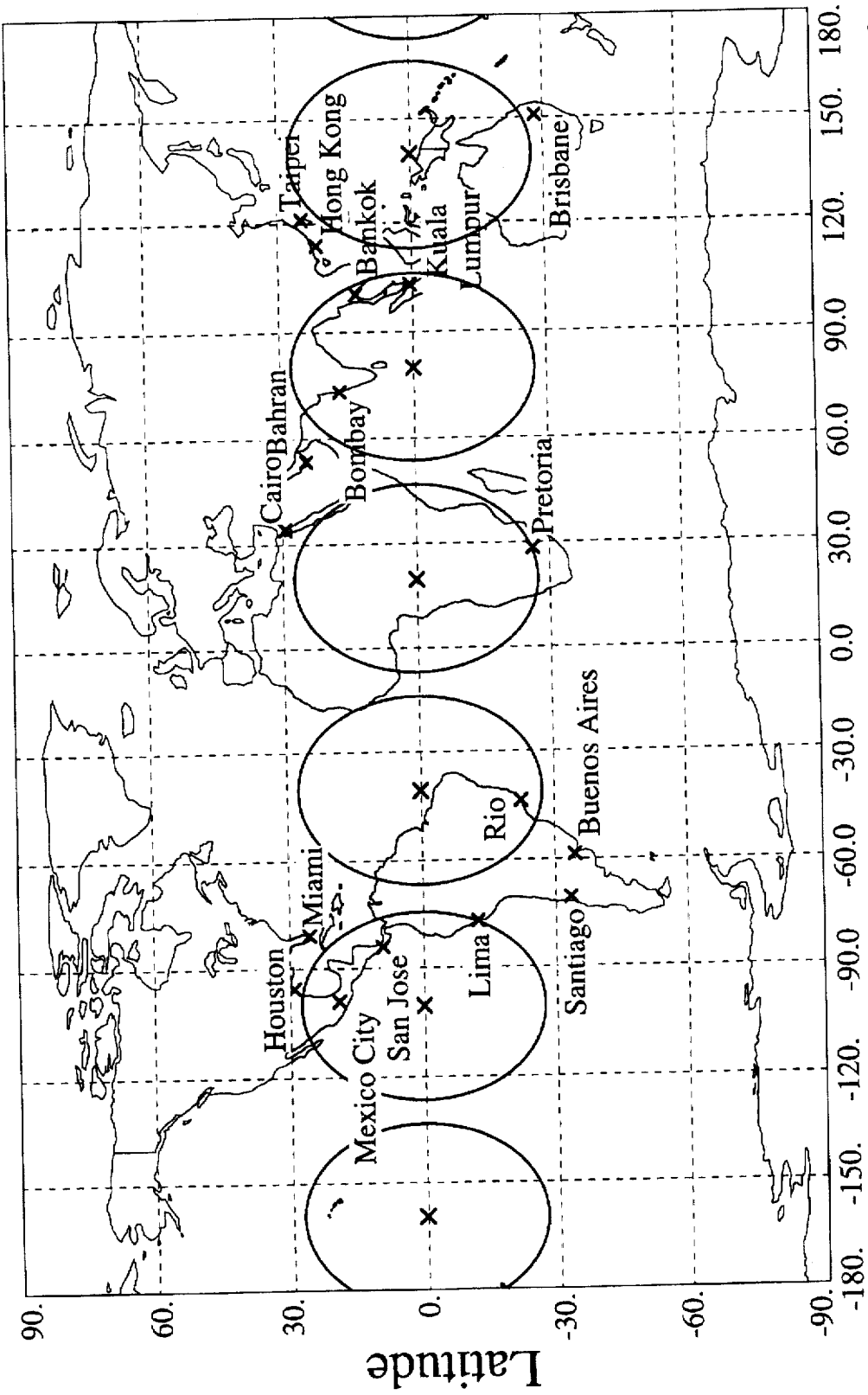
Figure 50:
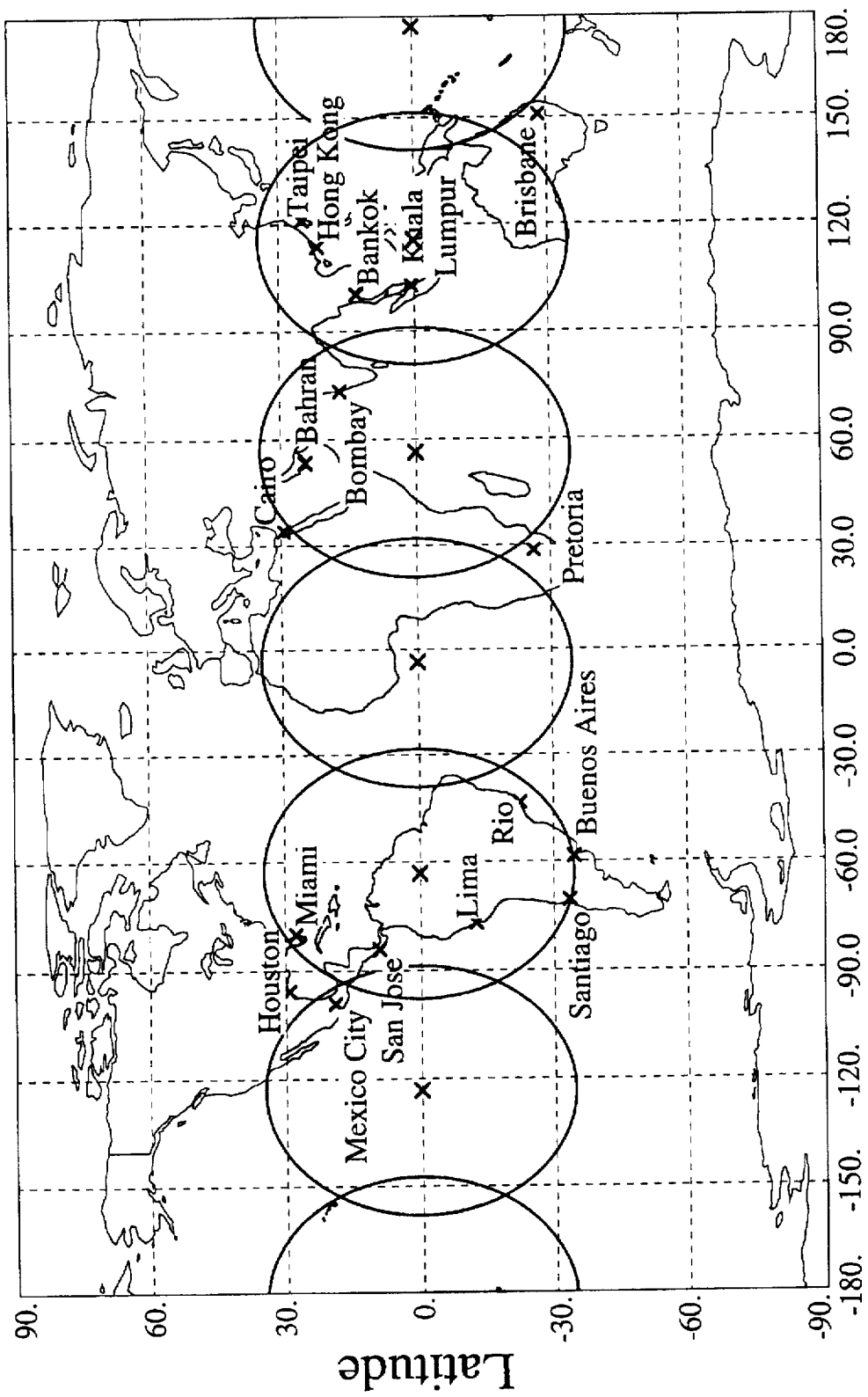

FIGS. 48, 49 and 50 are diagrams showing satellite footprints for satellites orbiting at 800 km, 1,100 km and 1,852 km altitudes.

Figure 51:
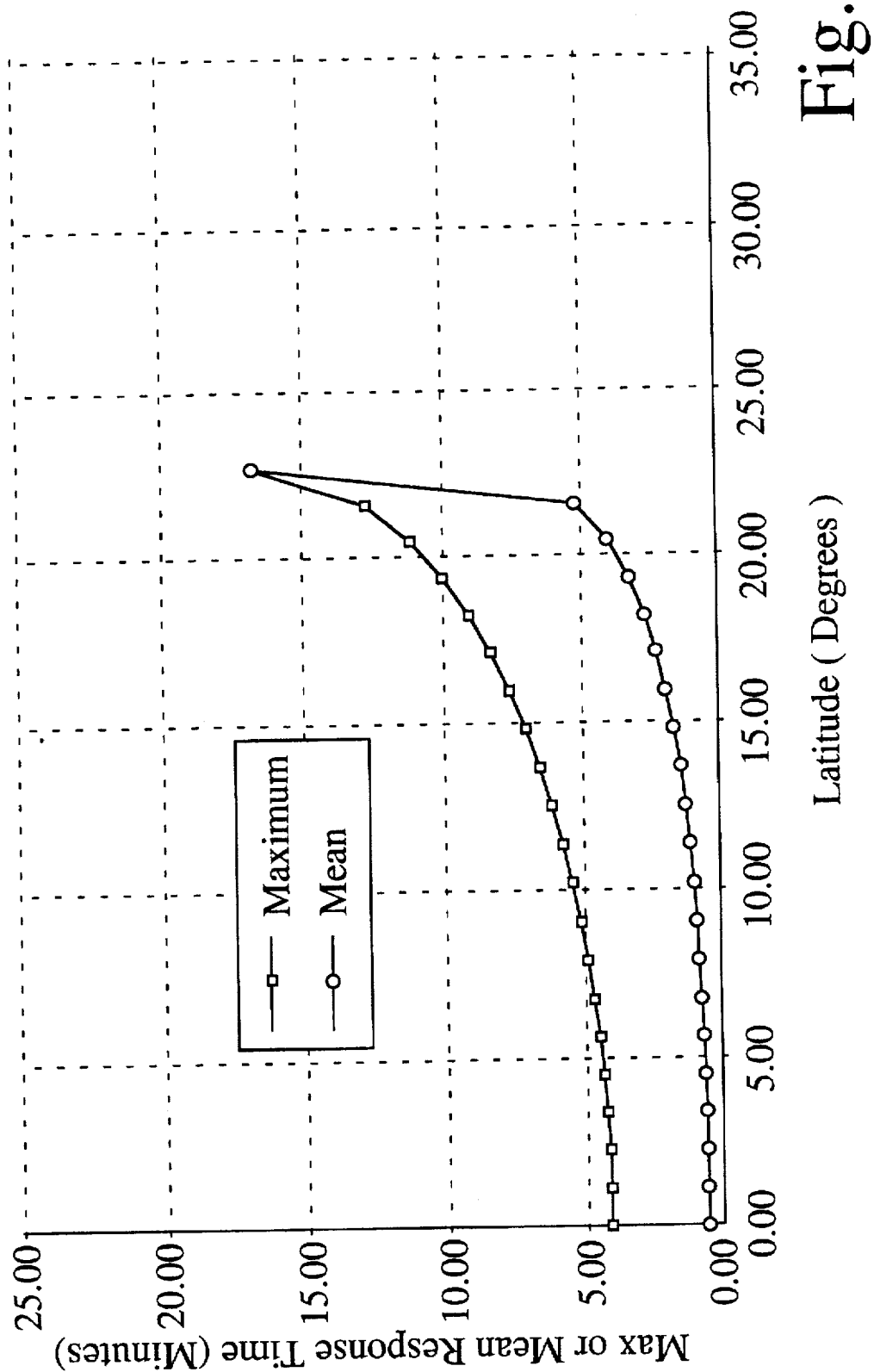
Figure 52:
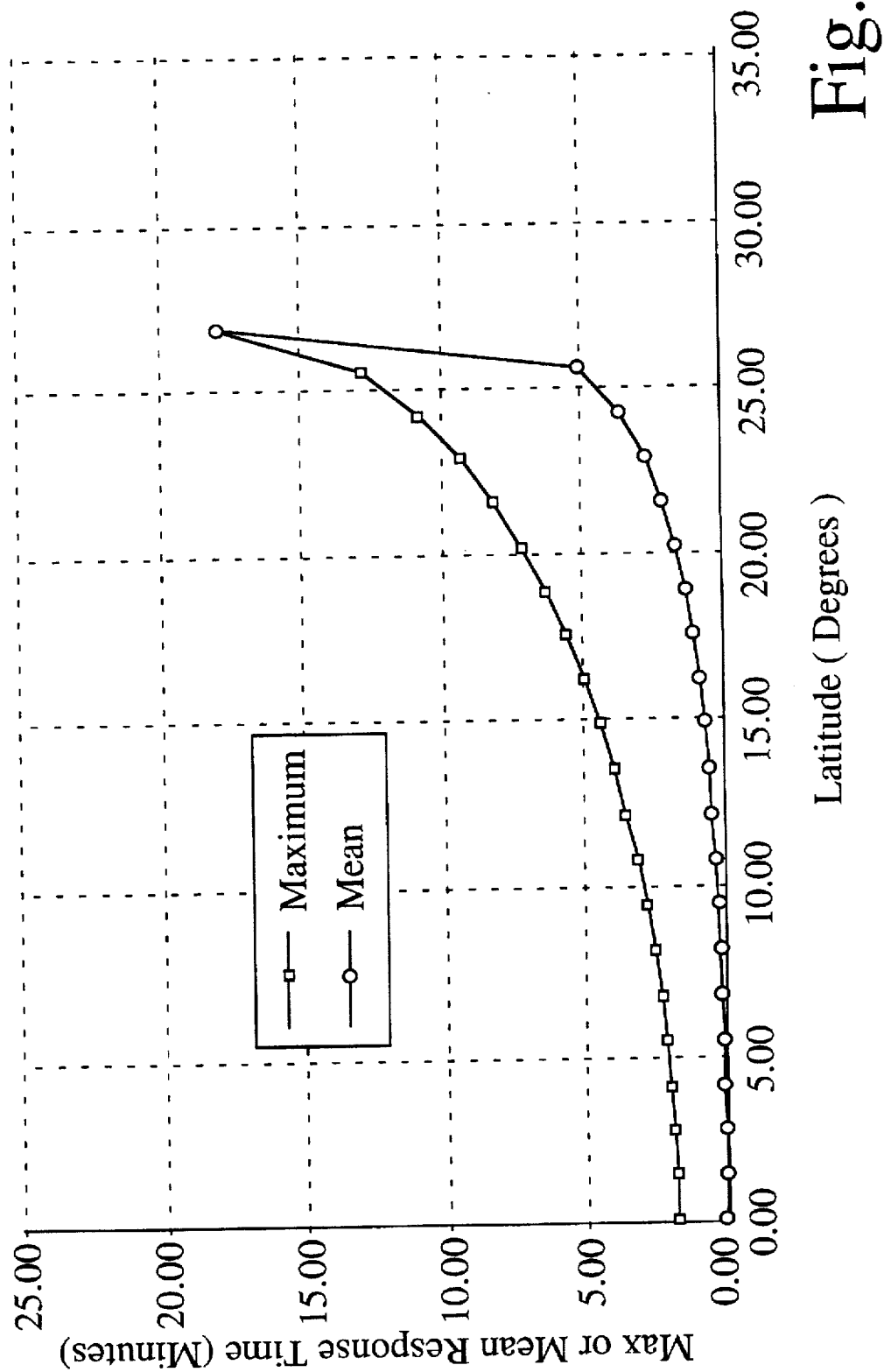
Figure 53:
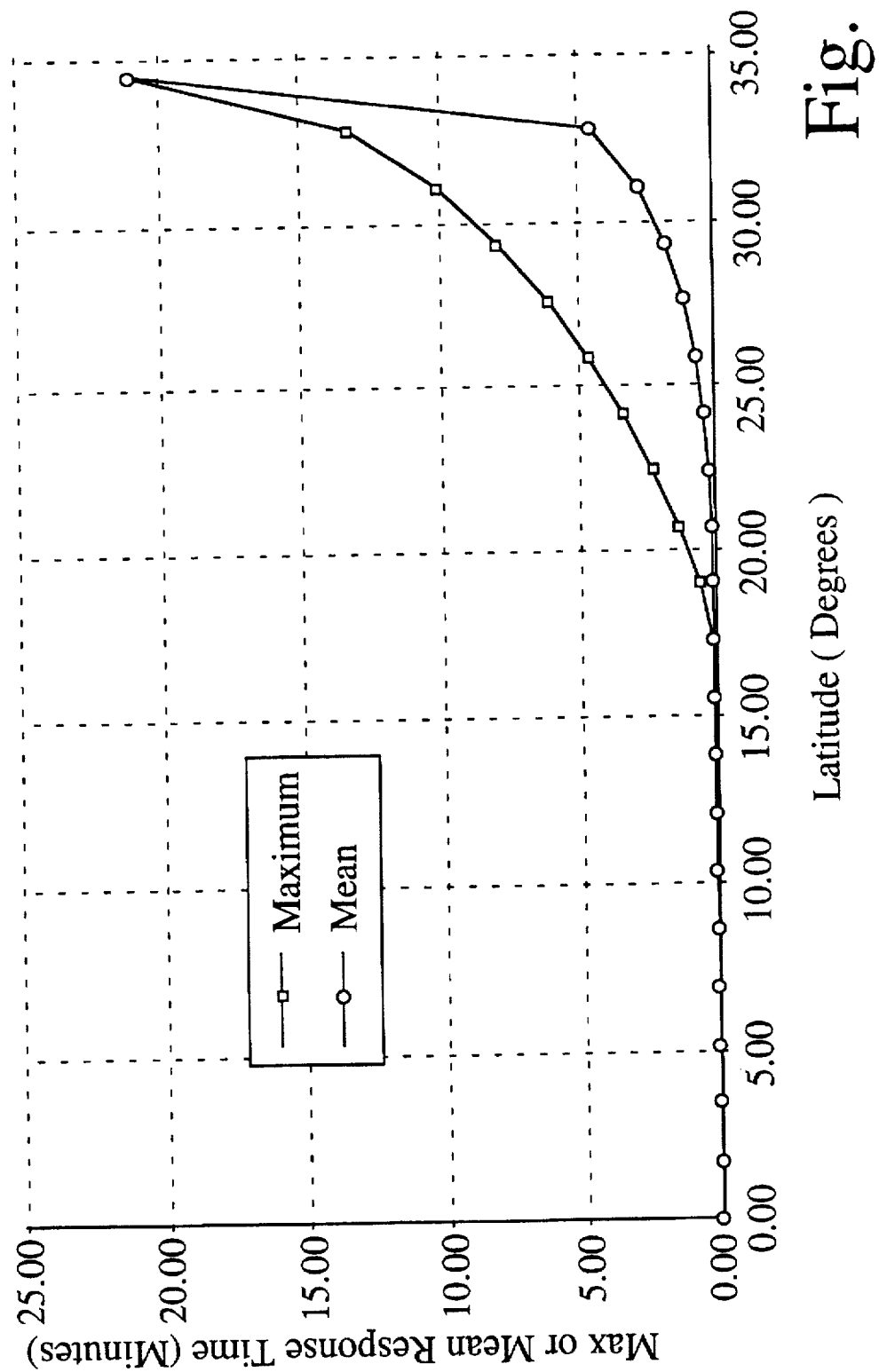

FIGS. 51, 52 and 53 portray mean and maximum response times for satellites orbiting at 800 km, 1,100 km and 1,852 km altitudes.

Figure 54:
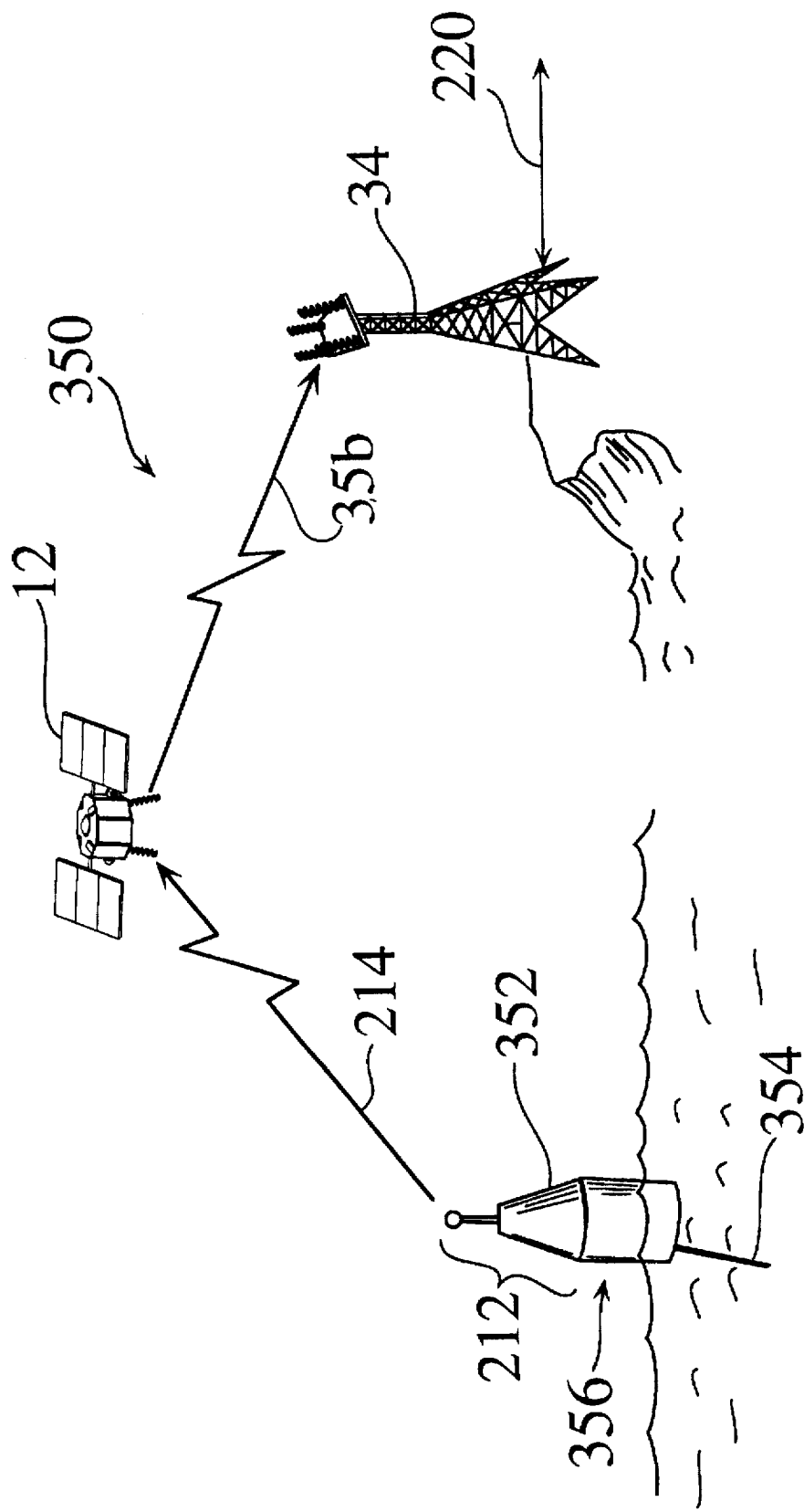

FIG. 54 shows schematically a radio beacon system for monitoring sea environment and tracking data with deployed buoys transmitting data through the satellite-to-ground terminal links of this invention.

Figure 55:
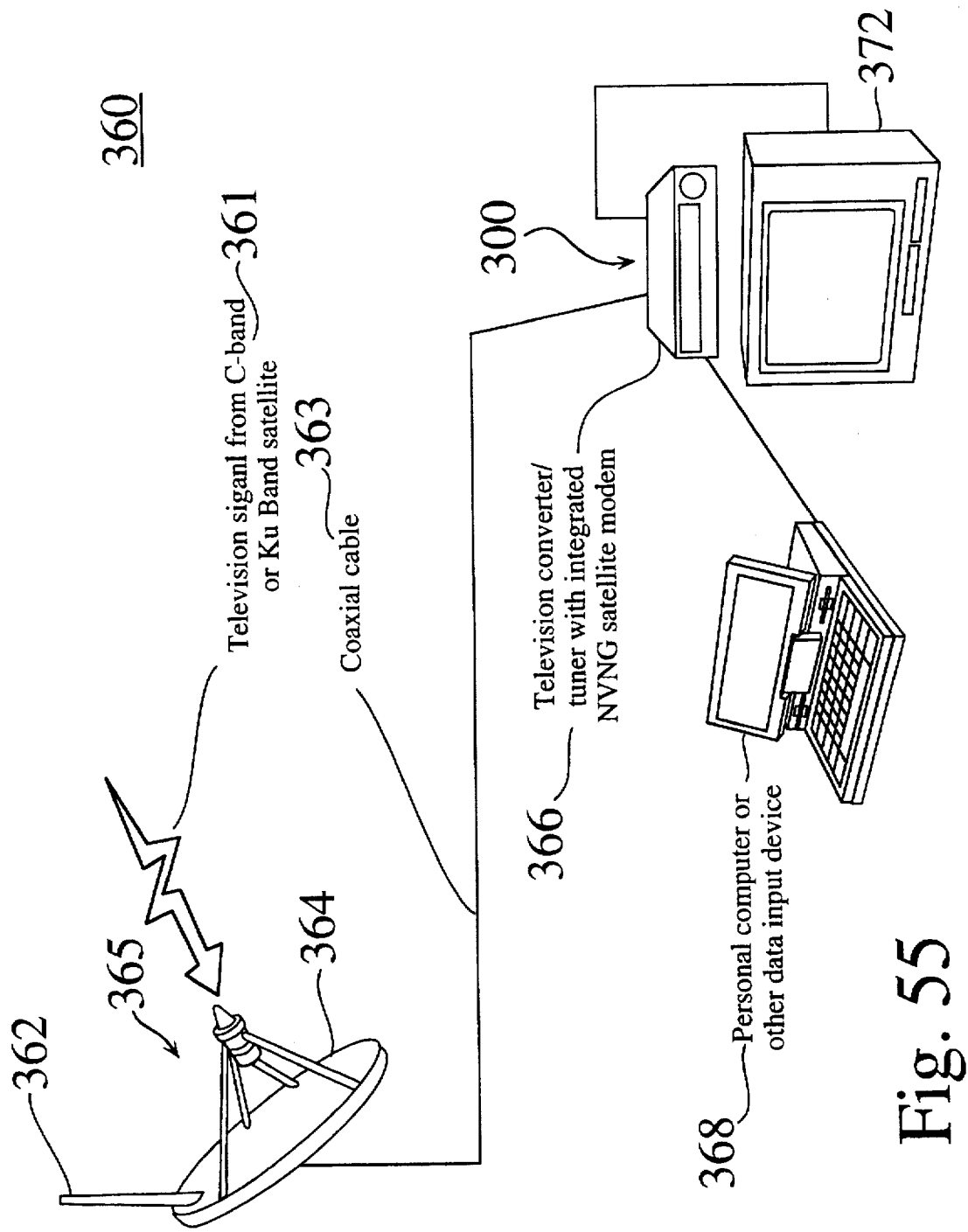

FIG. 55 is a schematic depiction of an interactive television system using a return link from a viewer to a TV broadcaster through the satellites of this invention.

Figure 56:
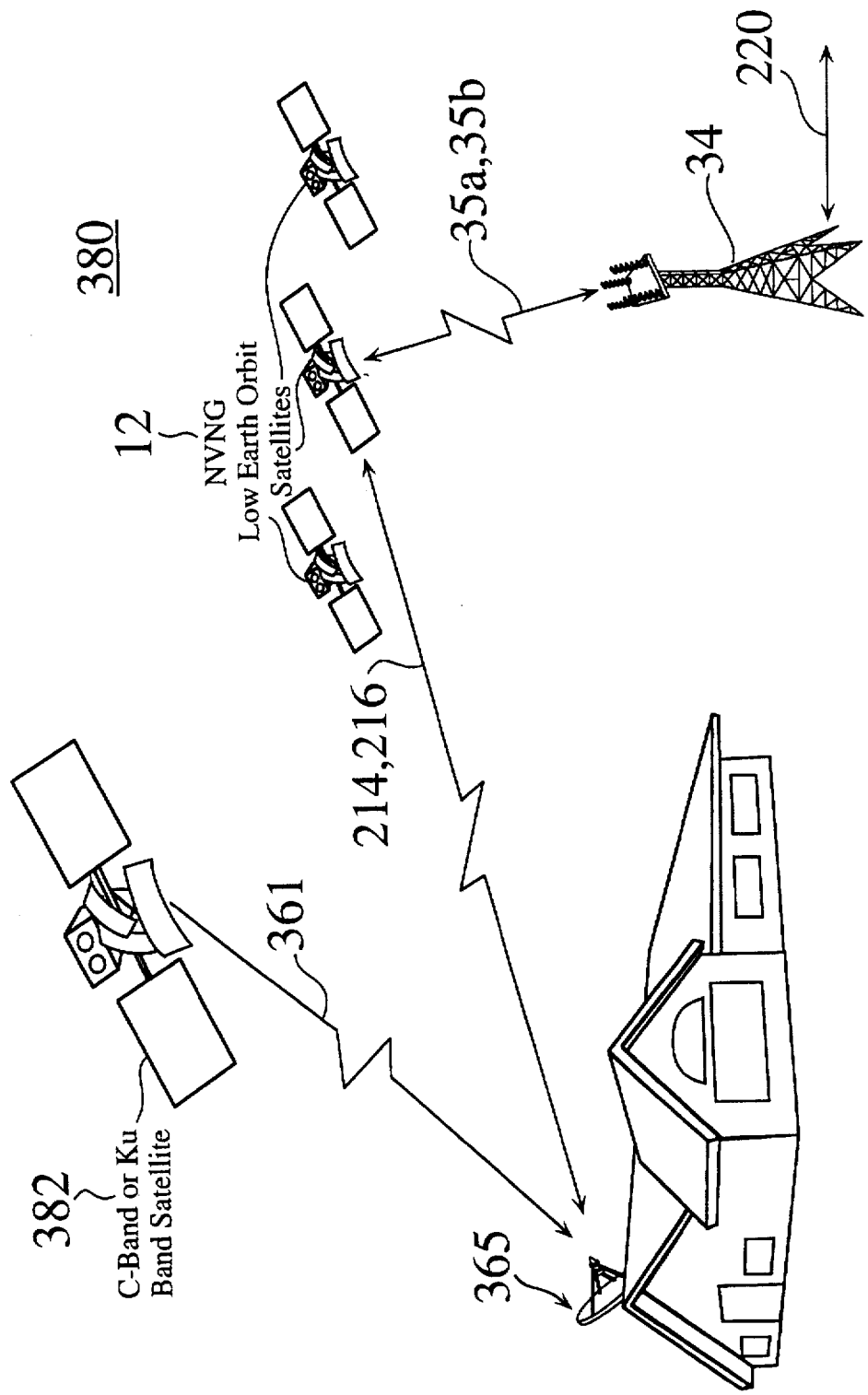

FIG. 56 depicts the return link from a viewer of a satellite TV broadcast through the satellite-to-ground terminal links of this invention and terrestrial based telephone networks.

Figure 57:
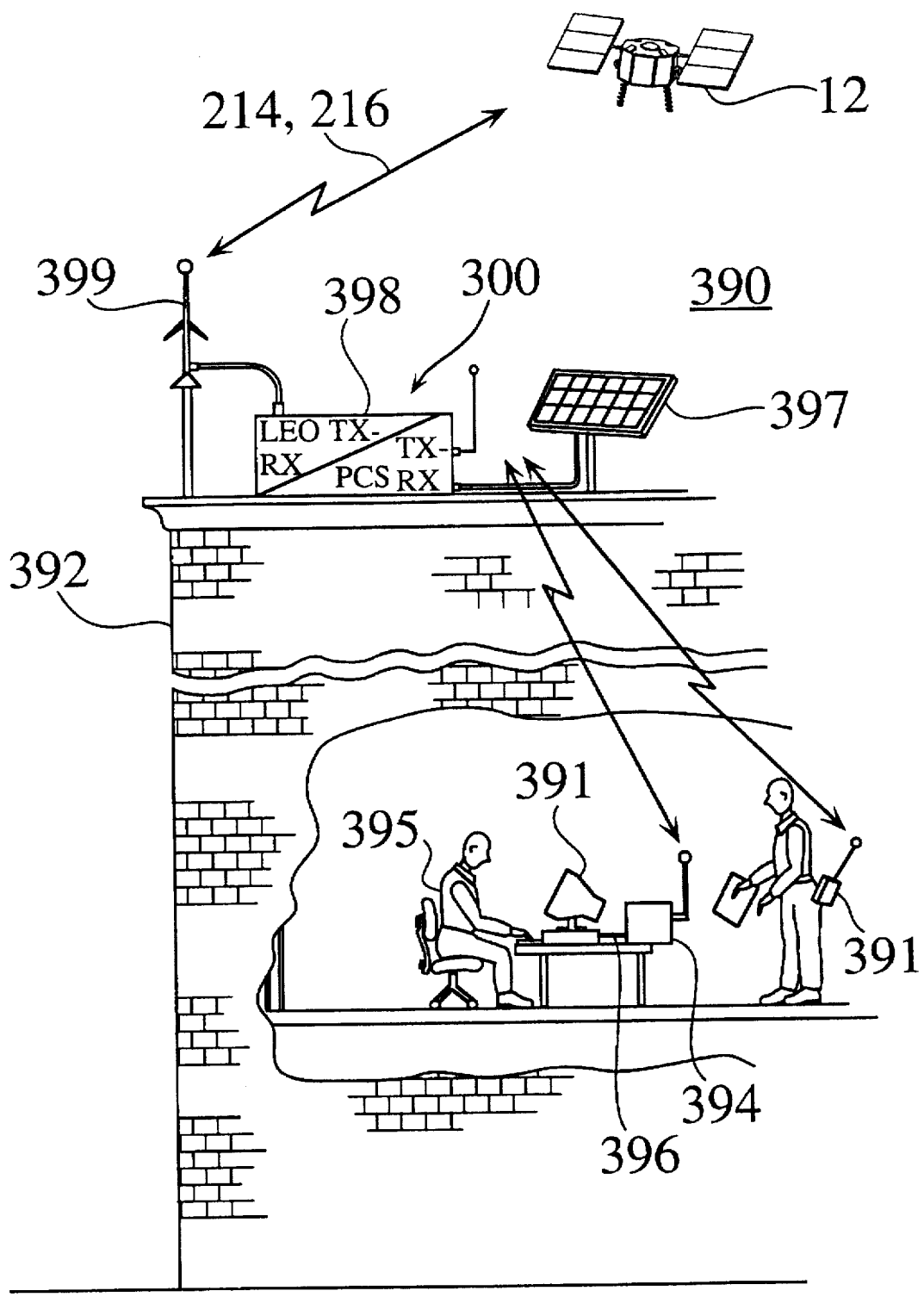

FIG. 57 is a schematic diagram showing a method of providing connectivity to movable devices or devices with low rate data inside a building which shields the user's radio signal from the satellite.

DETAILED DESCRIPTION OF PREFERRED & ALTERNATIVE EMBODIMENTS

I. An Equatorial Constellation of Satellites

Figure 1:
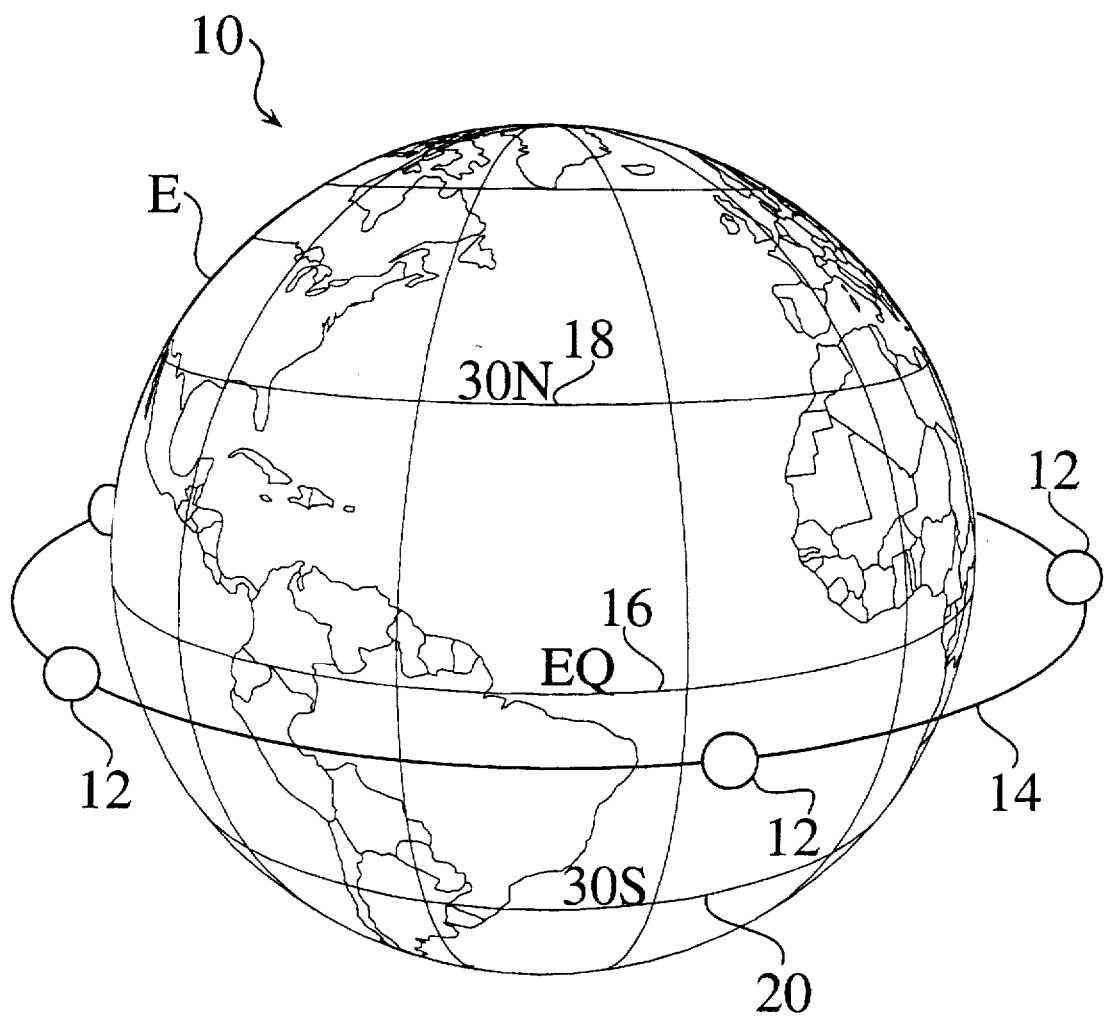
FIG. 1 is a schematic view of a constellation of six satellites in Equatorial orbit utilized in one of the embodiments of the present invention.

FIG. 1 is a schematic view 10 of a constellation of six satellites 12 utilized in one of the embodiments of the present invention. In the text that follows, the term "constellation" refers to the entire group of satellites 12. A complete implementation of the invention which incorporates the constellation as well as equipment such as relay stations on or near the Earth's surface is described by the terms "system" or "network".

The satellites 12 shown in FIG. 1 operate in an orbit 14 which lies in the same plane as the Earth's Equator 16. In one embodiment, the satellites 12 are equally spaced around an Equatorial orbit at an altitude of 1,852 kilometers. In this specification, constellations having different numbers of orbital planes and various populations of satellites 12 in those orbital planes are disclosed. While a variety of numbers of orbit planes and satellites may be employed to implement the present invention, the reader should understand that the invention embraces any configuration that does not utilize geo-stationary spacecraft flying in orbits at an altitude of approximately 23,000 miles, except for using geo-stationary spacecraft as a communications link.

Figure 2:
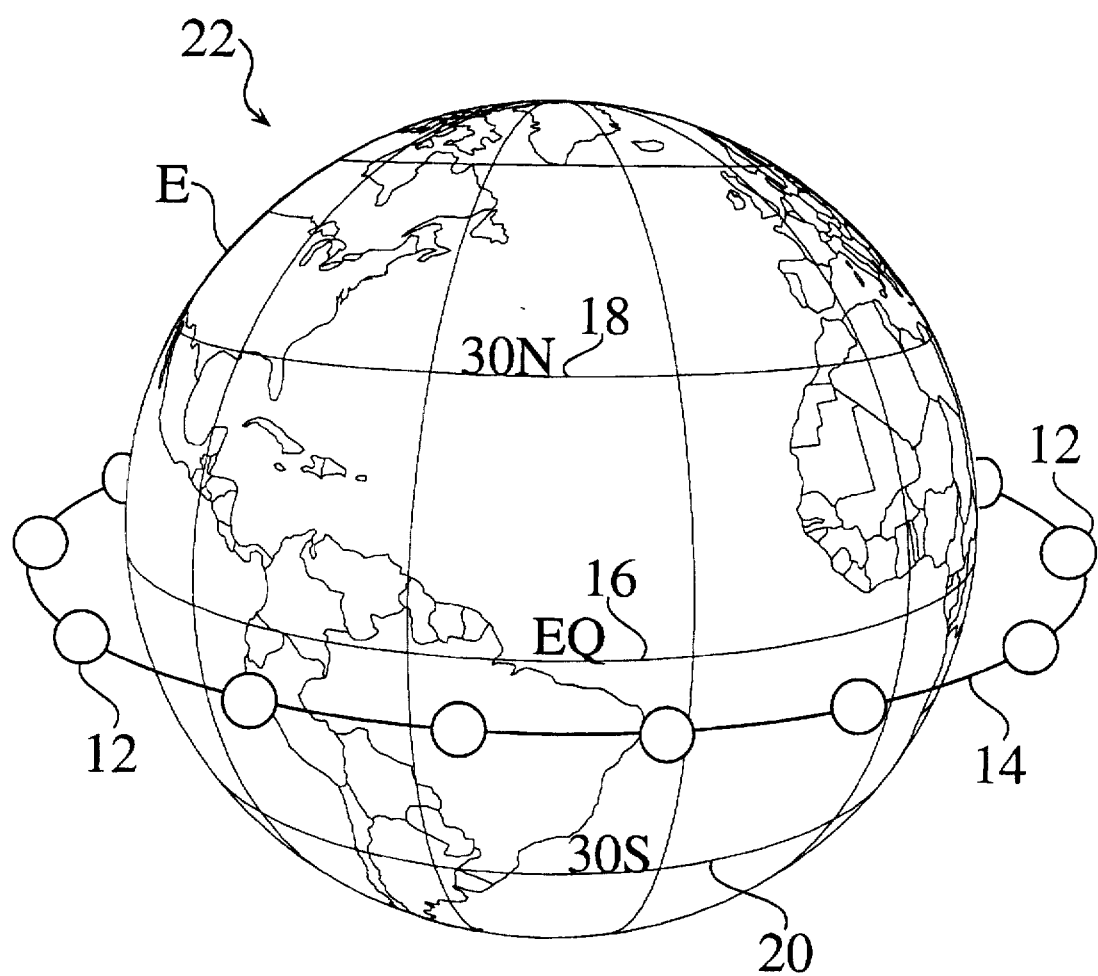
FIG. 2 is a schematic view of a constellation of fourteen satellites in Equatorial orbit utilized in one of the embodiments of the present invention.

FIG. 1 shows two lines of latitude, indicated by reference characters 18 and 20, on the surface of the Earth. These lines represent 30 degrees North and 30 degrees South, respectively. The region of the Earth's surface bounded by these lines of latitude 18 and 20 are within the service areas of the satellites 12 in the Equatorial orbit 14. FIG. 2 reveals an illustration 22 of one embodiment of invention using fourteen equally spaced satellites 12 operating in Equatorial orbit 14. The preferred embodiment of the present invention may utilize from six to fourteen satellites 12 in Equatorial orbit 14.

Figure 3:
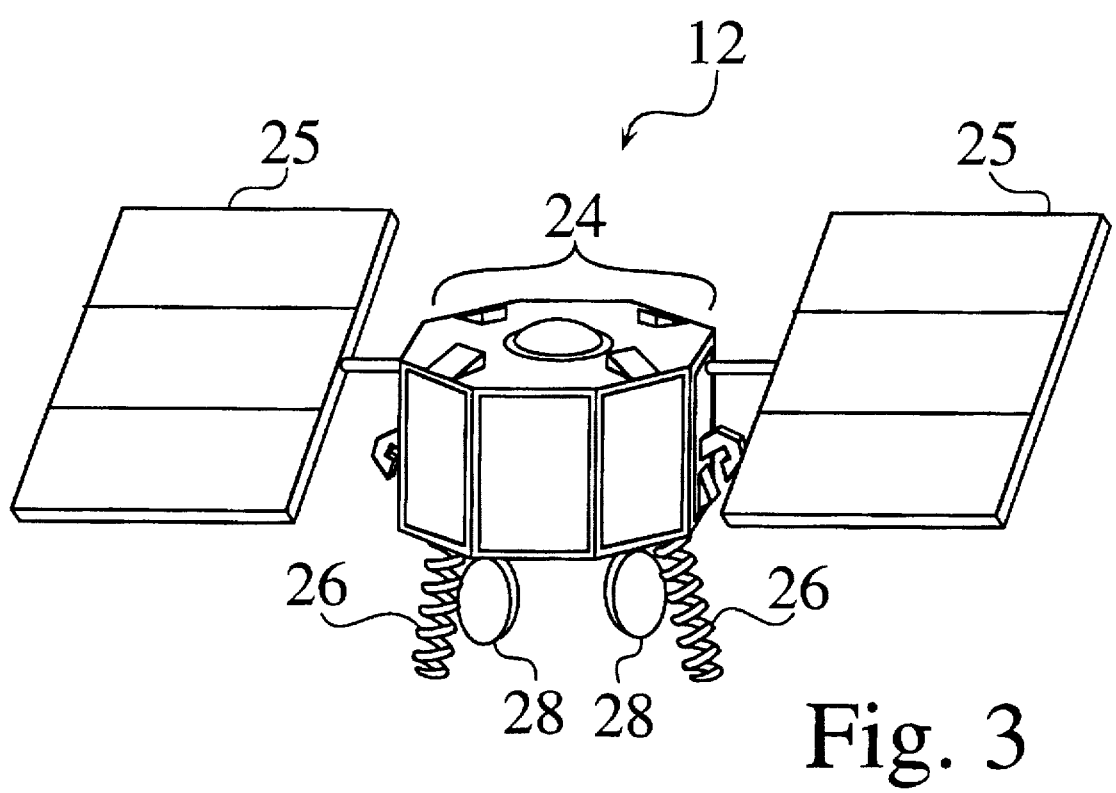
FIG. 3 is a schematic view of one of the embodiments of the satellites used to implement the present invention.

FIG. 3 is a schematic depiction of a satellite 12 that may be employed in one of the embodiments of the invention. This satellite 12 comprises a body 24, solar panels 25, a pair of helical antennas 26 and inter-satellite link antennas 28.

FIGS. 4 and 5 are maps 30 and 32 showing regions of the Earth which lie between 30 degrees North and 30 degrees South latitude.

FIG. 6 is a schematic diagram which exhibits relay stations 34 located on ground within 30 degrees of the Equator. These Equatorial relay stations 34 are capable of communicating with the satellites 12 in the Equatorial orbit via uplinks 35a and downlinks 35b.

FIGS. 7, 8 and 9 are maps 36, 44 and 48 that portray footprints 38, 46 and 50 which result from radio beams directed toward the Earth by satellites 12 flying in Equatorial orbit 14 at an altitude of 1,852 km. The footprints 38, 46 and 50 are produced by constellations of six, eight and fourteen satellites 12, respectively. Degrees of latitude are shown along the vertical axis, and are delineated by reference character 40, while degrees of longitude are shown along the horizontal axis, and are indicated by reference character 42.

FIG. 10 is a schematic representation 52 of satellites 12 in Equatorial orbit 14 which work in combination with relay stations 34 on the Earth E to send data over uplinks 35a and downlinks 35b. FIG. 11 is a diagram 54 which shows satellites 12 communicating over inter-satellite links 55. FIG. 12 reveals a diagram 56 of satellites 12 in Equatorial orbit 14 using a combination of ground relay stations 34 and inter-satellite links 55 to relay data. Any combination of ground relay stations 34 and inter-satellite links 55 may be employed to speed a message throughout a particular orbital plane. This novel use of relay stations 34 and inter-satellite links 55 enables the system to accelerate the delivery of a message payload to its destination instead of waiting for the satellites 12 in the orbit plane 14 to precess around the Earth to its point of delivery.

II. Combined Constellation Including Equatorial, Polar & Inclined Orbits

FIG. 13 reveals an illustration 58 of satellites 12 which occupy both Equatorial and polar orbits 14 and 60. Relay stations on the ground situated in both the Equatorial and polar regions 34 and 61 are used to convey messages across orbits.

FIG. 13 shows an embodiment which uses both Equatorial and polar orbits 14 and 60. In the discussion that follows, relay stations referred to as "Equatorial relay stations" are generally located within thirty degrees of the Equator. "Polar relay stations" are those situated near the North or South Poles. "Middle-latitude relay stations" are those which provide uplinks and downlinks that are not handled by either the Equatorial or polar relay stations.

The embodiment shown in FIG. 13 offers a system for transmitting a message through a series of Equatorial, polar and middle-latitude relay stations 34, 61 and 65. A first satellite 12 traveling in the Equatorial orbit 14 receives and stores a message from a first Equatorial relay station 34. This communication as indicated as an uplink transfer TR1 in FIG. 13. The first satellite continues eastward in its Equatorial orbit after this first uplink, and then sends the message down to a second Equatorial relay station 34 via downlink TR2. Once the satellite in polar orbit passes within range of this second Equatorial relay station, an uplink TR3 occurs, and a satellite heading for the North Pole carries the message Northward. Once this satellite in polar orbit passes over a polar relay station 61, downlink TR4 drops the message back to Earth. The same polar relay station 61 then sends the message up in transfer TR5 to a satellite flying south in a neighboring polar orbit 60. This Southbound satellite finishes the store-and-forward relay process by dropping the message to middle-latitude relay station 65 via downlink TR6. Any of these relays could be accelerated by intermediate caroms to other ground relay stations or by using inter-satellite links 55.

FIGS. 14 and 15A supply diagrams 62 and 64a of combined fleets of satellites comprising both Equatorial and inclined orbits 63. The inclined orbits 63 shown in FIG. 14 are inclined sixty degrees to the Equator, while those shown in FIG. 15A are inclined fifty degrees to the Equator. FIG. 15A is a perspective diagram of another constellation of satellites 12 which includes Equatorial orbits 14 and orbits inclined at fifty degrees to the Equator and in which the relay stations 34 are distributed internationally in a pattern of locations on the Earth which maximize coverage and minimize time to forward messages and data between any two user terminals. While the present invention may use any combination of Equatorial and inclined orbits, orbits inclined from fifty to sixty degrees from the Equator have been selected for the preferred embodiment. FIG. 15B presents yet another depiction 64b of a mixed constellation comprising Equatorial, polar and inclined orbits.

FIG. 16 illustrates the elevation angle 68 of approximately five degrees which is required for reliable operation of the present invention. The elevation angle 68 is the angle measured from the local horizon at a terrestrial terminal such as a relay station 34 up to the region of the sky where the relay station 34 will be capable of communicating with one of the satellites 12 in the constellation.

FIG. 17 is a graph of latitudinal reach versus altitude from an Equatorial orbit to a fifteen degree elevation angle.

III. Earth Segment Description

Distributed Relay Stations

As shown in FIG. 15A, a preferred embodiment 64a of the present invention employs approximately ten to one hundred "distributed" relay stations 34. The relay stations 34 are distributed internationally in a pattern of locations on the Earth E which maximize coverage and minimize time to forward messages and data between any two user terminals 212, as shown in FIG. 19. The relay stations are linked together in several ways as discussed below under the heading "Communication Links and Protocols".

FIG. 18 shows one of four orbital planes 210 which are inclined at fifty degrees to the Equator. In this embodiment, six equally spaced satellites 12 are placed in each circular, orbital plane 210 at an altitude of 950 kilometers (km). In this embodiment, there is no overlap of the satellite 12 radio beam footprints between satellites 12 in the fifty degree inclined orbits. Ground control of frequency assignments will prevent interference between satellites in these orbits and satellites in Equatorial orbit 14.

IV. Communications Links and Protocols

The present invention comprises a satellite system that will provide store-and-forward coverage of virtually all locations on the Earth's surface. The following discussion is based on one preferred embodiment 64a (refer to FIG. 15A) in which the constellation includes twenty-four satellites 12 in four orbital planes 210, equally spaced around the Equator and inclined at 50 degrees. In this preferred embodiment 64, each orbital plane 210 contains six equally spaced satellites in a circular orbit at an altitude of 950 km. While the detailed information in respect of power requirements, surface footprints of each satellite's radio beams, and the like are specific with respect to this embodiment, it will be appreciated by those skilled in the art that the methods and apparatus described are equally applicable to other embodiments having different constellations or orbital planes.

User terminals 212 are distributed randomly, primarily in portions of the Earth E which are inhabited. In FIG. 19, a primary method of communication between subscribers operating user terminals 212 is shown. A subscriber communicates with a satellite 12 by means of a user terminal-satellite uplink (TSU) 214. The satellite stores the message and forwards it at a later time to another subscriber by means of a user terminal-satellite downlink (TSD) 216. To reduce the time for delivery, the satellite is able to send the message to a relay station 34 through a relay station-satellite downlink (RSD) 35b. The relay station 34 retransmits the message to a second satellite 12 in an orbit 210 which will more quickly pass nearby to the addressee. The retransmission is through a relay station-satellite uplink (RSU) 35a. The second satellite 12 at a later time sends the message to the addressee through a user terminal-satellite downlink (TSD) 216.

In FIG. 19, relay station 34 is a message-forwarding terminal, since it holds a message from a subscriber obtained by means of a relay station-satellite downlink 35b transmission. The relay station 34 may hold this message until another satellite 12 in the constellation comes within range or, depending on the destination it may forward the message by one of the relay means described below.

Distributed Linked Relay Stations

The relay stations 34 are distributed internationally in a pattern of locations on the Earth E which maximize coverage and minimize time to forward messages and data between any two user terminals 212. To reduce the time of delivery of message traffic even further, the distributed relay stations 34 may be linked together in several ways as depicted in FIG. 20.

In one alternative embodiment, a group of Equatorial relay stations 224, eight to twelve in number, are spaced along the Equator 16. These Equatorial relay stations 224 are used to store and forward traffic sent from satellites travelling in opposite directions in orbits 210 inclined by fifty to sixty degrees. This method is similar to the method used by the polar relay stations 34 to store and forward traffic from satellites in more steeply inclined or polar orbits 60.

In another alternative embodiment, relay stations 34 are linked through a geostationary communication satellite 218 by use of very small aperture terminals (VSAT's). In a variation of this embodiment, large low Earth orbit communications satellites may be used for these linkages in place of the much higher altitude geostationary satellites 218.

In still another alternative embodiment, relay stations 34 are linked through public, switched telephone networks 220, which are available in most of the developed world. To provide a great deal of system reliability, certain relay stations 34 can function as a message-forwarding station, or a network operation control center (NOCC). For example, if the message held at a relay station in New York is addressed to an addressee in California, the message may be forwarded by the public, switched telephone network 220.

The ability of a relay station 34 to select among alternative network means to forward messages enables the provision of an "auction protocol" for users. In its initial communication with a user, the satellite 12 "announces" the level of traffic it is currently accepting. The level of traffic is varied from, say level one, the fastest and most expensive mode of delivery to the next fastest and less expensive mode of delivery and so on until the slowest and least expensive level is reached. A user can, therefore, elect to send a message at the highest level of service, or wait for a cheaper, lower level of service. This protocol is further discussed in the section describing the user terminal-satellite downlink 216 protocol.

The satellite system (52, 54, 56, 58, 62, 64a, 64b) will be distinguished by the range of services offered, the low cost of its service options relative to those offered by similar proposed service providers and its high spectral efficiency. The types of services provided by the present invention include tracking and monitoring for the transportation industry, monitoring of remote assets or site locations, such as vehicles, boats and vacation homes or remote utility equipment, E-mail, paging and emergency services.

Telecommunication Frequencies and Spectrum

The present invention has been designed from the outset to make efficient use of the scarce spectrum available. Table A3 below summarizes the total spectrum available in the U.S. for this type of service, resulting from the allocations made at WARC-92 and in the Commission's Order allocating spectrum for the NVNG MSS.

TABLE A3

| MSS Frequency Allocations Below 1 GHz | |
|---|---|
| Earth-to-Space | Space-to-Earth |
| 148.000 to 150.050 MHz | 137.000 to 138.000 MHz |
| 399.900 to 400.050 MHz | 400.150 to 401.000 MHz |

This amounts to a total of 2.2 MHz for the Earth-to-space links (uplink) and 1.85 MHz for the space-to-Earth links (downlink). However, parts of this available spectrum are only allocated on a secondary basis to the MSS service, and even the primary MSS allocations are allocated on a co-primary basis to other services, such as Fixed, Mobile, Meteorological-Satellite, Space Operation, Space Research and Meteorological Aids. The ability of the system to effectively and efficiently share the spectrum in this type of environment is therefore of paramount importance.

FIG. 21 graphically depicts the frequencies and bandwidths at which the satellite system will communicate messages. The TSUs and the RSUs will operate in the 148–149.9 MHz band and the TSD and RAD will operate in the 137.175–137.825 MHz band. All of the links will carry "packetized" digital data. Network packets will be used for resource request and assignment, and other network control functions. Monitoring packets will be used for monitoring applications. Text packets will be used for message applications. The Text packet length will be selected to comply with footnote US323 to the Frequency Allocation Table, 47 C.F.R. §2.106. Footnote US323 requires that, in the 148–149.9 MHz band, single transmissions from individual Earth stations may not exceed 450 msec in duration (4160 bits/9.6 kbps=433.3 msec).

Frequency assignments for the satellite downlinks (35a, 216) will be in four segments. That is, for all satellites 12 in a given orbital plane 210, the frequencies will be the same. Because of no overlap in the radio beam footprints of the six satellites 12 travelling in each fifty degree inclined orbit 210, there is no interference between these satellites 12. Ground control of frequency assignments will prevent interference between satellites 12 in these orbits and satellites 12 in Equatorial orbit 14.

In this embodiment 64a, since satellites 12 in sectors of orbits 210 on the same side of the Earth E will be transmitting on the same frequencies without interference from other satellites 12, it is possible to reduce the bandwidth of the TSD downlink signal spectrum to one-fourth of that used in some other embodiments.

Each satellite 12 in this embodiment 64a has six receive channels. Other embodiments may require up to fifteen receive channels. The method of channel assignment to the user terminal transmitters is discussed below in the Section entitled "Dynamic or Adaptive Channel Assignment".

Data Transmission

FIG. 22 is a packet structure diagram 225 showing the information contained in certain fields. For example, the first field may contain the address of the recipient. The second field may contain the "hop" count or how many relays have occurred to the current time. The next field may contain the sequence count or frame number. The fourth field may contain the sender's identification, and so on. Table A4 below describes the packet structures.

TABLE A4

| Packet Structures | | | |
|---|---|---|---|
| | Network | Monitoring | Text |
| Data | 12 bytes | 80 bytes | 500 bytes |
| Overhead | 20 bytes | 20 bytes | 20 bytes |
| Total | 32 bytes | 100 bytes | 520 bytes |

The user terminal-satellite link bit error rate objective is $10^{-6}$ and the relay station-satellite link bit error rate objective is $10^{-8}$. The packet overhead bits allow for synchronization, parity check, sequencing, status, and addressing and routing. Forward error correction coding is employed in the store-and-forward system. Raw data bits are mapped into symbols in a manner which results in each symbol containing information about multiple bits. Lost data bits can therefore be recovered.

Each satellite will support fifteen TSUs 214 at a data transmission rate of 9.6 kilobits per second (kbps), one TSD 216 at a data rate of 24 kbps, one RSU 35a at a data rate of 50 kbps, and one RSD 35b at a data rate of 50 kbps. Thus, the user terminals 212 may transmit at 9.6 kbps and receive at 24 kbps. The TSU bandwidth is 15 Kilohertz (KHz) and the TSD bandwidth is 28.8 KHz. The relay stations 34 will transmit and receive at 50 kbps and have a bandwidth of 50 KHz for the uplink and 60 KHz for the downlink. While the nominal TSU transmission data rate is 9.6 kbps, lower cost user terminals 212 are possible if lower data rates are used. Therefore, data rates as low as 300 bps will be available. For example, a user terminal 212 might transmit at standard data rates of 9600, 4800, 2400, 1200, 600 or 300 bps. Besides the low cost and availability of equipment capable of the lower transmission rates, battery power requirements are reduced substantially which makes this method attractive for hand held or periodic reporting user terminals 212. For example, burst power for a 300 bps signal is only about 20 milliwatts compared to about five watts for a 9.6 kbps signal.

The system will use a combination of random access and frequency division multiplexing (FDM) for the TSUs 214 and time division multiplexing (TDM) for the other links. FDM is preferred for the TSUs 214 because it does not require high burst power transmissions from the user terminals 212 that would be required for a single wideband TDM channel. TDM is preferred for the other links because it allows for the use of efficient saturated power amplifiers in the satellites 12 and relay stations 34, 61, 65. Back-off is not required to control intermodulation levels since there will be only a single RF carrier in these links.

All of the links will use differentially encoded offset-quadraphase shift keying (OQPSK) modulation filtered for 50% excess bandwidth in combination with rate 7/8, constraint length 7, convolutional coding. This format has been selected because of its high combined modulation/coding efficiency of 1.17 bits/sec/Hz.

However, frequency shift keying (FSK) modulation is also used on a time-shared basis to support low-cost user terminals 212. A user terminal 212 can use an FSK demodulator absorbing only "trickle" power, i.e., low current, while waiting for a satellite signal to appear. An FSK signal can be sent at reduced data rate, for example 6 kbps, because of a smaller portion of spectrum occupied by an FSK modulated signal. A ground station looks for an ID code in the FSK mode. It can then, if desired, turn on the OQPSK keying demodulator and operate at a faster rate.

The downlink (35b, 216) signal is partitioned into 500 millisecond (msec) frames. Initially, signals are FSK modulated. Later signals in the 500 msec frame may be FSK or OQPSK modulated depending on the demand. The network operation control center NOCC varies the time-sharing between FSK and OQPSK modulation depending on traffic load.

The uplink (35a, 214) signals are OQPSK modulated, although the use of FSK modulation and lower data rates offer some cost reduction.

The required channel bandwidths are a function of the data rate, the spectral efficiency of the modulation and coding, the user terminal or relay station and satellite frequency stability, the uncompensated Doppler shift and the channel filtering. The required channel bandwidths are summarized in Table A5.

TABLE A5

Channel Bandwidth Requirements

|  | User Term. Uplink | User Term. Downlink | Relay Sta. Uplink | Relay Sta. Downlink |
|---|---|---|---|---|
| Signal Bandwidth | 8.2 KHz | 19.1 KHz | 42.8 KHz | 42.8 KHz |
| +/− Frequency | 0.6 | 0.3 | 0.3 | 0.3 |
| +/− Doppler | 6.2 | 5.6 | 6.2 | 16.6 |
| Total Channel Bandwidth | 15 15 KHz* | 25 25 KHz | 49.3 50 KHz | 59.7 60 KHz |

*A single user terminal requires 15 KHz, therefore fifteen[ ]simultaneous users require 225 KHz bandwidth.

To implement the "auction" protocol, the satellite 12 indicates what level of traffic it is accepting within the 500 ms frame of the first burst of dam. User terminals wishing to send that level of traffic will do so. Terminals having lower levels of traffic will wait. The auction protocol sequentially lowers the level of traffic it is accepting until all users desiring the highest to the lowest level of service are accommodated.

The present invention uses a combination of random access and frequency division multiplexing (FDM) for the TSUs and time division multiplexing (TDM) for the other links. FDM is preferred for the TSUs because it does not require high burst power transmissions from the transceivers that would be required for a single wideband TDM channel. TDM is preferred for the other links because it allows for the use of efficient saturated power amplifiers in the satellites and relay stations. Back-off is not required to control intermodulation levels since there will be only a single RF carrier in these links.

Dynamic or Adaptive Channel Assignment

FIG. 24 depicts a functional block diagram of the satellite subsystems which includes the RF communications subsystem 230. The satellite's communications payload 280 which includes the RF communications subsystem 230 a computer subsystem and a frequency reference, is shown in block diagram in FIG. 24. The satellite 12 monitors the pool of frequencies in the 148.0 to 149.9 MHz band and assigns channels to user terminals 212 as available. A band scanning receiver contained in the RF communications section 230 of the satellite 12 is a digital spectrum analyzer. The receiver scans the TSU band each 0.5 seconds for TSU signals. The computer subsystem projects channel usage for the next 0.5 seconds and in the first burst of the protocol, instructs a calling user terminal 212 which channel to use. An algorithm is used to make the channel projection based on the half-second sample history.

Communications Payload Description

A functional block diagram of the satellite's communications payload 280 is shown in FIG. 24. The antenna subsystem converts the free space propagated waveforms into RF signals for processing by the user terminal-satellite uplink (TSU) receiver, the relay station-satellite uplink (RSU) receiver, and the band scanning receiver. It also converts the RF signals from the user terminal-satellite downlink (TSD) transmitter and the relay station-satellite downlink (RSD) transmitter into free space propagated waveforms. Two transmitting antennas are used, one for the TSD links and the other for the RSD links. This will eliminate the combining loss that would occur if the TSD and RSD signals were radiated from the same antenna.

The spacecraft antennas will be shaped to partially compensate for the changing free space propagation loss due to the range variation that occurs between the time the satellite appears at the lowest elevation angle and the time it is directly overhead. This maximum variation in path loss corresponds to about 7.5 dB in propagation loss. As a result, the preliminary spacecraft antenna design has a gain of −2 dBi in the nadir direction and +5.5 dBi at a fifteen degree grazing angle. The satellite antenna gain pattern is shown in FIG. 25. The satellite antennas will be left-hand circular polarized, though right-hand polarization is also possible.

The TSU receiver will downconvert, demodulate, and decode the uplink signals received from the transceivers. The TSU receiver will provide the demodulated packets to the computer subsystem at 57.6 kbps for processing. The RSU receiver will perform the same functions for the RSU channel.

The TSD transmitter will accept packetized data from the computer subsystem at 24 kbps, encode and modulate the data, upconvert it to the transmit channel frequency, and provide 20 watts of transmit power using a solid-state power amplifier (SSPA). The RSD transmitter will perform the same functions for the 50 kbps RSD data using a 2.5 W SSPA.

The band scanning receiver will scan the potential transceiver-satellite uplink channels in the 148–149.9 MHz band in 15 KHz increments to determine channel activity and signal levels. The six least active channels will be identified twice per second and this information will be broadcast to the transceivers.

The frequency reference subsystem 326 will provide stable frequency and time signals to the other functions. The computer subsystem 324 will process all of the received packets, store them in memory, and retransmit them as required. It also will use the data from the band scanning receiver to make TSU channel assignments.

Key communications payload 280 parameters are shown in Table A6.

TABLE A6

Key Satellite Communications Payload Parameters

Antenna

| | |
|---|---|
| Nadir Gain | −2 dBi |
| Edge of Coverage Gain | 5.7 dBi |
| Edge of Coverage Beamwidth | 114 degrees |
| Polarization | LHC |

TSD Transmitter

| | |
|---|---|
| Frequency Band | 137.175–131.825 MHz |
| Number of Channels | 1 |
| Transmit Power | 25 W |
| 99% Power Channel Bandwidth | 17.1 KHz |
| Data Rate | 24 kbps |

RSD Transmitter

| | |
|---|---|
| Frequency Band | 137.175–137.825 MHz |
| Number of Channels | 1 |
| Transmit Power | 15 W |
| 99% Power Channel Bandwidth | 42.8 KHz |

TABLE A6-continued

| Key Satellite Communications Payload Parameters | |
|---|---|
| Data Rate | 50 kbps |
| TSU Receiver | |
| Frequency Band | 148–149.9 MHz |
| Number of Channels | 15 |
| Channel Bandwidth | 15 KHz |

Application-specific transceiver configurations will be constructed by combining the modem module 300 with other modules, as shown in FIG. 28. A schematic illustration of the modem module 300 is provided in FIG. 29. Table A7 provides examples of how these modules might be combined for different applications, although other combinations are possible. Prices for a basic transceiver are expected to be under US $500.

TABLE A7

Possible Module Combinations for Different Applications

| Applications | Leo One Modem | Battery Pack | Whip Antenna | AC Adapter | Expanded Memory | GPS | Parallel Interface | Palm-top PC |
|---|---|---|---|---|---|---|---|---|
| Status Monitoring | X | X | X | | | | X | |
| Vehicle Tracking | X | | | | | X | | |
| Paging | X | X | X | | | | | |
| E-Mail | X | X | X | X | | | | X |
| Security Monitoring and Control | X | X | X | | | | X | |
| Emergency Alerting | X | | X | X | | | | |

TABLE A6-continued

| Key Satellite Communications Payload Parameters | |
|---|---|
| Per Channel Data Rate | 9.6 kbps to 300 bps, variable |
| Noise Figure | 4 dB |
| RSU Receiver | |
| Frequency Band | 148–149.9 MHz |
| Number of Channels | 1 |
| Channel Bandwidth | 50 KHz |
| Per Channel Data Rate | 50 kbps |
| Noise Figure | 7 dB |
| Band Scanning Receiver | |
| Frequency Band | 148–149.9 MHz |
| Number of Channels | 1 |
| Channel Bandwidth | 2.5 KHz |
| Noise Figure | 4 dB |
| Frequency Reference | |
| Frequency Stability | 0.1 PPM over environment and time |
| Computer | |
| Memory | 16 Mbytes |

The TSD and RSD transmitter filters response characteristics are shown in FIGS. 26 and 27 respectively. These filters protect the radio astronomy service in the 150.05–153 MHz and 406.1–410 MHz bands from harmful interference by limiting spurious emissions in those bands.

Because the spacecraft will be processing satellites, it will be impossible for signals received from sources outside of the network to cause output signals different from intended output signals.

V. User Terminals

As illustrated by FIG. 28, the present invention will provide a family of low-cost user terminals or transceivers to support a variety of different applications. The heart of these transceivers is the modem module 300. The modem 300 will be small, less than ten cubic inches, and capable of battery operation. It will be available in pocket-sized, desktop, and vehicle mounted transceiver configurations.

User Terminal Technical Parameters

The modem module 300 will interface directly with an antenna 314. In most applications, the standard antenna 314 will be a normal-mode helix similar to those used with conventional hand-held VHF transceivers. In vehicle mounted applications, the standard vehicle FM radio antenna or an enhanced replacement will be used.

The TSD receiver 320 will downconvert, demodulate, and decode the 24 kbps satellite downlink channel. The TSU transmitter 322 will accept packetized data from the computer subsystem 324 at rates variable from 9.6 kbps to 300 bps, encode and modulate the data, upconvert it to the transmit channel frequency, and provide about 5 W of transmit power. The frequency reference subsystem will provide stable frequency and time signals to the other functions. The computer subsystem will process the received packets and make the data available to the other modules or directly to the subscriber via an RS-232 port. The computer 324 will receive data to be packetized and uplinked from other modules or directly from the subscriber via an RS-232 port.

The key user terminal 212 technical parameters are summarized in Table A8. User terminals 212 are designed to be incapable of radiating in the 108–137 MHz bands.

The satellites have high velocities relative to a fixed terminal on the Earth's surface resulting in large Doppler shifts on the transmitted and received RF carriers. In the 148–149.9 MHz uplink band, the worst case Doppler shifts will be 2.2 KHz and in the 137–138 MHz downlink band they will be 2.0 KHz. The user terminals will track the user terminal-satellite downlink Doppler, scale the measured value by the uplink/downlink frequency ratio, and precompensate the user terminal-satellite uplink transmissions such that the signals are received at the satellite with no apparent Doppler shift. This will virtually eliminate frequency acquisition time at the satellite. Even an inexpensive user terminal frequency reference will reduce the apparent Doppler to less then 300 Hz. The maximum user terminal transmit power of about 5 W in conjunction with the low, 1% maximum, duty cycle will ensure that the user terminals will comply with all relevant radiation exposure safety standards.

TABLE A8

Key User Terminal Parameters

Antenna

| | |
|---|---|
| Pattern | Non-Directional |
| Polarization | Vertical |

Transmitter

| | |
|---|---|
| Frequency Band | 148–149.9 MHz |
| Channel Bandwidth | 15 KHz |
| Number of Active Channels | 1 |
| Doppler Pre-Compensation | ±2.2 KHz |
| Transmit Power | 5 W |
| Burst Duration | 450 msec |
| Burst Spacing | 15 seconds |
| Duty Cycle | 9 seconds every 15 minutes |
| 99% Power Bandwidth | 8.2 KHz |
| Modulation | OQPSK |
| Coder | Convolutional r = ⅞, K = 7 |
| Data Rate | 9.6 kbps to 300 kbps |

Receiver

| | |
|---|---|
| Frequency Band | 137.175–137.825 MHz |
| Channel Bandwidth | 25 KHz |
| Number of Active Channels | 1 |
| Doppler Pull-In Range | ±2.0 KHz |
| Demodulation | OQPSK & FSK |
| Decoder | Soft Decision Viterbi r = ⅞, K = 7 |
| Data Rate | 24 kbps |
| Noise Figure | 7 dB |
| Implementation Loss | 2 dB |

Frequency Reference

| | |
|---|---|
| Frequency Stability | 1.0 PPM over environment and time |

TABLE A9

Key Relay Station Technical Parameters

Antenna

| | |
|---|---|
| Operating Frequency | 137–138 MHz & 148–149.9 MHz |
| Polarization | LHC |
| Gain | 16 dBi |
| Half Power Beamwidth | 22.5 degrees |

Receiver

| | |
|---|---|
| Frequency Band | 137.175–137.825 MHz |
| Channel Bandwidth | 50 KHz |
| Number of Channels | 1 |
| Doppler Shift | 2.1 KHz |
| Demodulation | Differential OQPSK |
| Decoding | Soft Decision Viterbi, r = ⅞, K = 7 |
| Data Rate | 50 kbps |
| Noise Figure | 4 dB |
| Implementation Loss | 2 dB |

Transmitter

| | |
|---|---|
| Frequency Band | 148–149.9 MHz |
| Channel Bandwidth | 50 KHz |
| Signal Bandwidth (99% power) | 71.3 KHz |
| Number of Channels | 1 |
| Transmit Power | 1.8 Watts |
| Modulation | Differential OQPSK and FSK |
| Coding | rate-⅞, constraint length 7 convolutional |
| Data Rate | 50 kbps |

Frequency Reference

| | |
|---|---|
| Frequency Accuracy | 0.1 PPM over environment and time |

User Terminal and Relay Station Antenna Gain Patterns

A typical user terminal 212 antenna gain pattern is shown in FIG. 30. A typical relay station 34 antenna gain pattern is shown in FIG. 32.

Relay Station Technical Parameters and Operation

A relay station 34 functional block diagram 330 is shown in FIG. 31. The RSD receiver 334 will downconvert, demodulate, and decode the 50 kbps satellite downlink channel and provide the demodulated packets to the computer subsystem for subsequent processing. The RSU transmitter 332 will accept packetized data from the computer subsystem 336 at 50 kbps, encode and modulate the data, upconvert it to the transmit channel frequency, and provide 1.8 W of transmit power.

The frequency reference subsystem 338 will provide stable frequency and time signals for the other functions. The computer subsystem 336 will perform the packet and network overhead functions including packet routing and billing. It will control the open loop pointing of the relay station antenna to acquire and follow the satellites. In addition, it will process Doppler frequency measurements of the satellite signals to refine their orbital estimates.

The TT&C subsystem 340 will decode and process the telemetry data packets from the satellites 12 and generate and encode command packets for transmission to the satellites. All of the TT&C data will be encrypted to prevent unauthorized control of the satellites.

The NOCC subsystem 342 will allow for control of the constellation. The NOCC functions will include resolving overlap conflicts by commanding one of the overlapping satellites to cease operation during the overlap and monitoring constellation traffic levels.

The key relay station technical parameters are summarized in Table A9.

The relay stations 34 will poll the satellites 12 to initiate data transfer. The relay stations 34 will predict when each satellite will appear above the minimum elevation mask angle and use open loop pointing of the relay station 34 antenna to acquire and follow the satellite 12. The relay stations 34 will estimate the satellite signal Doppler shift to minimize acquisition time. The relay stations 34 will use Doppler frequency measurements of the satellite signals to refine their orbital estimates.

The relay station-satellite uplink (RSU) and relay station-satellite downlink (RSD) signals are partitioned into 500 msec frames. Each frame will be divided into two time slots. The first time slot will be reserved for network control (Network packets). The remaining time slot will allow for the transfer of Text packets, Monitoring packets, or some combination. All packet exchanges will be acknowledged by the recipient using Network packets. The relay station 34 and the satellite will send at least one Network packet in the network control time slot until the relay station signs off.

VI. Satellite & Orbital Configurations for Preferred & Alternative Embodiments

FIGS. 33 and 34 are graphs which reveal VHF antenna design trades for a 100 W transmitter for altitudes of 1,100 km and 1,856 km, respectively. FIGS. 35 and 36 present graphs which reveal UHF antenna design trades for a 100 W transmitter for altitudes of 1,100 km and 1,856 km, respectively. FIG. 37 shows mean and maximum response times for four satellites at different altitudes and latitudes. FIG. 38 exhibits the percent of time that a range of latitude is covered by four satellites moving in Equatorial orbits. FIG. 39 depicts mean and maximum response times for six satellites at various latitudes. FIG. 40 shows the percent of time that a range of latitude is covered by six satellites moving in Equatorial orbits. FIG. 41 displays mean and maximum response times for eight satellites at various latitudes. FIG. 42 portrays the percent of time that a range of latitude is covered by eight satellites moving in Equatorial orbits. FIG. 43 supplies a graph which illustrates the altitude required for thirty-five degree latitude coverage at a specified elevation angle. FIGS. 44, 45 and 46 provide schematic block diagrams of electronics that are utilized to implement one of the embodiments of the invention. FIG. 44 shows the VHF only payload, FIG. 45 shows dual VHF and UHF downlink modules and FIG. 46 shows a combined VHF and UHF payload diagram. FIG. 47 shows how satellites transfer dam from an Equatorial to an inclined orbit via a crosslink through a relay station. FIGS. 48, 49 and 50 are diagrams showing satellite footprints for satellites orbiting at 800 km, 1,100 km and 1,852 km altitudes. FIGS. 51, 52 and 53 portray mean and maximum response times for satellites orbiting at 800 km, 1,100 km and 1,852 km altitudes.

VII. Other System Services

Besides those services identified above, other system services can be easily provided by the present invention. Some of these are described below.

Seaborne Radio Beacon System

FIG. 54 shows schematically a radio beacon system 350 for monitoring sea environment and tracking data with deployed buoys 352 transmitting data through the satellite constellation-to-ground terminal links 214, 35b, 220 of this invention. A low cost buoy 352 is fitted with environmental and weather instrumentation 356 and/or an energy sensing device such as an underwater listening device 354. The buoy also contains a position-determining device such as LORAN or Global Positioning System (GPS). An on-board user terminal 212 sends buoy-collected environmental, sensed energy, tracking and positioning digital data through the TSU 214 to the satellite 12. The data is then disseminated to a receiving party through a relay station 34 and terrestrial communication links 220 so as to minimize transmission time. As an example, oil spills can be tracked by dropping such a buoy 352 into the slick from an aircraft.

Interactive Television Return Link

FIG. 55 is a schematic depiction of an interactive television system 360 which uses a return link from a viewer to a TV broadcaster through the satellite constellation of this invention. A television signal 361 from a direct broadcasting satellite such as C band or Ku band devices is captured by an integrated antenna system 365 consisting, for example, of a small dish antenna 364 which receives the TV satellite signal and an integrated whip antenna 362 for communication with a satellite 12 operating in accordance with the present invention. The user views the television program on a TV screen 372 which is derived from a television signal 361 in a TV converter 366, carried through coaxial cable 363. The converter 366 is integrated with a modem 300 and connected to a personal computer or other digital data input device 368. The user sends his interactive responses to a broadcaster by entering them in the computer 368 which is converted to a TSU signal 214 by the modem 300 and transmitted as digital data to a satellite 12 for delivery to the broadcaster.

FIG. 56 is a schematic depiction 380 of the return links from a viewer of a direct broadcasting satellite 382 TV broadcast 361 through the terminal-satellite uplink 214, satellite constellation-to-ground terminal downlinks 35b of this invention and terrestrial based data networks 220. It is also possible for a broadcaster or intermediary to confirm the receipt of the user's data by returning a message through the satellite constellation-to-ground terminal links 35b and the terminal-satellite downlink 216.

Connectivity of Office or Factory Data to Other Systems from Within a Structure

FIG. 57 is a schematic diagram of a system 390 revealing a method of providing connectivity to other systems from movable devices or devices with low rate data inside a building 392 or other structure which shields the user's radio signal from the satellite. The data input devices 391 may be pagers, computers, facsimile machines, copy machines, etc. A non-licensed personal communication service (PCS) 394 is coupled to a data input device 391 through a coupling device 396. The coupling device 396 may be a PCMCIA, RS232, RJ11 or other connector. Such a personal communication system is limited to low power, short range transmitters. The data is transmitted by the PCS to a nearby, integrated terminal 398 which contains a PCS transceiver coupled to a LEO One USA™ modem 300. An antenna 399 is connected to the modem 300. This system offers a user 395 two-way data communication even though he or she is shielded in a windowless structure or perhaps underground. The modem 300 retransmits the data through the antenna 399 as a TSU signal 214 to a passing satellite 12 of the invention. The data may be forwarded by the satellite 12, such relay stations 34, VSAT links (222) and PSTN (220) as minimizes transmission time. Return messages are received from a satellite 12 via the TSD 216 and relayed through the unlicensed PCS 394. The integrated terminal 398 may be powered by a solar panel 397. Such systems 390 are particularly useful in very old structures, third-world locations and other situations where direct wiring from the data input device 391 to the modem 300 is difficult or expensive to install. The system 390 also has use where the data input device 391 is movable or portable.

Time Synchronization Broadcasts

Many devices, including consumer products and industrial control devices require or make use of time information. Electric clocks can drift or be delayed by power outages. Currently, a time standard is supplied world-wide by The National Bureau of Standards through short wave radio stations WWV. The recipient must have a short wave receiver and substantial antenna to receive these signals reliably. For automatic synchronization, the WWV signal must be decoded and applied to a device through sophisticated electronics means which would be much too expensive for the average consumer and the average industrial user.

Satellites 12 orbiting in the constellation of this invention can transmit narrow data messages at regular intervals that can be used to synchronize clocks to the National Bureau of Standards clock anywhere in the world through a relatively inexpensive user terminal. A satellite 12 would broadcast Universal Coordinated Time (UTC) signals which are converted to local time by a customer setting the appropriate time zone into his system.

Monitoring Remotely Installed Devices or Machines for Non-Functioning or Needed Repair Almost any type of device or machine remotely installed from a responsible owner's home office can be monitored for non-functioning by means of an inexpensive user terminal 212 connected to the device to be monitored and transmitting the data through a satellite 12 orbiting in the constellation of this invention. This type of monitoring reduces or eliminates the need for personnel to patrol the devices or machines. For example, remote boulevard lights can be fitted with a switch which indicates failure of the lamp. A transmitter reacts to the operation of the switch by sending a packet containing a short code which identifies the location of the boulevard light. Other similar uses are possible:

monitoring overnight mail drops for packages to be picked up or for replenishing supplies; monitoring vending machines for replenishing stock; monitoring aircraft warning lights on tall buildings or hazards, where failure of these lights can result in significant financial penalties to the owner, etc.

Wide Area Broadcast of Updated Information

Market data on a near-real time basis can be disseminated on a global basis through satellites 12 orbiting in the constellation of this invention. Field sales representatives can receive, for example, updated price adjustments and monetary exchange rates. Brokers can receive updated securities quotes from world-wide markets, interest rates and commodity prices. Other users can receive updated weather, sports information, etc. While the transmission of these data is well known, the use of the satellite system of the present invention presents a novel, unique and efficient method of reaching users on a regional, national and international basis, leading to a more competitive business.

World-Wide Synchronization of Clocks to Universal Coordinated Time (UTC)

Coordination of clocks to Universal Coordinated Time can be accomplished by obtaining Universal Coordinated Time (UTC) signals provided by the National Bureau of Standards, through a communication link (35a, 220) and broadcasting the UTC signals through a plurality of satellites (12). UTC signals are received at the user terminals (212) and are coupled to a clock in a local clock system. The local clock system is capable of responding to the broadcast UTC signals. The UTC signals are passed to the local clock system and clocks in the system are synchronized to the UTC signals.

CONCLUSION

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital parameters, satellites altitudes and populations and locations of the user terminals and relay stations that have been disclosed above are intended to educate the reader about preferred embodiments, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

LIST OF REFERENCE CHARACTERS

FIG. 1

| | |
|---|---|
| 10 | Illustration of one embodiment of invention using six satellites in Equatorial orbit |
| 12 | Satellite |
| 14 | Equatorial orbit |
| 16 | Equator |
| 18 | 30 degrees North latitude |
| 20 | 30 degrees South latitude |
| E | Earth |

FIG. 2

| | |
|---|---|
| 22 | Illustration of one embodiment of invention using fourteen satellites in Equatorial orbit |

-continued

LIST OF REFERENCE CHARACTERS

FIG. 3

| | |
|---|---|
| 24 | Satellite body |
| 25 | Solar panels |
| 26 | Helical antennas |
| 28 | Inter-satellite link antennas |

FIGS. 4 & 5

| | |
|---|---|
| 30 | Coverage areas on ground between 30 degrees North & 30 degrees South |
| 32 | Coverage areas on ground between 30 degrees North & 30 degrees South |

FIG. 6

| | |
|---|---|
| 34 | Relay stations located on ground within 30 degrees of Equator |

FIGS. 7, 8 & 9

| | |
|---|---|
| 36 | Illustration of footprints from 6 satellites in Equatorial orbit at 1,852 km |
| 38 | Footprint from one of 6 satellites at 1,852 km |
| 40 | Latitude |
| 42 | Longitude |
| 44 | Illustration of footprints from 8 satellites in Equatorial orbit at 1,852 km |
| 46 | Footprint from one of 8 satellites at 1,852 km |
| 48 | Illustration of footprints from 14 satellites in Equatorial orbit at 1,852 km |
| 50 | Footprint from one of 14 satellites at 1,852 km |

FIG. 10

| | |
|---|---|
| 52 | Diagram of satellites in Equatorial orbit using ground stations to relay data |

FIG. 11

| | |
|---|---|
| 54 | Diagram of satellites in Equatorial orbit using inter-satellite links to relay data |
| 55 | Inter-satellite links |

FIG. 12

| | |
|---|---|
| 56 | Diagram of satellites in Equatorial orbit using ground stations and inter-satellite links to relay data |

FIG. 13

| | |
|---|---|
| 58 | Diagram of satellites in Equatorial and polar orbits with Equatorial and polar relay stations |
| 60 | Polar orbits |
| 61 | Polar relay station |
| 65 | Relay stations at middle latitudes |
| NP | North Pole |
| TR1 | Transfer 1 |
| TR2 | Transfer 2 |
| TR3 | Transfer 3 |
| TR4 | Transfer 4 |
| TR5 | Transfer 5 |
| TR6 | Transfer 6 |

FIG. 14

| | |
|---|---|
| 62 | Illustration of combined fleet of satellites in Equatorial and 60 degree inclined orbits |
| 63 | Orbits inclined at 60 degrees |

FIGS. 15A & 15B

| | |
|---|---|
| 12 | Satellite |
| 14 | Equatorial orbit |
| 34 | Relay stations within 30 degrees of Equator |
| 64a | Illustration of combined fleet of satellites in Equatorial orbit and 50° inclined orbits |
| 64b | Illustration of combined fleet of satellites in Equatorial orbit, polar orbits and inclined orbits |
| 65 | Relay stations at middle latitudes |
| 210 | Fifty degree inclined orbit |

FIG. 16

| | |
|---|---|
| 34 | Relay stations |
| 68 | Elevation angle |
| E | Earth |

-continued

| LIST OF REFERENCE CHARACTERS | |
|---|---|
| FIG. 18 | |
| 12 | Satellite |
| 16 | Equator |
| 210 | Fifty degree inclined orbit |
| E | Earth |
| NP | North pole |
| SP | South pole |
| FIGS. 19, 20 & 21 | |
| 12 | Satellite |
| 34 | Relay stations |
| 35a | Relay station uplink (RSU) |
| 35b | Relay station downlink (RSD) |
| 212 | User terminal |
| 214 | Terminal-to-satellite uplink (TSU) |
| 216 | Terminal-to-satellite downlink (TSD) |
| 218 | Geostationary communications satellite |
| 220 | Public, switched telephone network (PSTN) |
| 222 | Satellite very small aperture terminal (VSAT) links |
| 224 | Equatorial relay stations |
| FIG. 22 | |
| 225 | Packet structure diagram |
| FIG. 23 | |
| 230 | RF communications subsystem |
| 240 | Tracking, telemetry & control computer |
| 250 | Attitude determination and control subsystem |
| 260 | Electric power subsystem |
| 270 | Thermal control subsystem |
| FIG. 24 | |
| 280 | Communications payload block diagram |
| FIG. 28 | |
| 300 | Modem module |
| 302 | Expanded memory |
| 304 | Parallel interface |
| 306 | AC adapter |
| 308 | Palmtop personal computer |
| 310 | Global positioning system |
| 312 | Battery pack |
| 314 | Whip antenna |
| FIG. 29 | |
| 300 | Modem module |
| 314 | Antenna |
| 320 | Terminal-to-satellite downlink (TSD) receiver |
| 322 | Terminal-to-satellite uplink (TSU) transmitter |
| 324 | Computer subsystem |
| 326 | Frequency reference |
| FIG. 31 | |
| 330 | Relay station functional block diagram |
| 332 | Relay station-to-satellite uplink (RSU) transmitter |
| 334 | Relay station-to-satellite downlink (RSD) receiver |
| 336 | Computer subsystem |
| 338 | Frequency reference |
| 340 | Tracking, telemetry and control subsystem |
| 342 | Network operation and control center subsystem |
| 344 | Public switched telephone network (PSTN) interface |
| FIGS. 54, 55, 56 & 57 | |
| 12 | Satellite |
| 34 | Relay stations |
| 35a | Relay station uplink (RSU) |
| 35b | Relay station downlink (RSD) |
| 212 | User terminal |
| 214 | Terminal-to-satellite uplink (TSU) |
| 216 | Terminal-to-satellite downlink (TSD) |
| 220 | Public switched telephone network (PSTN) |
| 300 | Modem module |
| 350 | Schematic illustration of a user service employing deployed buoys for sending remote data |
| 352 | Deployed buoy |

-continued

| LIST OF REFERENCE CHARACTERS | |
|---|---|
| 354 | Underwater listening device |
| 356 | Environmental & weather instruments |
| 360 | Schematic depiction of an interactive television system using a return link from a viewer to a TV broadcaster through the satellite constellation of this invention. |
| 361 | Television signal provided by broadcasting satellite |
| 362 | TSU whip antenna |
| 363 | Coaxial cable from antenna to video and data input equipment |
| 364 | TV satellite antenna |
| 365 | Integrated antenna system |
| 366 | TV converter/tuner and modem for communicating with the satellite constellation used in this invention |
| 368 | Data input device, e.g., personal computer |
| 372 | TV receiver |
| 380 | Schematic depiction of the return link from a viewer of a satellite TV broadcast through the satellite constellation-to-ground terminal links of this invention and terrestrial based data networks |
| 382 | TV broadcasting satellite |
| 390 | Schematic depiction of a method of providing connectivity to movable devices or devices with low rate data inside a building which shields the user's radio energy from the satellite |
| 391 | Data input device, e.g., personal computer, handy-talky, pager, etc. |
| 392 | Building shielding user from satellite |
| 394 | Personal communication system (PCS) within building |
| 395 | User |
| 396 | Interconnection device; e.g., PCMCIA, RS232 or other modem |
| 397 | Solar panel |
| 398 | Integrated pcs transmitter/receiver and TSU transmitter/TSD receiver |
| 399 | TSU/TSD antenna |

What is claimed is:

1. A satellite communications system comprising:

a plurality of Equatorial, polar and middle latitude relay stations (34, 61, 65); said relay stations (34, 61, 65) being located circumferentially along Earth's Equator (16), near Earth's poles (NP, SP) and in regions of Earth's middle-latitudes, respectively;

a first satellite (12) operating in an Equatorial, low Earth orbit (14);

a second satellite (12) operating in an inclined, low Earth orbit (60, 63, 210);

said first satellite (12) being capable of communicating with said plurality of Equatorial relay stations (34) over uplinks (35a) and downlinks (35b);

said second satellite (12) being capable of communicating with at least one of said plurality of polar relay stations (61) with at least one of said plurality of middle-latitude relay stations (65) and with at least one of said plurality of Equatorial relay stations (34);

said first satellite (12) being capable of storing a message from a first Equatorial relay station (34) and forwarding said message to a second Equatorial relay station (34); and said second satellite (12) capable of receiving said message from said second Equatorial relay station (34) and forwarding said message to one of said plurality of polar and middle-latitude relay stations (61, 65).

2. The satellite communications system as claimed in claim 1 further including a plurality of satellites (12) operating in said Equatorial and inclined orbits (14, 60, 63, 210); said plurality of satellites (12) operating in said Equatorial orbit (14) being capable of communicating over inter-satellite links (55).

3. The satellite communications system as claimed in claim 2 in which said plurality of satellites (12) includes at least six satellites (12), equally spaced in said Equatorial orbit (14).

4. The satellite communications system as claimed in claim 2 in which said plurality of satellites (12) includes a maximum of fourteen satellites (12), equally spaced in said Equatorial orbit (14).

5. The satellite communications system as claimed in claim 2 in which each said plurality of satellites (12) is capable of communicating over a generally circular area (44), between a latitude on the Earth (E) of thirty degrees North (18) and a latitude on the Earth (E) of thirty degrees South (20).

6. The satellite communications system as claimed in claim 1 in which any combination of said uplinks (35a), said downlinks (35b) and inter-satellite links (55) may be employed to accelerate delivery of said message throughout a particular orbital plane (14, 60, 63, 210).

7. A satellite communications system comprising:

a plurality of relay stations (34, 61, 65);

a plurality of user terminals (212);

a plurality of satellites (12) operating in a plurality of Equatorial (14) and polar (60) or inclined (63, 210) low Earth orbits;

each of said plurality of satellites (12) being capable of communicating with at least one of said plurality of relay stations and with one of said plurality of user terminals (212);

said plurality of user terminals (212) being randomly distributed, primarily in portions of the Earth (E) which are inhabited;

said plurality of relay stations (34) being distributed at locations on the Earth (E) which maximizes coverage for communicating and minimizes time to forward messages and data between any two of said plurality of user terminals (212);

at least one of said plurality of relay stations (34) being capable of functioning as a network operation and control center (NOCC); and said relay stations (34) being capable of communicating with each other.

8. The satellite communications system as claimed in claim 7 in which said plurality of low Earth orbits (14, 60, 63, 210) includes four orbital planes (210), each of said orbital planes (210) being inclined at fifty degrees.

9. The satellite communications system as claimed in claim 8 in which said plurality of satellites (12) includes twenty-four satellites (12), six of said satellites (12) orbiting in each of said four orbital planes.

10. The satellite communications system as claimed in claim 7 in which said plurality of low Earth orbits (14, 60, 63, 210) includes five orbital planes, four of said orbital planes being inclined at fifty degrees and one of said orbital planes being inclined at zero degrees.

11. The satellite communications system as claimed in claim 10 in which said plurality of satellites includes thirty satellites, six satellites (12) orbiting in each of said five orbital planes.

12. The satellite communications system as claimed in claim 7 in which said plurality of low Earth orbits (14, 60, 63, 210) includes three orbital planes, two of said orbital planes being inclined at sixty degrees and one of said orbital planes being inclined at zero degrees.

13. The satellite communications system claimed in claim 7 in which said plurality of satellites (12), operating in said plurality of Equatorial (14) orbits, are capable of communicating over inter-satellite links (55).

14. The satellite communications system claimed in claim 13 in which said plurality of satellites (12), operating in said plurality of Equatorial orbits (14), are capable of using a combination of said ground relay stations (34) and said inter-satellite links (55) to relay data to a point of delivery.

15. The satellite communications system as claimed in claim 7 in which each one of said plurality of user terminals (212) includes a modem (300) capable of interconnecting a computer system RS232 port to a satellite (12).

16. The satellite communications system claimed in claim 15 in which said modem (300) is a module capable of interconnection, by itself or in combination, with an antenna (314), a personal computer (308), a parallel interface (304), an expanded memory (302), and a global positioning system (310).

17. The satellite communications system claimed in claim 15 in which said modem (300) includes an uplink transmitter (322) and a downlink receiver (320) capable of communicating with said plurality of satellites (12) a plurality of packets (225) of data and system overhead information.

18. The satellite communications system claimed in claim 15 in which said modem (300) is capable of pre-compensating each of said plurality of user terminals (212) for Doppler shift of said downlink signal (216) from said plurality of satellites (12) minimizing frequency acquisition time by each of said plurality of satellites (12);

said modem (300) being capable of tracking a Doppler effect of said downlink signal (216) and scaling the measured value of said Doppler effect by a ratio of said uplink signal (214) frequency to said downlink signal (216) frequency, and adjusting the user terminal-satellite uplink signal (214) such that said uplink signal (214) is received at said satellite (12) corrected for said Doppler shift.

19. The satellite communications system as claimed in claim 7 in which said relay stations (34) are capable of communicating with each other using:

a very small aperture terminal (VSAT) link (222) through a geostationary satellite (218);

a public switched telephone network (PSTN) (220);

a link through a large, low Earth orbit communications satellite (12); and a link through a network of relay stations (224) on the surface of the Earth (E) at the Equator (16).

20. The satellite communications system as claimed in claim 19 in which at least one of said plurality of user terminals (212) is adapted to tracking and reporting a moving object's position and environment, said user terminal (212) including a global positioning system (GPS) module (310);

environmental sensing instrumentation (356);

energy sensing instrumentation (354);

a modem (300);

an antenna (314);

said modem (330) coupled with said antenna (314); and said GPS module (310) and said environmental sensing instrumentation (356) being coupled to said modem (300) and supplying geographical position information, environmental data and sensed energy data which is then transmitted as digital data to a receiving party through such combination of said terminal-satellite uplink (214), said relay station-satellite links (35a, 35b), said VSAT link (222) and said public switched telephone network (220) as minimizes time for transmission.

21. The satellite communications system as claimed in claim 20 in which said user terminal (212) adapted to tracking and reporting a moving object's position and environment, is housed in a low cost buoy (352); said low cost buoy (352) being deployed in a maritime environment.

22. The satellite communications system as claimed in claim 19 in which at least one of said plurality of user terminals (212) is adapted to monitoring data from systems, movable devices and devices with low data rate contained within a structure (392) which shields a user's radio signal from a satellite (12), said user terminal (212) including:

a data input device (391) for supplying digital business, manufacturing and related information;

a personal communication service (PCS) system (394) located within said structure (392);

a coupling device (396);

an antenna (314);

a modem (300); said modem coupled with said antenna (314);

said data input device (391) being coupled to an input of said PCS system (294) through said coupling device (296);

said PCS system (394) coupled at an output to said modem (300) of said user terminal (212); and said business, manufacturing and related information being relayed from said input data device (391) through said PCS system to said modem (300) for transmission by said user terminal (212) to a receiving party through a combination of said terminal-satellite uplink (214), said relay station-satellite links (35a, 35b), said terminal-satellite downlink (216), said VSAT link (222) and said public switched telephone network (220) as minimizes said time to forward said digital data to said receiving party.

23. The satellite communications system as claimed in claim 19, in which a plurality of said user terminals (212) are adapted to an interactive television system (360) which uses direct television programming supplied by a broadcaster, each of said plurality of user terminals (212) including:

an integrated antenna system (365) including
a small television dish antenna (364) for receiving a television satellite signal (361) and an integrated whip antenna (362) for communication with said satellite communication system satellites (12);

a modem (300);

said integrated antenna system (365) coupled by coaxial cable (363) to said modem (300);

a television converter (366) integrated with said modem (300);

a television receiver (372) for displaying said television satellite signal (361) to a user; said television receiver (372) coupled to said converter (366);

a data input device (368);

said user being capable of entering interactive responses to said television broadcaster by means of said data input device (368); and said responses being transmitted by said user terminal (212) as digital data to one of said communication system satellites (12) for delivery to said broadcaster through such combination of said terminal-satellite uplink (214), said relay station-satellite links (35a, 35b), said terminal-satellite downlink (216), said VSAT link (222) and said public switched telephone network (220) as minimizes time to forward said digital data to said receiving party.

24. The satellite communications system claimed in claim 7 which further includes:

said plurality of satellites (12) having dynamic, adaptive channel assignment means for monitoring a pool of radio frequencies in a 148.0 to 149.9 MHz band and assigning channels to said plurality of user terminals (212) as available; said dynamic, adaptive channel assignment means capable of scanning said pool of radio frequencies in a half-second interval for signals indicating channel usage, projecting channel usage for an ensuing half-second and thereafter instructing a calling user terminal (212) which channel to use.

25. The satellite communications system claimed in claim 24 in which said dynamic, adaptive channel assignment means includes a computer subsystem (324) having an algorithm for said projecting channel usage, said algorithm based on a sample history of scanning for said half-second intervals.

26. The satellite communications system as claimed in claim 7 in which:

said plurality of satellites (12), said plurality of user terminals (212) and said plurality of relay stations (34, 61, 65) are capable of transmitting and receiving a plurality of packets (225) of data and system overhead information;

said plurality of satellites (12) are also capable of transmitting a downlink signal (35b, 216) having a spectrum divided into four segments, each one of said segments being used in one of said four orbital planes;

said downlink signal (35b, 216) includes a plurality of frames of 500 millisecond duration;

said downlink signal (35b, 216) has a frequency shift keying (FSK) modulation and a quadraphase shift keying (QPSK) modulation of said packet transmissions in each of said plurality of frames in a time-shared manner;

said plurality of satellites (12) are also capable of receiving an uplink signal (35a, 214) in which said quadraphase shift keying (QPSK) modulation is used for transmitting said plurality of packets (225);

said plurality of satellites (12) are also capable of receiving a user terminal-satellite uplink signal (214) and transmitting a user terminal-satellite downlink signal (216) having a variable data rate, said data rate variable from a low rate to provide for reduced burst power demand and reduced cost of equipment for said user terminals (212), to a high rate for rapid transmission of data;

said user terminal-satellite uplink signal (214) uses a combination of random access and frequency division multiplexing (FDM); and said downlink signal (35b, 216) and said relay station-satellite uplink signal (35a) uses a time division multiplexing;

said plurality of satellites (12) and said user terminals (212) are also capable of employing an auction protocol in a first burst of data in which said satellite (12) announces a level of message traffic being currently accepted for storage and forwarding, said level of message traffic being variable from a most expensive, fastest forwarding traffic to a least expense, slowest forwarding traffic.

27. The satellite communications system as claimed in claim 26 in which said variable data rate for a user terminal-satellite uplink signal (214) ranges from 9.6 kbps to 300 bps, and said variable data rate for a relay station-satellite downlink signal (35b) ranges from 24 kbps for QPSK modulation to 6 kbps for FSK modulation.

28. A method of satellite communications comprising the steps of:

providing a plurality of relay stations (34, 61, 65);

distributing said plurality of relay stations (34) at locations on the Earth (E) which maximize coverage for communicating and minimize time to forward messages and data between any two user terminals (212);

providing a plurality of user terminals (212);

distributing said plurality of user terminals (212) randomly, primarily in portions of the Earth (E) which are inhabited;

operating a plurality of satellites (12) in a plurality of Equatorial (14), polar (60) and inclined (63, 210) low Earth orbits;

communicating between each of said plurality of satellites (12) and at least one of said plurality of relay stations (34) and said plurality of user terminals (212); and communicating, one with another, between said relay stations (34).

29. The method of satellite communications as claimed in claim 28 in which communicating between each of said plurality of satellites (12) and at least one of said plurality of relay stations (34, 61, 65) and said plurality of user terminals (212) further includes the steps of:

transmitting and receiving a plurality of packets (225) of data and system overhead information between said plurality of satellites (12), said plurality of user terminals (212) and between said plurality of satellites (12) and said plurality of relay stations (34, 61, 65);

transmitting a relay station-satellite downlink signal (35b) and a user terminal-satellite downlink signal (216) from said plurality of satellites (12), each said downlink signal (35b, 216) having a spectrum divided into four segments, each one of said segments being used in one of said four orbital planes; said downlink signal (35b, 216) including a plurality of frames of 500 millisecond duration;

modulating said downlink signal (35b, 216) using a frequency shift keying (FSK) modulation and a quadraphase shift keying (QPSK) modulation of said packet transmissions in each of said plurality of frames in a time-shared manner;

receiving with said plurality of satellites (12) a relay station uplink signal (35a) in which said quadraphase shift keying (QPSK) modulation is used for transmitting said plurality of packets (225);

receiving a user terminal-satellite uplink signal (214) with said plurality of satellites (12) and transmitting a user terminal-satellite downlink signal (216) having a variable data rate, said data rate variable from a low rate to provide for reduced burst power demand and reduced cost of equipment for said user terminals (212), to a high rate for rapid transmission of data; and multiplexing said user terminal-satellite uplink signal (214) using a combination of random access and frequency division (FDM) multiplexing;

multiplexing said downlink signal (35b, 216) and said relay station-satellite uplink signal (35a) using a time division multiplexing (TDM); and employing an auction protocol in a first burst of data in which said satellite (12) announces to said user terminals (212) a level of message traffic being currently accepted for storage and forwarding, said level of message traffic being variable from a most expensive, fastest forwarding traffic to a least expense, slowest forwarding traffic.

30. The method as claimed in claim 28, in which the step of providing a plurality of user terminals (212) and the step of providing a plurality of relay stations (34, 61, 65), includes the steps of:

deploying a low-cost buoy (352) in a maritime location;

said low-cost buoy (352) containing environmental and weather instrumentation (356) for collecting environmental data;

an underwater listening device (354) for collecting vessel-tracking data;

a position-determining device (LORAN, GPS) (310) for collecting positioning data;

coupling said relay stations (34, 61, 65) to a public switched telephone network (PSTN) (220); and transmitting said environmental, tracking and positioning data from a user terminal (212) to a receiving party by communicating through at least one of said satellites (12), one of said relay stations (34, 61, 65) and said PSTN (220).

31. The method as claimed in claim 28, in which the step of providing a plurality of user terminals (212) and the step of providing a plurality of relay stations (34, 61, 65), includes the steps of:

providing an integrated antenna system (356) at a site of a television viewer;

said integrated antenna system (356) having a first receiving antenna (364) for receiving broadcast television signals (361) provided by a broadcaster from a direct-broadcasting satellite (382), and having a second antenna 362 for communication with at least one of said plurality of satellites (12);

providing an integrated television converter/tuner (366) having a non-voice, non-geostationary satellite modem (300);

coupling said television converter/tuner (366) to said integrated antenna system (356);

coupling a data input device (368) and a television receiver (372) for displaying said television signals (361), to said integrated television converter/tuner (366);

coupling said relay stations (34, 61, 65) to a public switched telephone network (PSTN) (220); and said television viewer sending responses to said broadcast television signals (361) displayed on said television receiver (372) to said broadcaster by entering said responses on said data input device (368) and transmitting said responses through at least one of said satellites (12), one of said relay stations (34, 61, 65) and said public switched telephone network (220) to said broadcaster.

32. The method as claimed in claim 28, in which the step of communicating between each of said plurality of satellites (12) and at least one of said plurality of relay stations (34) and said plurality of user terminals (212), includes the step of:

providing communications to one or more of said plurality of satellites (12) from movable devices (391) which are shielded from radio signals (216, 214) transmitted and received by said satellites (12) by a man-made or natural structure (392), by relaying data from said movable devices (391) through a low-power, personal communication system (394) to a nearby, integrated user terminal (398) capable of communicating with at least one of said plurality of satellites (12).

33. The method as claimed in claim 28, in which the step of communicating between each of said plurality of satellites (12) and at least one of said plurality of relay stations (34) and said plurality of user terminals (212), includes the steps of:

obtaining said Universal Coordinated Time (UTC) signals provided by the National Bureau of Standards, through a communication link (35a, 220);

broadcasting said Universal Coordinated Time (UTC) signals through said plurality of satellites (12);

receiving said Universal Coordinated Time (UTC) signals at one of said plurality of user terminals (212);

coupling one of said plurality of user terminals (212) to a clock in a local clock system; said local clock system capable of responding to Universal Coordinated Time (UTC) signals;

passing said Universal Coordinated Time (UTC) signals to said local clock system; and synchronizing said clock in said local clock system to said Universal Coordinated Time (UTC) signals.

34. The method as claimed in claim 28, in which the step of distributing said plurality of user terminals (212) randomly, primarily in portions of the Earth which are inhabited, and the step of providing a plurality of relay stations (34, 61, includes the steps of:

coupling a user terminal (212) to a monitoring device connected to a remotely installed system;

said monitoring device capable of delivering a signal indicating proper functioning of said remotely installed system to said user terminal (212);

monitoring proper functioning of said remotely installed system with said monitoring device and producing said signal;

coupling said relay stations (34, 61, 65) to a public switched telephone network (PSTN) (220); and transmitting said signal through at least one of said satellites (12), at least one of said relay stations (34, 61, 65) and said public switched telephone network (220) to a receiving party.

35. The method as claimed in claim 28, in which the step of communicating between each of said plurality of satellites (12) and at least one of said plurality of relay stations (34) and said plurality of user terminals (212), includes the steps of:

obtaining commercial market information in real time through one or more communication links (35a, 35b, 220);

broadcasting said commercial market information through said plurality of satellites (12); and receiving said commercial market information at least one of said plurality of user terminals (212) for use in commercial transactions.

36. A method of satellite communications comprising the steps of:

providing a plurality of Equatorial, middle-latitude and polar relay stations (34, 61);

said relay stations being located circumferentially along Earth's Equator (16), in regions of Earth's middle-latitudes and near Earth's poles, respectively;

operating a first satellite (12) in an Equatorial, low Earth orbit (14);

operating a second satellite (12) in an inclined, low Earth orbit (60, 63, 210);

communicating between said first satellite (12) and one of said plurality of Equatorial relay stations (34) over uplinks (35a) and downlinks (35b), and with one of said plurality of satellites in Equatorial orbit (14) over inter-satellite links (55);

communicating between said second satellite (12) and at least one of said plurality of Equatorial relay stations (34), middle-latitude relay stations (34) and polar relay stations (61);

storing a message from a first Equatorial relay station (34) in said first satellite (12) and forwarding said message to a second Equatorial relay station (34); and receiving said message from said second Equatorial relay station (34) with said second satellite (12) and forwarding said message to at least one of said plurality of middle-latitude relay stations (34) and polar relay stations (61).

37. The method of satellite communications as claimed in claim 36 in which communicating between said first satellite (12) and one of said plurality of Equatorial relay stations (34) over uplinks (35a) and downlinks (35b), and with one of said plurality of satellites in Equatorial orbit (14) over inter-satellite links (55), further includes the step of employing any combination of said uplinks (35a), said downlinks (35b) and said inter-satellite links (55) to accelerate delivery of said message throughout a particular orbital plane (14, 60, 63, 210).

* * * * *